US011017646B2

(12) United States Patent
Kamio et al.

(10) Patent No.: US 11,017,646 B2
(45) Date of Patent: May 25, 2021

(54) INFORMATION PROCESSING DEVICE AND DETERMINATION METHOD

(71) Applicant: PANASONIC I-PRO SENSING SOLUTIONS CO., LTD., Fukuoka (JP)

(72) Inventors: Takashi Kamio, Kanagawa (JP); Kosuke Shinozaki, Fukuoka (JP); Koji Kawamoto, Fukuoka (JP); Hiromichi Sotodate, Fukuoka (JP); Yuiko Takase, Fukuoka (JP); Masashige Tsuneno, Fukuoka (JP); Eisaku Miyata, Kanagawa (JP); Nobuhito Seki, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 16/745,806

(22) Filed: Jan. 17, 2020

(65) Prior Publication Data
US 2020/0234553 A1 Jul. 23, 2020

(30) Foreign Application Priority Data

Jan. 21, 2019 (JP) .............................. JP2019-007595
Jul. 3, 2019 (JP) .............................. JP2019-124570
(Continued)

(51) Int. Cl.
*G08B 13/196* (2006.01)
*G06K 9/00* (2006.01)

(52) U.S. Cl.
CPC ... *G08B 13/19645* (2013.01); *G06K 9/00288* (2013.01); *G08B 13/19656* (2013.01)

(58) Field of Classification Search
CPC ........ G08B 13/19645; G08B 13/19656; G06K 9/00288
See application file for complete search history.

(56) References Cited

U.S. PATENT DOCUMENTS 5,991,429 A * 11/1999 Coffin ................ G06K 9/00255
382/118
2002/0191817 A1* 12/2002 Sato ................... G06K 9/00288
382/118
(Continued)

FOREIGN PATENT DOCUMENTS

JP    2002-279466    9/2002
JP    2008-141386    6/2008
(Continued)

*Primary Examiner* — Maria E Vazquez Colon
(74) *Attorney, Agent, or Firm* — Greenblum & Bernstein, P.L.C.

(57) ABSTRACT

An information processing device and a determination method for determining whether a person other than the persons determined to be permitted to enter each zone has entered the zone is provided. The information processing device has a communication section for receiving face image data from cameras for photographing respective plurality of zones in a building and a control section for collating the face image data with the registered face image data of the persons permitted to enter each zone and for determining whether the entry of the person corresponding to the face image data is permitted or not.

6 Claims, 36 Drawing Sheets

(30) Foreign Application Priority Data

Jul. 3, 2019 (JP) .............................. JP2019-124579
Jul. 3, 2019 (JP) .............................. JP2019-124582

(56) References Cited

U.S. PATENT DOCUMENTS

| | | | |
|---|---|---|---|
| 2003/0197612 A1* | 10/2003 | Tanaka | G06K 17/00 340/572.1 |
| 2005/0212654 A1* | 9/2005 | Yoda | G07C 9/37 340/5.53 |
| 2006/0126906 A1 | 6/2006 | Sato et al. | |
| 2008/0080748 A1* | 4/2008 | Sukegawa | G06K 9/00885 382/118 |
| 2009/0116700 A1* | 5/2009 | Wakabayashi | G07C 9/00571 382/115 |
| 2010/0157062 A1* | 6/2010 | Baba | G07C 9/00563 348/156 |
| 2016/0295171 A1* | 10/2016 | Van Den Brink | G06T 7/70 |
| 2017/0012971 A1* | 1/2017 | Endo | G06K 9/00771 |
| 2017/0134698 A1* | 5/2017 | Mahar | H04N 7/181 |
| 2017/0294089 A1* | 10/2017 | Miwa | H04W 4/02 |
| 2017/0352256 A1* | 12/2017 | Miwa | G08B 25/04 |
| 2020/0105080 A1* | 4/2020 | Maeno | G07C 9/38 |

FOREIGN PATENT DOCUMENTS

| | | |
|---|---|---|
| JP | 2014-234637 | 12/2014 |
| JP | 2018-092293 | 6/2018 |
| WO | 2016/103332 | 6/2016 |

\* cited by examiner

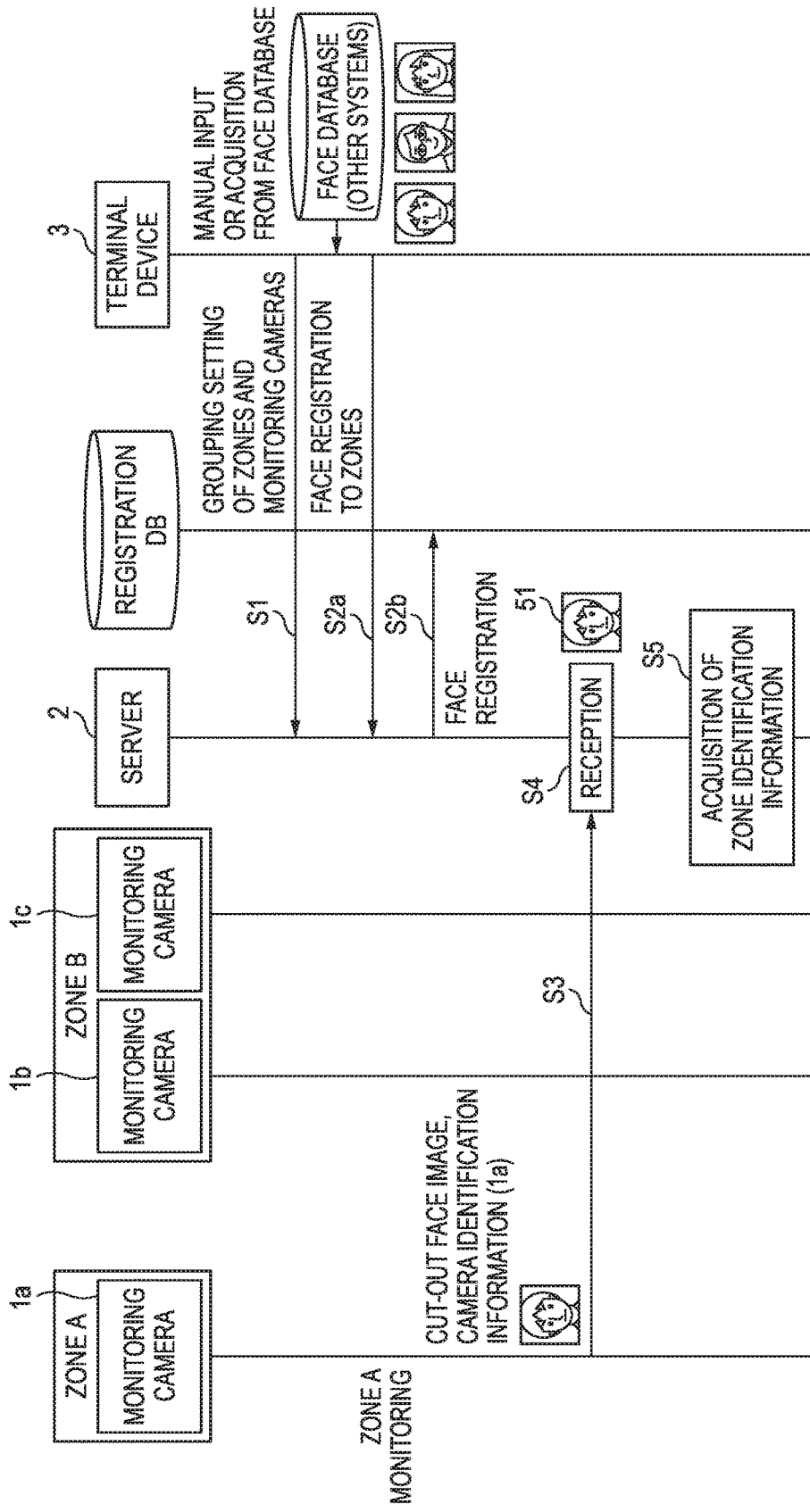

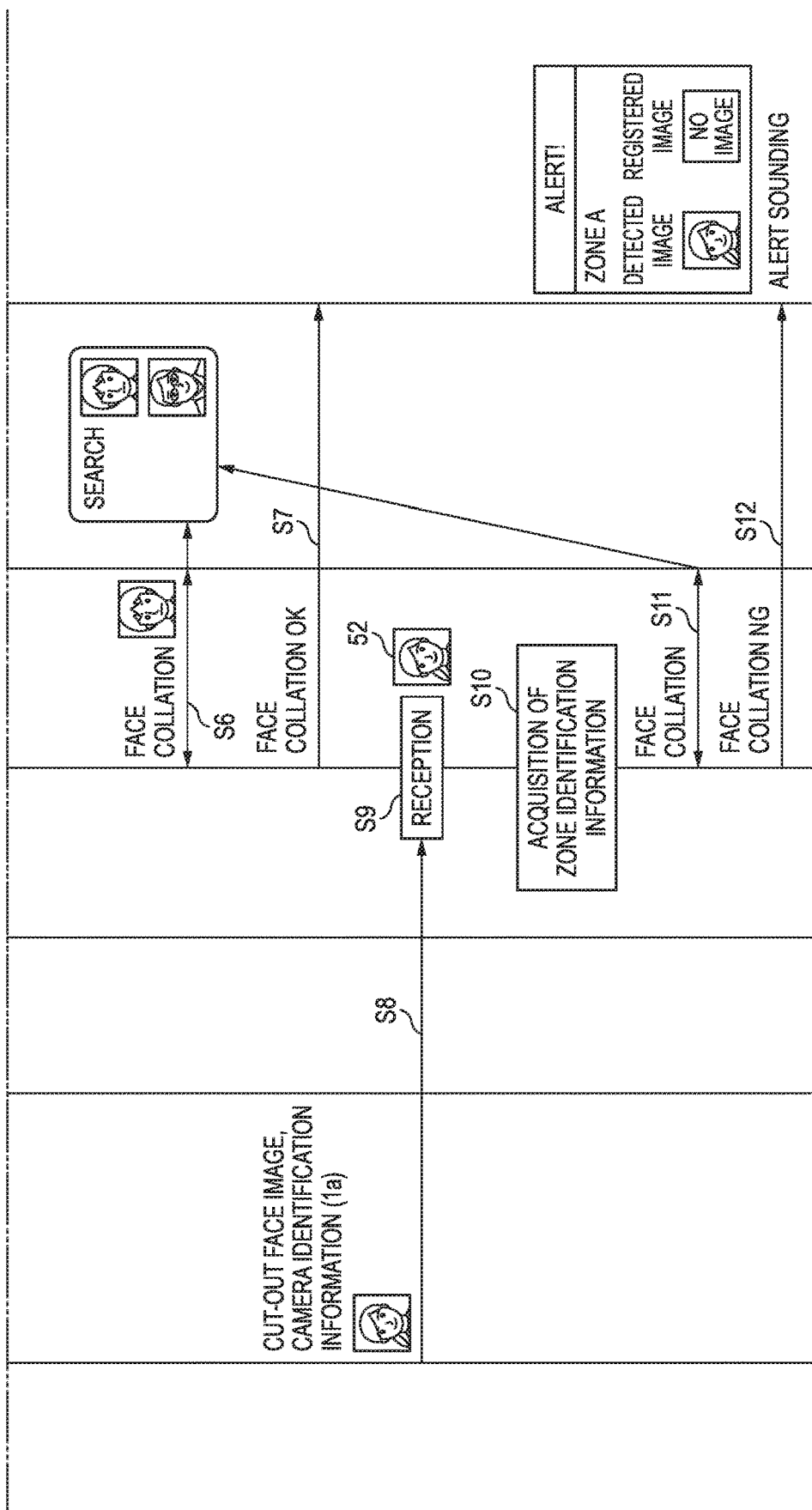

FIG. 9

| | A | B |
|---|---|---|
| 👤 | 9:00-19:00 | 13:00-17:00 |
| 👤 | 9:00-19:00 | — |
| 👤 | — | 15:00-17:00 |

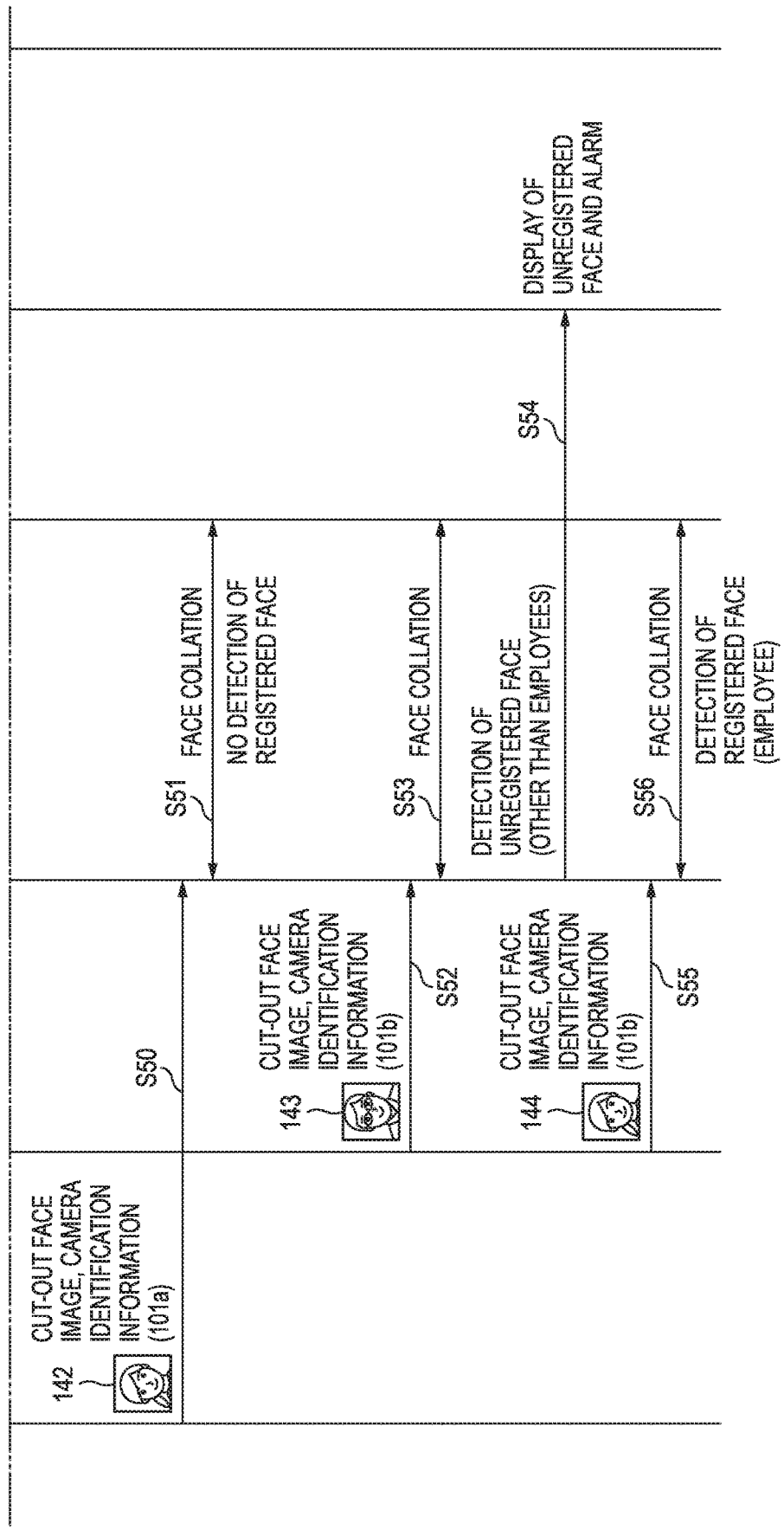

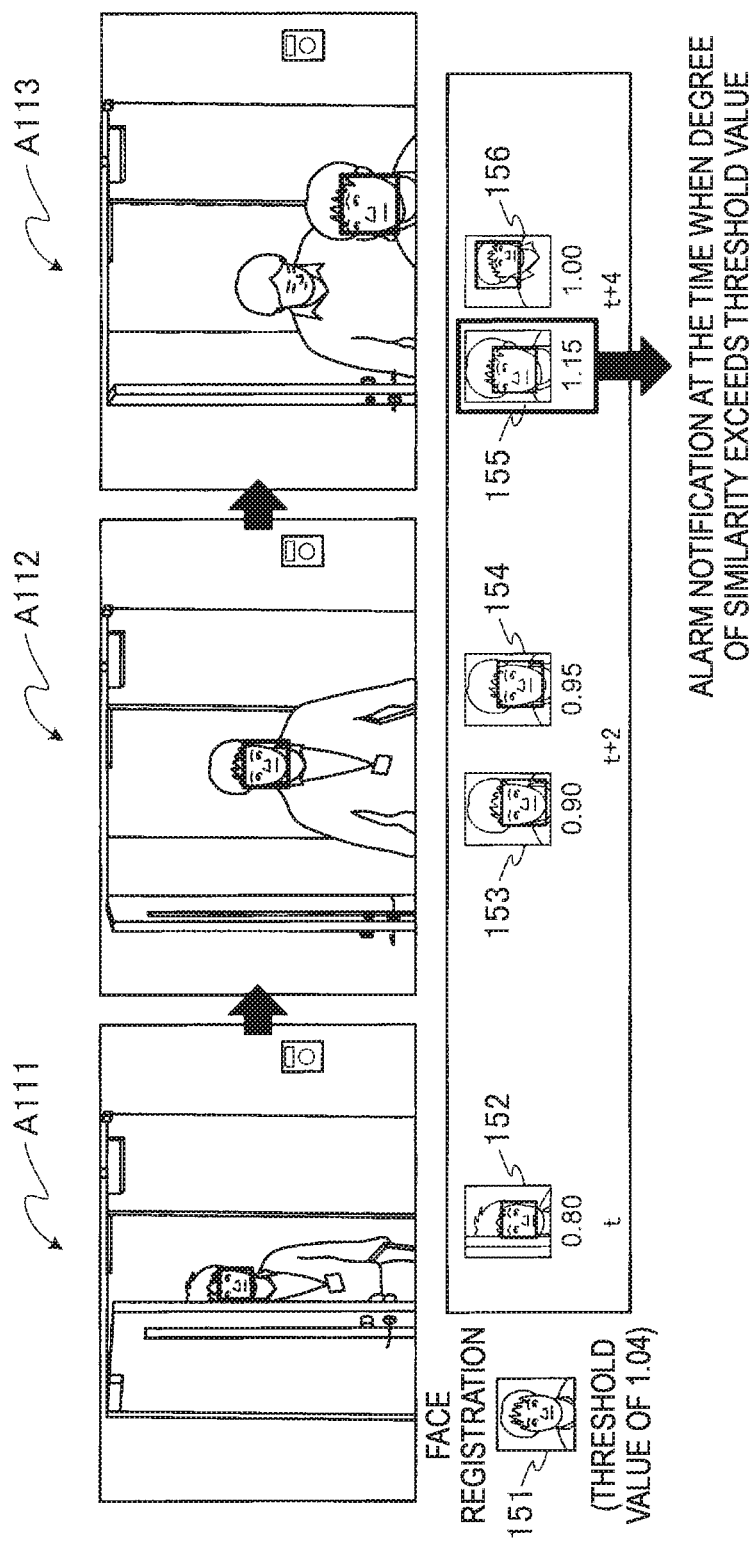

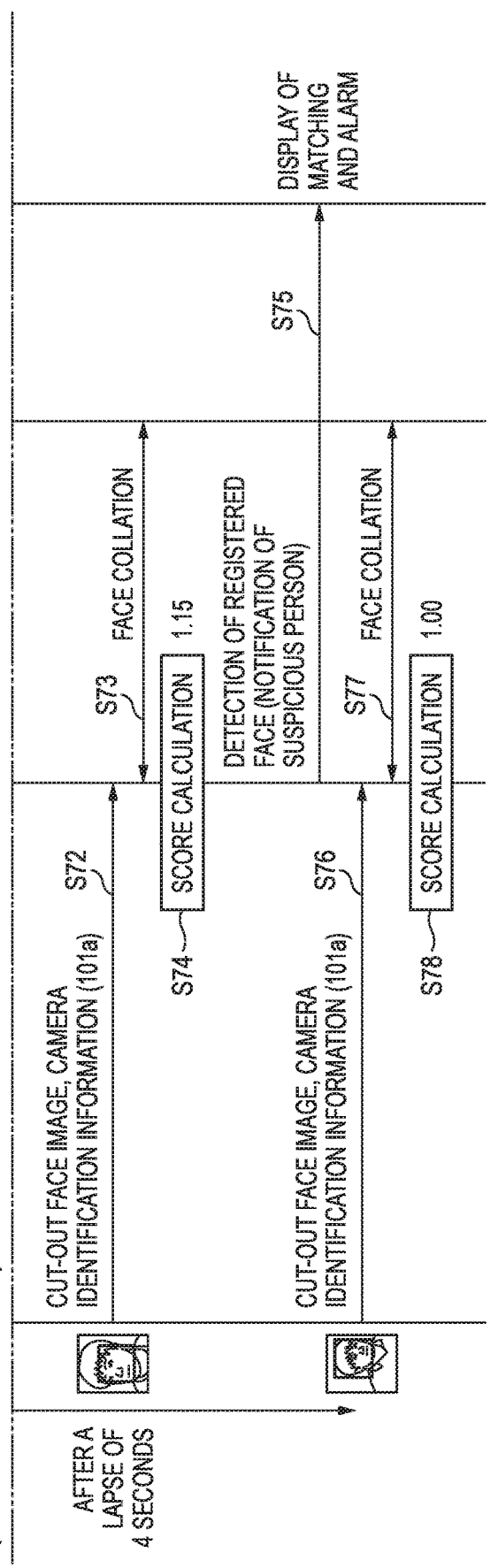

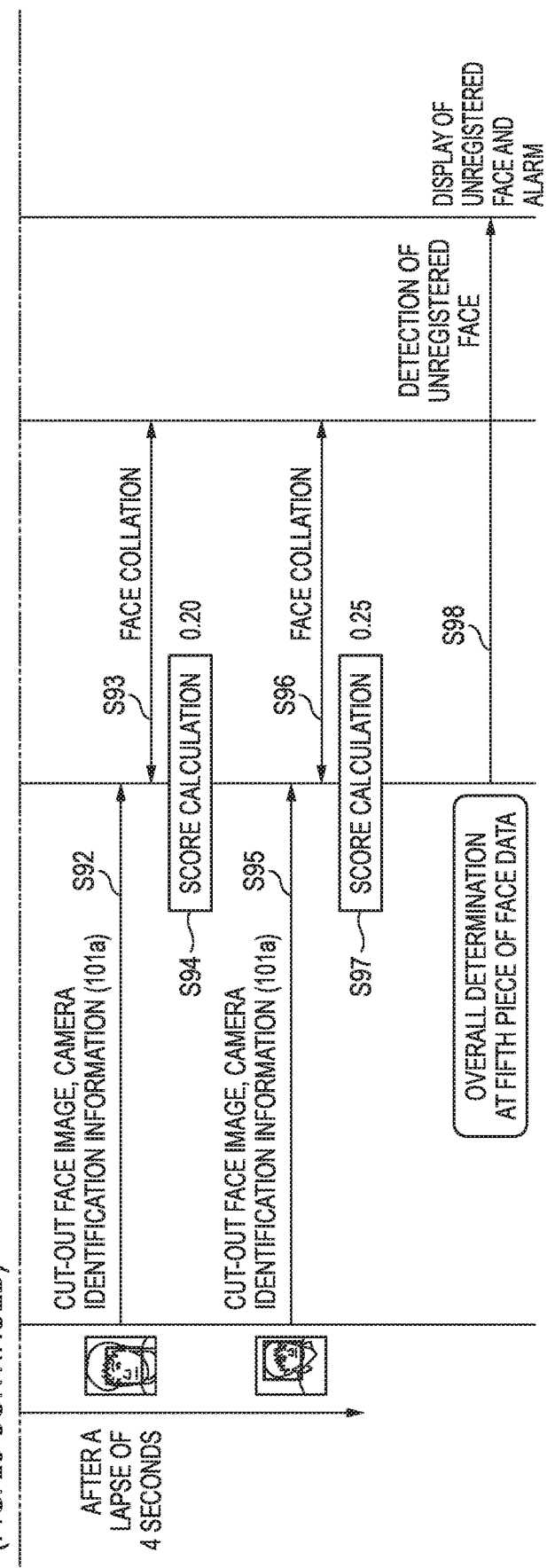

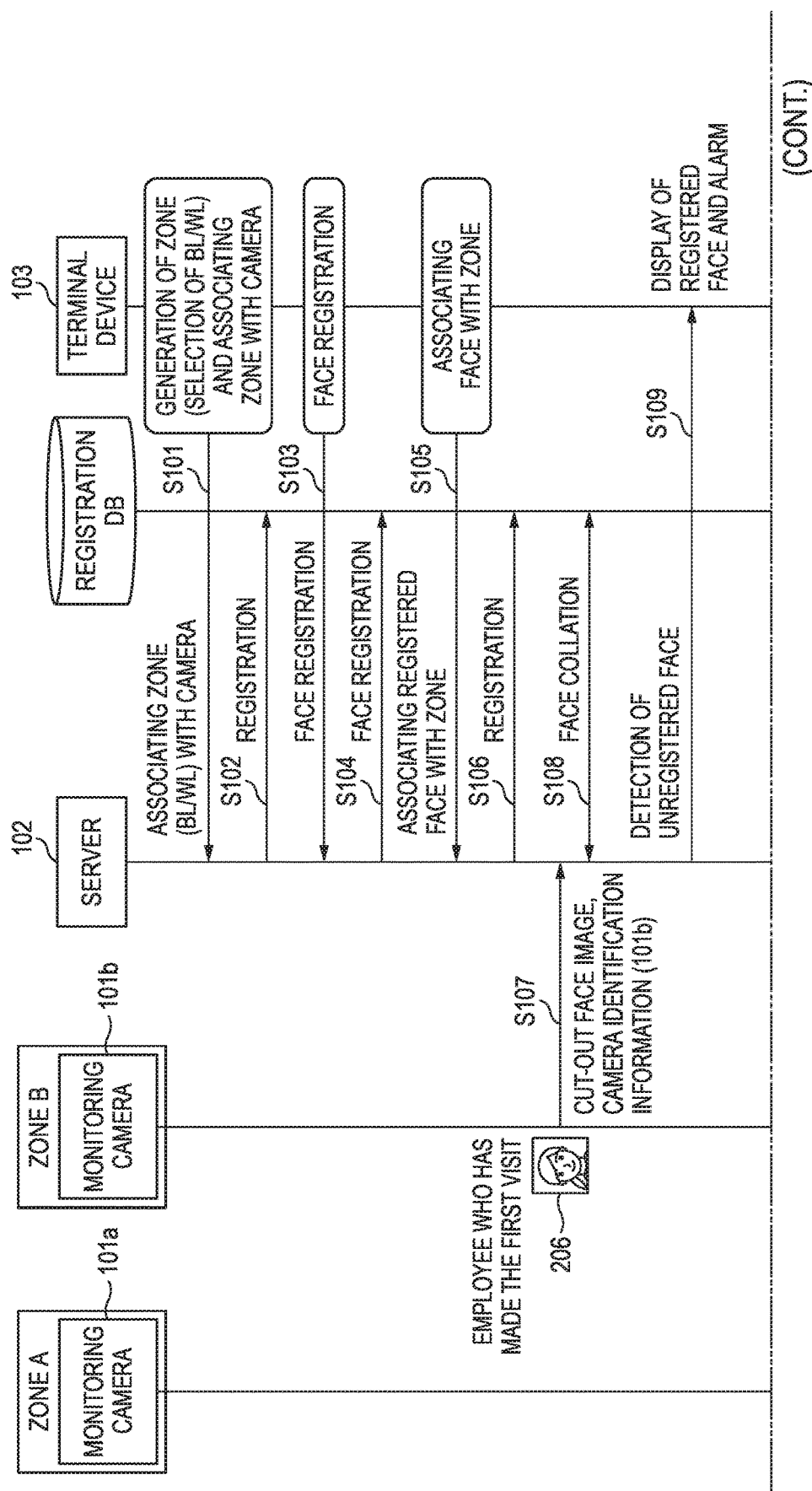

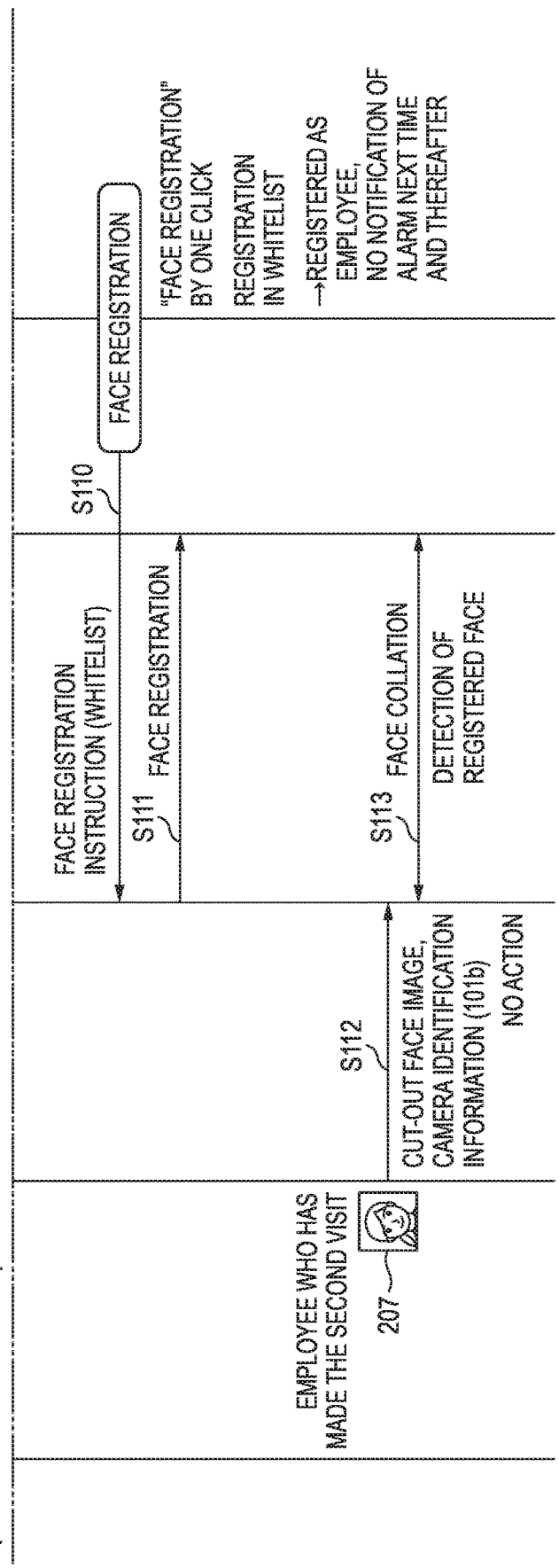

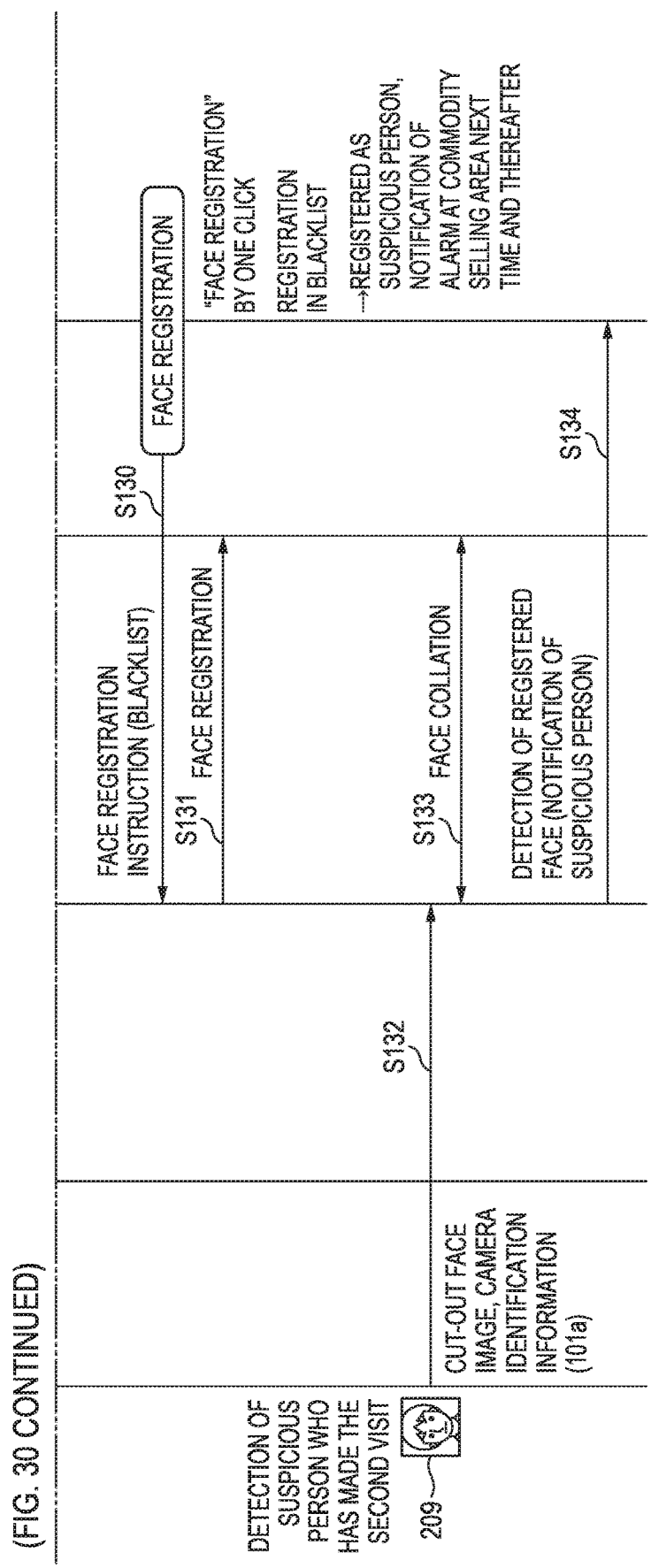

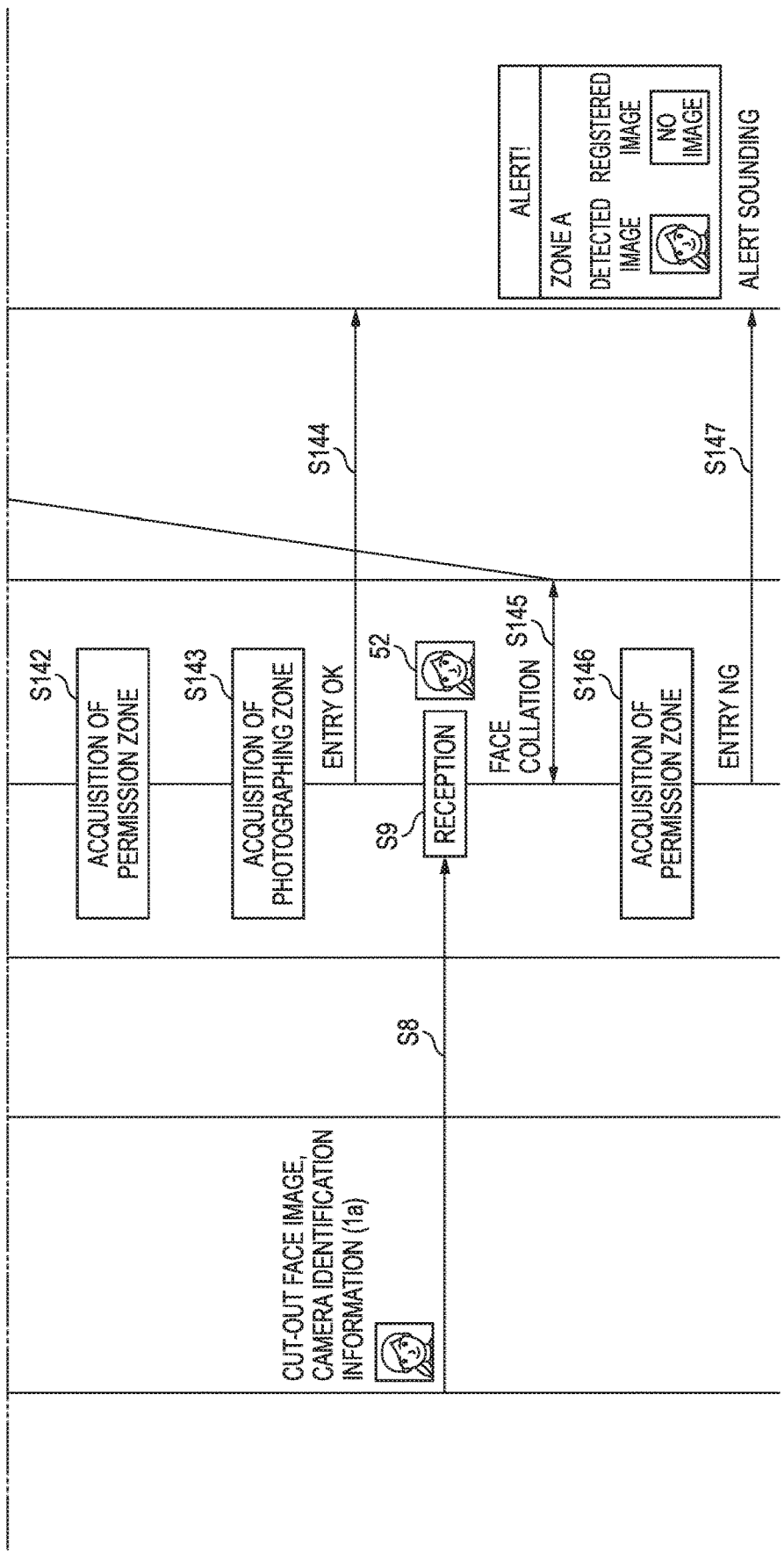

INFORMATION PROCESSING DEVICE AND DETERMINATION METHOD

CROSS-REFERENCE TO RELATED APPLICATIONS

This application is based on and claims priority under 35 USC 119 from Japanese Patent Applications No. 2019-007595 filed on Jan. 21, 2019, No. 2019-124570 filed on Jul. 3, 2019, No. 2019-124579 filed on Jul. 3, 2019, and No. 2019-124582 filed on Jul. 3, 2019, the contents of which are incorporated herein by reference.

TECHNICAL FIELD

The present disclosure relates to an information processing device, a determination method and a grogram.

BACKGROUND ART

Conventionally, entry/exit management systems capable of notifying and transmitting the result of authentication using face authentication have been provided for users passing through gates (for example, refer to Patent Document 1).

PRIOR ART DOCUMENT

Patent Document

Patent Document 1: JP-A-2018-92293

SUMMARY OF INVENTION

In a monitoring camera system, however, conditions according to which the entry of persons is monitored are desired to be changed for each zone in some cases.

For example, at the commodity selling area in a store, suspicious persons registered in a blacklist are desired to be monitored, and in the backyard in the rear of the commodity selling area, persons other than employees registered in a whitelist are desired to be monitored in some cases.

In consideration of these circumstances, a technology capable of appropriately monitoring the entry of persons into each zone is demanded even in the case that conditions according to which the entry of persons is monitored are changed.

A non-limiting embodiment according to the present disclosure provides an information processing device capable of appropriately monitoring the entry of persons into each zone even in the case that conditions according to which the entry of persons is monitored are changed, and also provides a determination method and a program.

An information processing device according to an aspect of the present disclosure has a communication section for receiving face image data from cameras for photographing respective plurality of zones in a building; a first table in which the camera identification information of respective plurality of cameras is associated with the plurality of zones; a second table in which registered face image data is associated with the zone into which the entry of the person corresponding to the registered face image data is permitted; and a control section for referring to the first table on the basis of the camera identification information received by the communication section from the camera photographing the person corresponding to the face image data, for determining the photographing zone in which the person corresponding to the face image data has been photographed, for referring to the second table on the basis of the photographing zone, and for determining whether the entry of the person corresponding to the face image data is permitted or not.

A determination method according to another aspect of the present disclosure has the step of receiving face image data from cameras for photographing respective plurality of zones in a building; the step of referring to a first table in which the camera identification information of respective plurality of cameras is associated with the plurality of zones on the basis of the camera identification information received from the camera having photographed the person corresponding to the face image data and for determining the photographing zone in which the person corresponding to the face image data has been photographed; and the step of referring to a second table in which registered face image data is associated with the zone into which the entry of the person corresponding to the registered face image data is permitted on the basis of the photographing zone and for determining whether the entry of the person corresponding to the face image data is permitted or not.

A program according to still another aspect of the present disclosure makes a computer to perform the step of receiving face image data from cameras for photographing respective plurality of zones in a building; the step of referring to a first table in which the camera identification information of respective plurality of cameras is associated with the plurality of zones on the basis of the camera identification information received from the camera having photographed the person corresponding to the face image data and for determining the photographing zone in which the person corresponding to the face image data has been photographed; and the step of referring to a second table in which registered face image data is associated with the zone into which the entry of the person corresponding to the registered face image data is permitted on the basis of the photographing zone and for determining whether the entry of the person corresponding to the face image data is permitted or not.

These general or specific aspects may be achieved using a system, a device, a method, an integrated circuit, a computer program or a recording medium, or may also be achieved by an arbitrary combination of the system, the device, the method, the integrated circuit, the computer program and the recording medium.

According to an aspect of the present disclosure, the present invention can determine whether a person other than the persons determined to be permitted to enter each of the zones has entered the zone.

Further advantages and effects in the aspect of this disclosure will be made clear upon reference to the specification and drawings. Although the advantages and/or effects are provided by some embodiments and features described in the specification and the drawings, all the features are not necessarily required to be provided in order to obtain one or more identical features.

BRIEF DESCRIPTION OF DRAWINGS

FIG. 8 is a sequence diagram showing an operation example of the monitoring camera system;

FIG. 9 is a view showing an example of a table stored in the storage section of a server according to a second embodiment;

FIG. 20 is a view illustrating a determination method in a blacklist system;

FIG. 29 is a sequence diagram showing an operation example of the monitoring camera system;

DESCRIPTION OF EMBODIMENTS

Embodiments according to the present invention will be described in detail while appropriately referring to drawings. However, unnecessarily detailed descriptions are omitted in some cases. For example, detailed descriptions on matters known well and overlapping descriptions for substantially identical configurations are omitted in some cases. These omissions are done to avoid the following descriptions from becoming redundant and to make the following descriptions to be understood easily by a person skilled in the art.

The attached drawings and the following descriptions are provided so that a person skilled in the art can fully understand this disclosure and are not intended to limit the subject matters described in the claims.

First Embodiment

Figure 1:
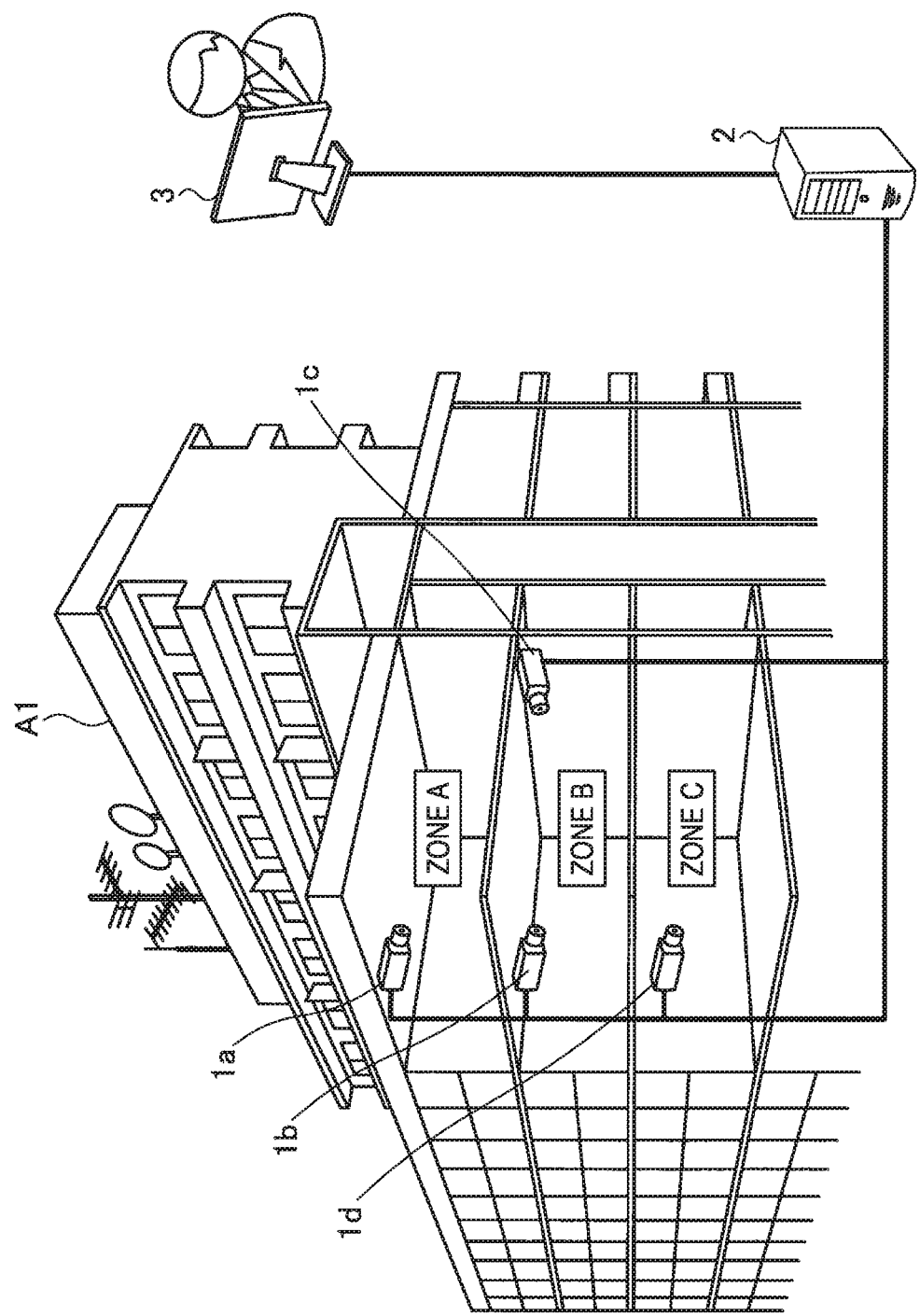
FIG. 1 is a view showing an example of a monitoring camera system according to a first embodiment.

FIG. 1 is a view showing an example of a monitoring camera system according to a first embodiment. As shown in FIG. 1, the monitoring camera system has monitoring cameras 1a to 1d, a server (information processing device) 2 and a terminal device 3. FIG. 1 shows a building A1 in addition to the monitoring camera system. The building A1 is, for example, a company building, a condominium or a commercial facility.

Each of zones A to C may be a room, an entrance, a hallway, a staircase, a floor, an elevator or the like. Or each of the zones A to C may be a part of the site where the building A1 is located. In other words, the zones A to C may be assumed to be regions wherein a determination is made as to whether the entry of a person thereinto is permitted. The zones may also be referred to as areas. In the following descriptions, the zones A to C are described as rooms in the building A1.

The monitoring cameras 1a to 1d are installed in the zones A to C. For example, the monitoring camera 1a is installed in the zone A of the building A1. The monitoring cameras 1b and 1c are installed in the zone B of the building A1. The monitoring camera 1d is installed in the zone C of the building A1.

The monitoring cameras 1a to 1d are installed so as to photograph persons present in the zones A to C. For example, the monitoring cameras 1a to 1d are installed so as to photograph the entire regions in the zones A to C.

Figure 2:
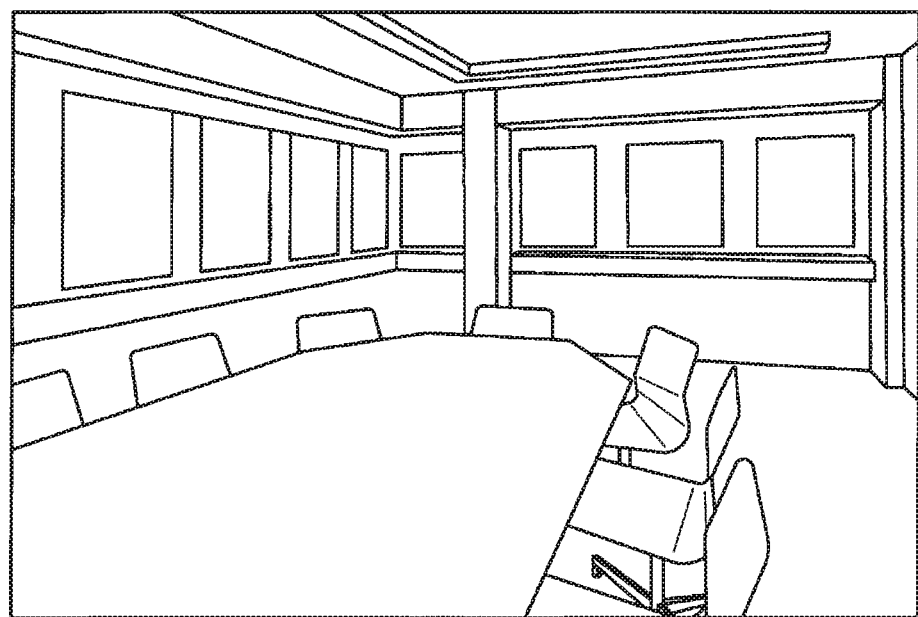
FIG. 2 is a view showing an example of an image photographed by the monitoring camera installed in a zone.

FIG. 2 is a view showing an example of an image photographed by the monitoring camera 1a installed in the zone A. The monitoring camera 1a photographs, for example, the interior of the room over a wide range as shown in FIG. 2.

The description returns to the description of the monitoring camera system shown in FIG. 1. The server 2 is connected to the monitoring cameras 1a to 1d via a network, such as a LAN (Local Area Network) or the Internet. The server 2 may be installed inside the building A1 or may be installed in a place different from the building A1.

The server 2, in each of the zones A to C, has stored (registered) the image data (hereafter sometimes referred to as face data) of the faces of persons capable of entering each of the zones A to C. The server 2 collates the face data of the persons photographed by the monitoring cameras 1a to 1d with the registered face data. The server 2 transmits the collation results to the terminal device 3.

The terminal device 3 is connected to the server 2 via a network, such as a LAN or the Internet. The terminal device 3 may be installed inside the building A1 or may be installed in a place different from the building A1. The terminal device 3 may be, for example, a personal computer, a smart phone, a tablet terminal or the like.

The monitoring cameras 1a to 1d may be installed so as to photograph persons entering the zones A to C. For example, the monitoring cameras 1a to 1d may be installed so as to photograph the regions near the entrances of the zones A to C.

Furthermore, the monitoring cameras having already been installed in the zones A to C may be used as the monitoring cameras 1a to 1d. For example, the monitoring cameras having already been installed in the zones A to C as part of an image recording system for recording the images of the zones A to C may be used as the monitoring cameras 1a to 1d. In this case, the outputs of the monitoring cameras 1a to 1d may be branched to the image recording system and the server 2.

Figure 3:
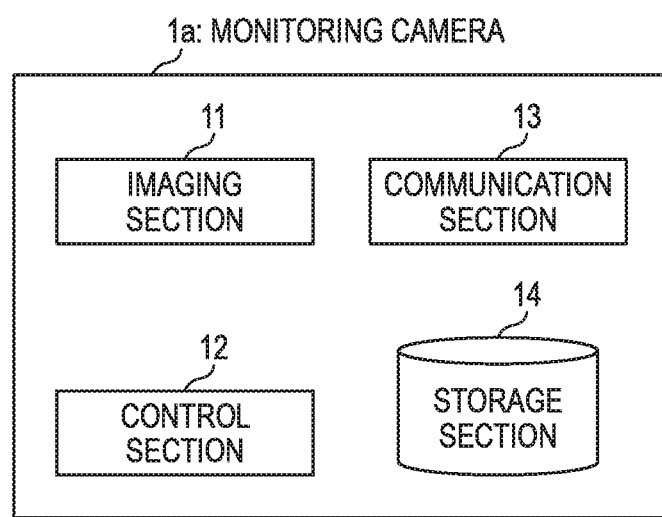
FIG. 3 is a view showing a block configuration example of the monitoring camera.

FIG. 3 is a view showing a block configuration example of the monitoring camera 1a. As shown in FIG. 3, the monitoring camera 1a has an imaging section 11, a control section 12, a communication section 13 and a storage section 14.

The imaging section 11 has, for example, a lens and an imaging device (not shown). The lens of the imaging section 11 forms an image of a subject on the light-receiving face of the imaging device. Lenses having various focal distances or photographing ranges can be used, for example, depending on the installation place of the monitoring camera 1a or the purpose of photographing.

The imaging device of the imaging section 11 converts the light received on the light-receiving face into an electrical signal. The imaging device is, for example, an image sensor, such as a CCD (Charge Coupled Device) or a CMOS (Complementary Metal Oxide Semiconductor). The imaging section 11 converts the electrical signal (analog signal) corresponding to the light received on the light-receiving face of the imaging device into a digital signal and outputs the digital signal to the control section 12.

The control section 12 controls the entire monitoring camera 1a. The control section 12 may be composed of, for example, a CPU (Central Processing Unit) or a DSP (Digital Signal Processor). The control section 12 discriminates the face image of a person from the image output from the imaging section 11. The control section 12 cuts out the discriminated face image of the person and then transmits the face data of the cut-out face image (still image) to the server 2 via the communication section 13.

The communication section 13 communicates with the server 2. The communication section 13 may communicate with the server 2, for example, via a network cable (by wire), such as an Ethernet (registered trademark) cable. Furthermore, the communication section 13 may communicate with the server 2, for example, via short-range wireless communication, such as Wi-Fi (registered trademark) or Bluetooth (registered trademark).

A program for operating the control section 12 is stored in the storage section 14. Furthermore, for example, data to be calculated by the control section 12 or data to be used by the control section 12 to control various sections are stored in the storage section 14. The storage section 14 may be composed of a storage device, such as RAM (Random Access Memory), ROM (Read Only Memory), flash memory or HDD (Hard Disk Drive).

Each of the monitoring cameras 1b to 1d has a block configuration similar to that of the monitoring camera 1a. Hence, the descriptions of the block configurations of the monitoring cameras 1a to 1d are omitted.

Figure 4:
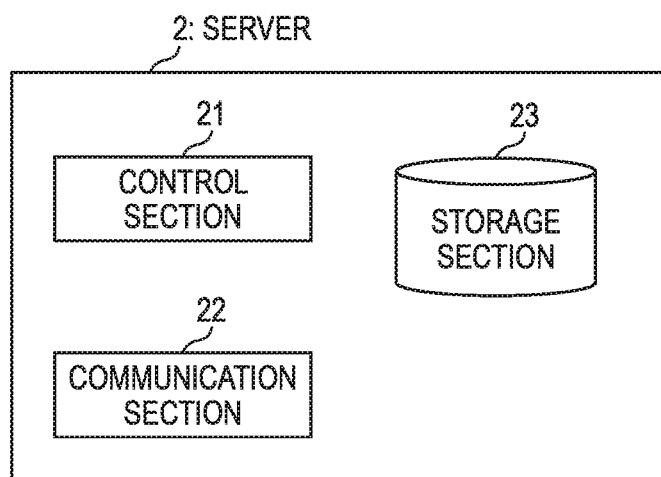
FIG. 4 is a view showing a block configuration example of a server.

FIG. 4 is a view showing a block configuration example of the server 2. As shown in FIG. 4, the server 2 has a control section 21, a communication section 22 and a storage section 23.

The control section 21 controls the entire server 2. The control section 21 may be composed of, for example, a CPU.

The communication section 22 communicates with the monitoring cameras 1a to 1d and the terminal device 3. The communication section 22 may communicate with the monitoring cameras 1a to 1d and the terminal device 3 via a network cable such as an Ethernet cable. Furthermore, the communication section 22 may communicate with the monitoring cameras 1a to 1d and the terminal device 3 via short-range wireless communication, such as Wi-Fi or Bluetooth.

A program for operating the control section 21 is stored in the storage section 23. Furthermore, for example, data to be calculated by the control section 21 or data to be used by the control section 21 to control various sections are stored in the storage section 23. The storage section 23 may be composed of a storage device, such as RAM, ROM, flash memory or HDD.

Figure 5:
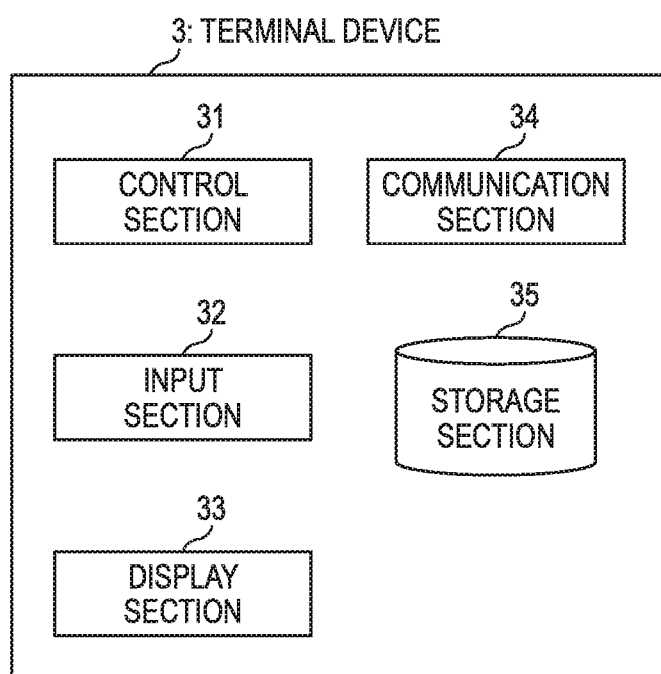
FIG. 5 is a view showing a block configuration example of a terminal device.

FIG. 5 is a view showing a block configuration example of the terminal device 3. As shown in FIG. 5, the terminal device 3 has a control section 31, an input section 32, a display section 33, a communication section 34 and a storage section 35.

The control section 31 controls the terminal device 3. The control section 31 may be composed of, for example, a CPU.

The input section 32 is connected to an input device (not shown), such as a keyboard, a touch panel laid on the screen of a display device, or a mouse. The input section 32 receives a signal that is output from the input device in response to the operation of the user and then outputs the signal to the control section 31.

The display section 33 is connected to the display device (not shown) provided in the terminal device 3. The display section 33 outputs the image data output from the control section 31 to the display device.

The detection of the entry of a person in the zones A and B is described below for the purpose of simplifying the description. As described referring to FIG. 1, the monitoring camera 1a is installed in the zone A, and the monitoring cameras 1b and 1c are installed in the zone B.

Figure 6:
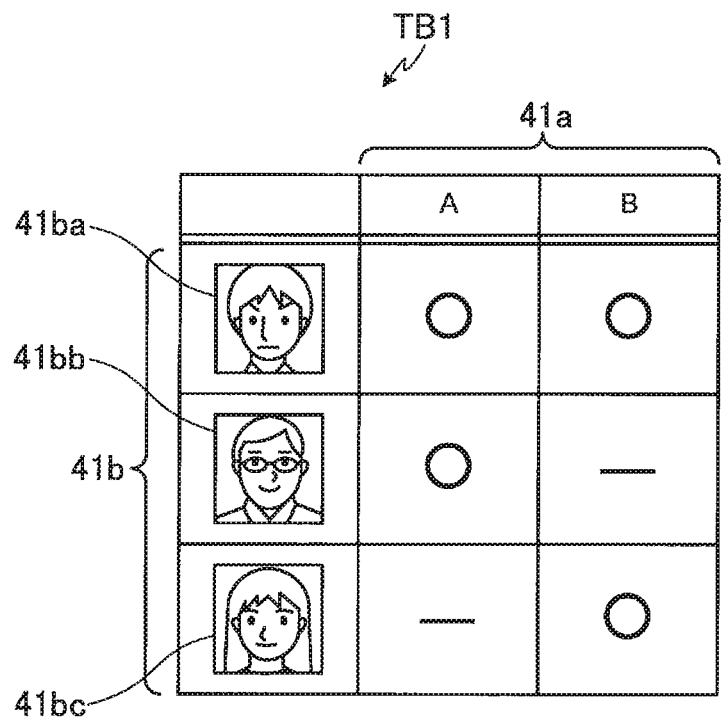
FIG. 6 is a view showing an example of a table stored in the storage section of the server.

FIG. 6 is a view showing an example of a table stored in the storage section 23 of the server 2. The table TB1 shown in FIG. 6 is stored in the storage section 23 of the server 2, for example, when the monitoring cameras 1a to 1d are installed in the building A1. The table TB1 may be generated using the terminal device 3 and stored in the storage section 23 of the server 2. Furthermore, the information in the table TB1 may be, for example, added, changed or deleted using the terminal device 3.

The table TB1 has zone identification information 41a and face data 41b. The zone identification information 41a is identification information for identifying the zones A and B. For example, "A" in the table TB1 indicates the identification information of the zone A. "B" in the table TB1 indicates the identification information of the zone B. The face data 41b is the face data of persons.

It may be possible to say that the information in the table TB1 is information indicating persons permitted to enter each zone. For example, the person corresponding to the face data 41b on the row with a round mark in the table TB1 can enter the zone indicated by the zone identification information 41a on the column with a round mark. Furthermore, the person corresponding to the face data 41b on the row with a bar mark in the table TB1 cannot enter the zone indicated by the zone identification information 41a on the column with a bar mark.

More specifically, the person corresponding to the face data 41ba in FIG. 6 can enter the zones A and B. The person corresponding to the face data 41bb in FIG. 6 can enter the zone A but cannot enter the zone B. The person corresponding to the face data 41bc in FIG. 6 cannot enter the zone A but can enter the zone B.

Figure 7:
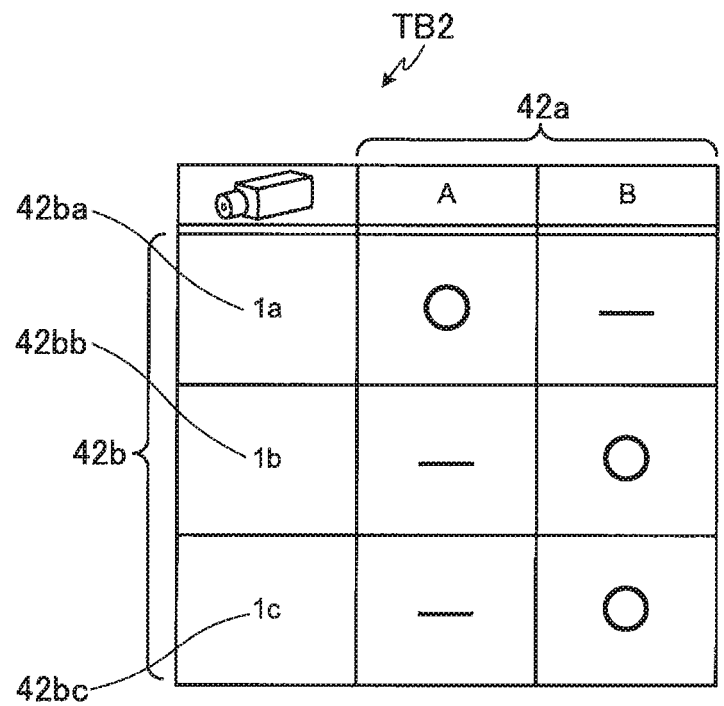
FIG. 7 is a view showing an example of another table stored in the storage section of the server.

FIG. 7 is a view showing an example of another table stored in the storage section 23 of the server 2. The table TB2 shown in FIG. 7 is stored in the storage section 23 of the server 2, for example, when the monitoring cameras 1a to 1d are installed in the building A1. The table TB2 may be generated using the terminal device 3 and stored in the storage section 23 of the server 2. Furthermore, the information in the table TB2 may be, for example, added, changed or deleted using the terminal device 3.

The table TB2 has zone identification information 42a and camera identification information 42b. The zone identification information 42a is identification information for identifying the zones. The camera identification information 42b is identification information for identifying the monitoring cameras 1a to 1c. For example, "1a" of the camera identification information 42b indicates the identification information of the monitoring camera 1a. "1b" of the camera identification information 42b indicates the identification information of the monitoring camera 1b. "1c" of the camera identification information 42b indicates the identification information of the monitoring camera 1c.

It may be possible to say that the information in the table TB2 is information indicating the installation places of the monitoring cameras 1a to 1c in the zones. For example, the monitoring camera corresponding to the camera identification information 42b on the row with a round mark in the table TB2 is installed in the zone indicated by the zone identification information 42a on the column with a round mark. Furthermore, the monitoring cameras corresponding to the camera identification information 42b on the row with a bar mark in the table TB2 is not installed in the zone indicated by the zone identification information 42a on the column with a bar mark.

More specifically, the monitoring camera 1a corresponding to the camera identification information 42ba in FIG. 7 is installed in the zone A. The monitoring camera 1b corresponding to the camera identification information 42bb in FIG. 7 is installed in the zone B. The monitoring camera 1c corresponding to the camera identification information 42bc in FIG. 7 is installed in the zone B.

Although the tables TB1 and TB2 are stored in the storage section 23 of the server 2 in FIGS. 6 and 7, it is not limited that the tables are stored in the storage section. Both or either one of the tables TB1 and TB2 may be stored in a database separate from the server 2. In the following descriptions, it is assumed that the table TB1 is stored in a registration DB (DB: database) and that the table TB2 is stored in the storage section 23 of the server 2. The registration DB may be regarded as part of the server 2.

FIG. 8 is a sequence diagram showing an operation example of the monitoring camera system. The control section 31 of the terminal device 3 performs the grouping setting of the zones A and B and the monitoring cameras 1a to 1c for the server 2 in response to the operation of the operator (at step S1). In other words, the control section 31 of the terminal device 3 performs setting for the server 2 so that the zones A and B are associated with the monitoring cameras 1a to 1c. Consequently, for example, the table TB2 shown in FIG. 7 is stored in the storage section 23 of the server 2.

The control section 31 of the terminal device 3 performs face registration to the zones A and B for the registration DB in response to the operation of the operator (at steps S2a and S2b). In other words, the control section 31 of the terminal device 3 performs setting for the registration DB so that the zones A and B are associated with the face data of persons capable of entering the zones A and B. Consequently, for example, the table TB1 shown in FIG. 6 is stored in the registration DB. The information registration of the registration DB is performed via the server 2. Furthermore, the control section 31 of the terminal device 3 may acquire the face data to be registered in the registration DB from the face database of other systems.

It is assumed that the photographing section 11 of the monitoring camera 1a in the zone A has photographed a person. The control section 12 of the monitoring camera 1a cuts out the face image of the person from the image photographed by the photographing section 11 and transmits the face data of the cut-out face image and the camera identification information of the monitoring camera 1a to the server 2 (at step S3).

The control section 21 of the server 2 receives the face data and the camera identification information of the monitoring camera 1a transmitted at step S3 (at step S4).

The control section 21 of the server 2 refers to the table TB2 of the storage section 23 and acquires the zone identification information corresponding to the camera identification information received at step S4 (at step S5).

In the example shown in FIG. 8, the control section 21 of the server 2 receives the camera identification information "1a" of the monitoring camera 1a at step S4. Hence, the control section 21 of the server 2 acquires the zone identification information "A" of the zone A from the table TB2 shown in FIG. 7. Consequently, the control section 21 of the server 2 can specify (determine) that the face data 51 received at step S4 has been photographed by the monitoring camera 1a installed in the zone A. In other words, the control section 21 of the server 2 can specify that the person corresponding to the face data 51 received at step S4 is present in the zone A.

After specifying the zone at step S5, the control section 21 of the server 2 refers to the table TB1 of the registration DB and acquires the face data corresponding to the specified zone. Furthermore, the control section 21 of the server 2 collates the face data acquired from the table TB2 with the face data received at step S4 (at step S6).

In the example shown in FIG. 8, the control section 21 of the server 2 specifies that the person corresponding to the face data 51 is present in the zone A at step S5. Hence, the control section 21 of the server 2 collates the face data 41ba and 41bb corresponding to the zone A of the table TB1 shown in FIG. 6 with the face data 51 received at step S4. Since the face data 51 coincides with the face data 41ba corresponding to the zone A of the table TB1 shown in FIG. 6, the control section 21 of the server 2 determines that face collation matching is attained. In other words, the control section 21 of the server 2 determines that the person corresponding to the face data 51 is a person permitted to enter the zone A.

The control section 21 of the server 2 transmits the collation result (face collation OK) obtained at step S6 to the terminal device 3 (at step S7). In the case that the control section 21 of the server 2 has determined that the face collation is OK, the control section 21 does not have to transmit the collation result to the terminal device 3. In other words, the control section 21 of the server 2 may transmit the collation result to the terminal device 3 only in the case that the control section 21 has determined that the face collation is NG. Moreover, upon receiving the collation result (face collation OK), the control section 31 of the terminal device 3 may display the collation result on the display device at step S7 of FIG. 8.

It is assumed that the photographing section 11 of the monitoring camera 1a in the zone A has photographed a person. The control section 12 of the monitoring camera 1a cuts out the face image of the person from the image photographed by the photographing section 11 and transmits the face data of the cut-out face image and the camera identification information of the monitoring camera 1a to the server 2 (at step S8).

The control section 21 of the server 2 receives the face data and the camera identification information of the monitoring camera 1a transmitted at step S8 (at step S9).

The control section 21 of the server 2 refers to the table TB2 of the storage section 23 and acquires the zone identification information corresponding to the camera identification information received at step S9 (at step S10).

In the example shown in FIG. 8, the control section 21 of the server 2 receives the camera identification information "1a" of the monitoring camera 1a at step S9. Hence, the control section 21 of the server 2 acquires the zone identification information "A" of the zone A from the table TB2 shown in FIG. 7. Consequently, the control section 21 of the server 2 can specify that the face data 52 received at step S9 has been photographed by the monitoring camera 1a installed in the zone A. In other words, the control section 21 of the server 2 can specify that the person corresponding to the face data 52 received at step S9 is present in the zone A.

After specifying the zone at step S10, the control section 21 of the server 2 refers to the table TB1 of the registration DB and acquires the face data corresponding to the specified zone. Furthermore, the control section 21 of the server 2 collates the face data acquired from the table TB2 with the face data received at step S9 (at step S11).

In the example shown in FIG. 8, the control section 21 of the server 2 specifies that the person corresponding to the face data 52 is present in the zone A at step S10. Hence, the control section 21 of the server 2 collates the face data 41aa and 41bb corresponding to the zone A shown in FIG. 6 with the face data 52 received at step S9. Since the face data 52 does not coincide with either the face data 41ba or 41bb corresponding to the zone A shown in FIG. 6, the control section 21 of the server 2 determines that face collation matching is not attained. In other words, the control section 21 of the server 2 determines that the person corresponding to the face data 52 is a person not permitted to enter the zone A.

The control section 21 of the server 2 transmits the collation result (face collation NG) obtained at step S11 to the terminal device 3 (at step S12). The control section 31 of the terminal device 3 receives the collation result (face collation NG) and displays, for example, an alert on the display device. The control section 21 of the server 2 may transmit the collation result obtained at step S11 to, for example, a sound output device, such as a speaker, installed in the zone A. Upon receiving the collation result obtained at step S11, the sound output device installed in the zone A may output alarm sound or the like.

As described above, the communication section 22 of the server 2 receives face image data from the plurality of cameras 1a to 1c photographing the plurality of zones A to C of the building A1. The control section 21 collates the face image data received by the communication section 22 with the registered face image data of persons permitted to enter the zones and determines whether the person corresponding to the face image data photographed in a zone is permitted to enter the zone or not. Consequently, the server 2 can determine whether a person other than the persons determined to be permitted to enter each of the zones A to C has entered each of the zones A to C.

What's more, the server 2 collects the images photographed by the plurality of monitoring cameras 1a to 1d and determines the entry of persons into each zone of the building A1. Consequently, the user who uses the monitoring camera system may merely set the entry of persons into each zone of the building A1 for the server 2, whereby the zone setting is made easy.

Modification Example

Although a method in which the face image of a person is cut out using each of the monitoring cameras 1a to 1d and the face data is transmitted to the server 2 is described above, the method is not limited to this. Each of the monitoring cameras 1a to 1d may transmit the image data of a zone to the server 2 and the server 2 may detect the face image of a person and may cut out the face image of the person. In this case, it may be assumed that face data is included in the image data transmitted from each of the monitoring cameras 1a to 1d to the server 2.

Second Embodiment

In a second embodiment, a time period in which a person is permitted to enter a zone is determined. In the following descriptions, portions different from those in the first embodiment will be described below.

Figure 9:
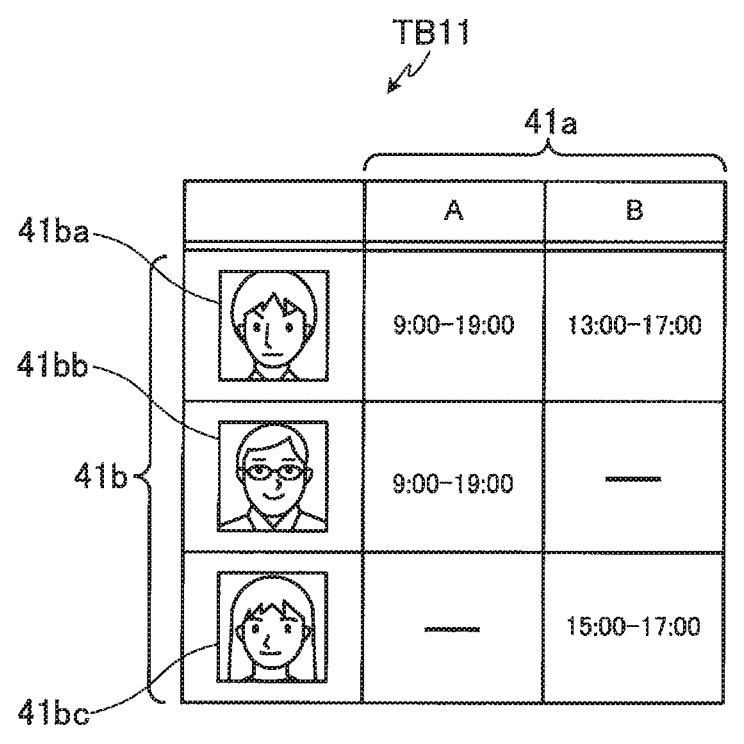

FIG. 9 is a view showing an example of a table stored in the storage section 23 of the server 2 according to the second embodiment. The table TB11 shown in FIG. 9 is stored in the storage section 23 of the server 2, for example, when the monitoring cameras 1a to 1c are installed in the building A1. The table TB11 may be generated using the terminal device 3 and stored in the storage section 23 of the server 2. The information in the table TB11 may be, for example, added, changed or deleted using the terminal device 3.

Like the table TB1 described referring to FIG. 6, the TB11 has zone identification information 41a and face data 41b. It may be possible to say that the information in the table TB11 is information indicating a person permitted to enter each zone and also indicating a time period in which the person may stay in the zone. For example, the time period indicated in the table TB11 indicates the time period in which the person corresponding to the face data 41b on the row of the time period can enter the zone indicated by the zone identification information 41a on the column of the time period.

More specifically, the person corresponding to the face data 41ba in FIG. 9 can enter the zone A in a time period from 9:00 to 19:00. The person corresponding to the face data 41ba in FIG. 9 can enter the zone B in a time period from 13:00 to 17:00. The person corresponding to the face data 41bb in FIG. 9 can enter the zone A in a time period from 9:00 to 19:00. The person corresponding to the face data 41bb in FIG. 9 cannot enter the zone B during the entire day. The person corresponding to the face data 41bc in FIG. 9 cannot enter the zone A during the entire day. The person corresponding to the face data 41bc in FIG. 9 can enter the zone B in a time period from 15:00 to 17:00.

In the above description, although the tables TB11 is stored in the storage section 23 of the server 2, it is not limited that the table TB11 is stored in the storage section. The table TB11 may be stored in the registration DB.

The operation of the server 2 according to the second embodiment is different from the operation according to the first embodiment in the face collation process at step S6 described referring to FIG. 8. In the face collation process at step S6, the control section 21 of the server 2 determines a time period in which the person corresponding to the face data 51 received at step S4 may be present in a zone.

For example, the control section 21 of the server 2 specifies that the person corresponding to the face data 51 is present in the zone A at step S5. Hence, the control section 21 of the server 2 collates the face data 41ba and 41bb corresponding to the zone A shown in FIG. 9 with the face data 51 received at step S4. Since the face data 51 coincides with the face data 41ba corresponding to the zone A shown in FIG. 9, the control section 21 of the server 2 determines the time period (from 9:00 to 19:00) in which the person corresponding to the face data 51 collation-matched with the face data 41ba may be present in the zone A. In the case that the current time is between 9:00 and 19:00, the control section 21 of the server 2 determines that the face collation is OK. On the other hand, in the case that the current time is not between 9:00 and 19:00, the control section 21 of the server 2 determines that the face collation is NG.

As described above, in the zone in which the person corresponding to the face image data is photographed, the control section 21 of the server 2 determines whether the current time is in the time period in which the person corresponding to the face image data is permitted to enter the zone by using the face image data and the current time. Consequently, the server 2 can determine whether persons other than the persons permitted to enter each of the zones A to C have entered each of the zones A to C.

Modification Example

The registration of the face data and the time period of the person permitted to stay in each zone may be stored in the server 2 or the registration DB using a device other than the terminal device 3.

Figure 10:
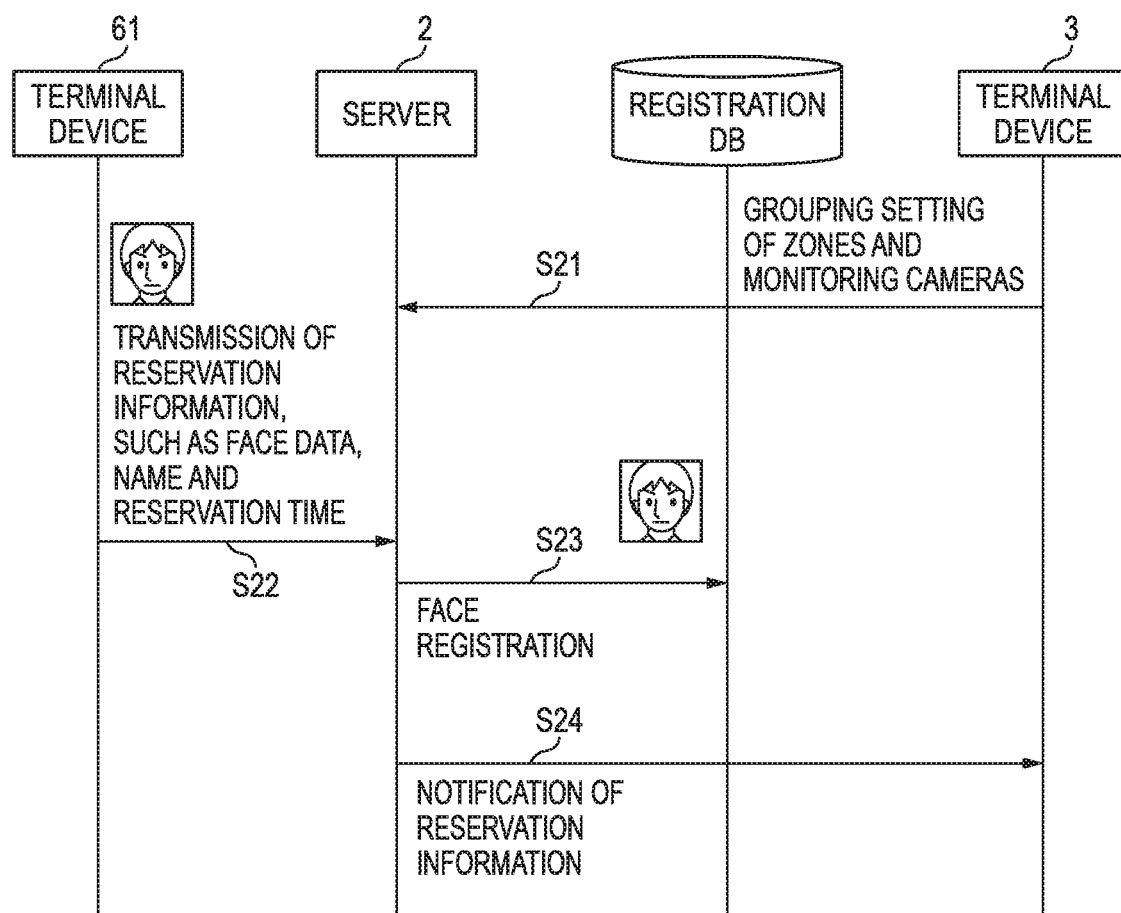
FIG. 10 is a sequence diagram showing an operation example of the monitoring camera system in the case that face data and time are registered.

FIG. 10 is a sequence diagram showing an operation example of the monitoring camera system in the case that face data and time are registered. The terminal device 61 shown in FIG. 10 is a terminal that is used by a person who reserves a zone in a facility in which zones are set, such as a movie theater, a restaurant, a condominium, an office or a concert hall. A person who reserves a zone in a facility registers his/her face data and the time when the person enters the zone using the terminal device 61. The terminal device 3 shown in FIG. 10 is managed by the manager of the facility, such as the movie theater, the restaurant, the condominium, the office or the concert hall.

The terminal device 61 may be, for example, a smart phone, a tablet terminal, a personal computer or the like. An application for registering face data and time in the server 2 or the registration DB may be loaded in the terminal device 61. The application may be provided by the manager of each facility. The terminal device 61 has a block configuration similar to the block configuration shown in FIG. 5.

The sequence shown in FIG. 10 will be described below. In FIG. 10, the monitoring cameras 1a to 1d installed in the facility are not shown.

The control section 31 of the terminal device 3 performs the grouping setting of the zones A and B and the monitoring cameras 1a to 1c for the server 2 in response to the operation of the operator (at step S21). In other words, the control section 31 of the terminal device 3 performs setting for the server 2 so that the zones A and B are associated with the monitoring cameras 1a to 1c. Consequently, for example, the table TB2 shown in FIG. 7 is stored in the storage section 23 of the server 2.

A person who reserves a zone in a facility in which zones are set (for example, a person who reserves a seat in a movie theater) inputs, for example, to the terminal device 61, reservation information, such as the face data, the name of the person who uses the facility, information relating to the zone to be used (for example, the name of the auditorium in which a movie is shown) and the time when the person enters the zone. The terminal device 61 transmits the input reservation information to the server 2 (at step S22).

On the basis of the reservation information transmitted from the terminal device 61, the control section 21 of the server 2 performs face registration in the registration DB (at step S23). In other words, the control section 21 of the server 2 generates the table TB11 shown in FIG. 9 in the registration DB. However, the control section 21 of the server 2 may generate the table TB11 in the storage section 23.

The control section 21 of the server 2 transmits the reservation information received at step S22 to the terminal device 3 (at step S24). The manager of the terminal device 3 can grasp the reservation content of the person who uses the zone in the facility according to the reservation information received by the terminal device 3.

In this way, a person who uses a zone of a facility in which zones are set may set the face data and the time when the person enters the zone in the server 2 or the registration DB using the terminal device 61.

Furthermore, for example, a person who reserves a zone in a restaurant may register his/her face data and the reservation time in the server 2 or the registration DB using the terminal device 61 when the person reserves the zone in the restaurant. The zone may be set for each room where the meals of the restaurant are served.

Still further, for example, a resident of a condominium may register the face data and the visit time of a visitor in the server 2 or the registration DB using the terminal device 61. The zone which the visitor enters may be set for each entrance or each floor of the condominium.

Moreover, for example, an employee of an office may register the face data and the visit time of a visitor in the server 2 or the registration DB using the terminal device 61. The zone which the visitor enters may be set for each entrance, each floor or each room of the office.

What's more, for example, a person who reserves a ticket for a concert may set, for example, his/her face data and the time period in which the person watches the concert, in the server 2 or the registration DB using the terminal device 61 at the time when the person reserves the ticket for the concert. The zone may be set for each grade of the seat or each box in the concert hall.

Third Embodiment

In a company or the like, zones where employees can enter are classified depending on the cards they possess in some cases. For example, although an employee can enter a certain room when he/she holds his/her card over the card reader provided at the entrance of the room, another employee cannot enter the room even if he/she holds his/her card over the card reader. In the third embodiment, face data is registered using the card information of this kind of card.

Figure 11:
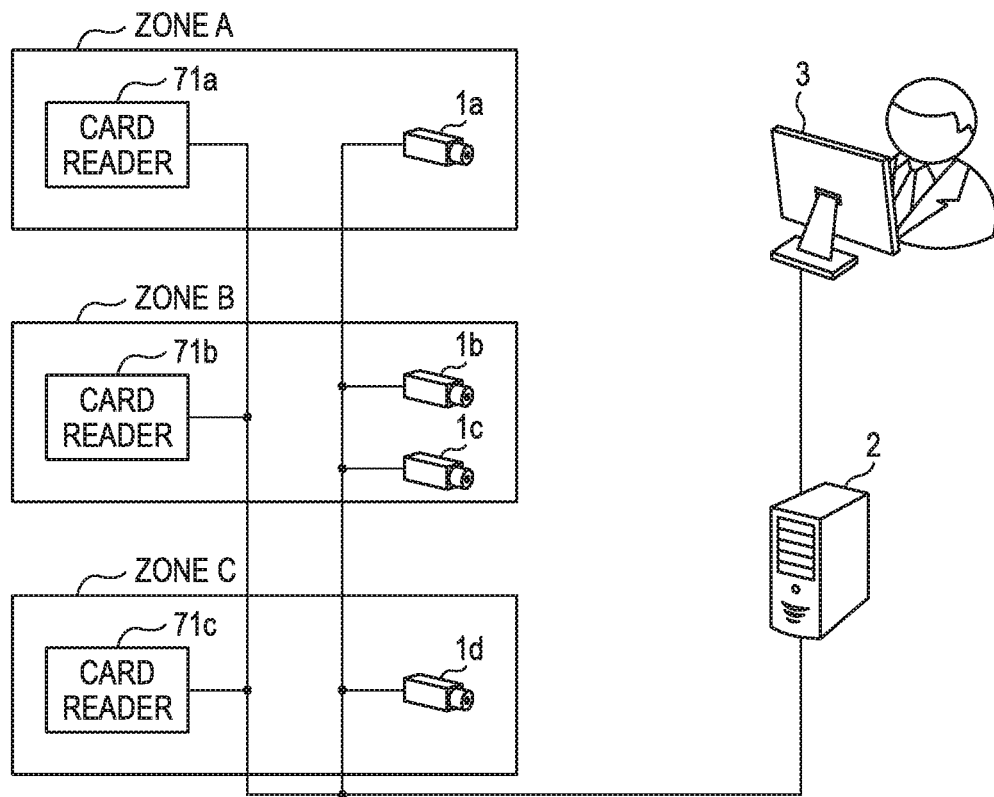
FIG. 11 is a view showing an example of a monitoring camera system according to a third embodiment.

FIG. 11 is a view showing an example of a monitoring camera system according to the third embodiment. In FIG. 11, the components identical to those shown in FIG. 1 are designated by the same reference numerals and signs. In FIG. 11, the building A1 is not shown.

The monitoring camera system shown in FIG. 11 is configured such that card readers 71a to 71c are provided in the monitoring camera system shown in FIG. 1.

The card reader 71a is installed, for example, on a side of the entrance door of the zone A. The zone identification information of the zone A is associated with the card reader 71a.

The card reader 71b is installed, for example, on a side of the entrance door of the zone B. The zone identification information of the zone B is associated with the card reader 71b.

The card reader 71c is installed, for example, on a side of the entrance door of the zone C. The zone identification information of the zone C is associated with the card reader 71c.

The card reader 71a performs, for example, short-range wireless communication with the card possessed by an employee. The card reader 71a reads information from the card held over the card reader 71a and determines whether the person possessing the card is an employee who can enter the zone A. Like the card reader 71a, each of the card readers 71b and 71c reads information from the card held over the card reader and determine whether the person possessing the card is an employee who can enter each of the zones B and C.

In the case that the card reader 71a has determined that the person possessing the card is a person who can enter the zone A according to the information read from the card, the card reader 71a unlocks the entrance door of the zone A. On the other hand, in the case that the card reader 71a has determined that the person possessing the card is a person who cannot enter the zone A according to the information read from the card, the card reader 71a does not unlock the entrance door of the zone A. Like the card reader 71a, each of the card readers 71b and 71c controls the unlocking of the entrance door of each of the zones B and C according to the information read from the card.

The face photograph of an employee is attached to the card possessed by the employee. The card reader 71a is equipped with a camera. In the case that the card reader 71a unlocks the entrance door of the zone A, the card reader 71a photographs the face photograph of the employee attached to the card (acquires the still image of the face photograph). After that, the card reader 71a transmits the face data of the photographed face photograph and the zone identification information of the zone A to the server 2. In other words, in the case that a person possessing a card can enter the zone A using the card, the face photograph attached to the card and the identification information of the zone A are associated with each other and transmitted to the server 2.

Like the card reader 71a, the card readers 71b and 71c are each equipped with a camera. In the case that each of the card readers 71b and 71c unlocks the entrance door of each of the zones B and C, each of the card readers 71b and 71c photographs the face photograph of the employee attached to the card. After that, each of the card reader 71b and 71c transmits the face data of the photographed face photograph and the zone identification information of each of the zones B and C to the server 2.

Figure 12:
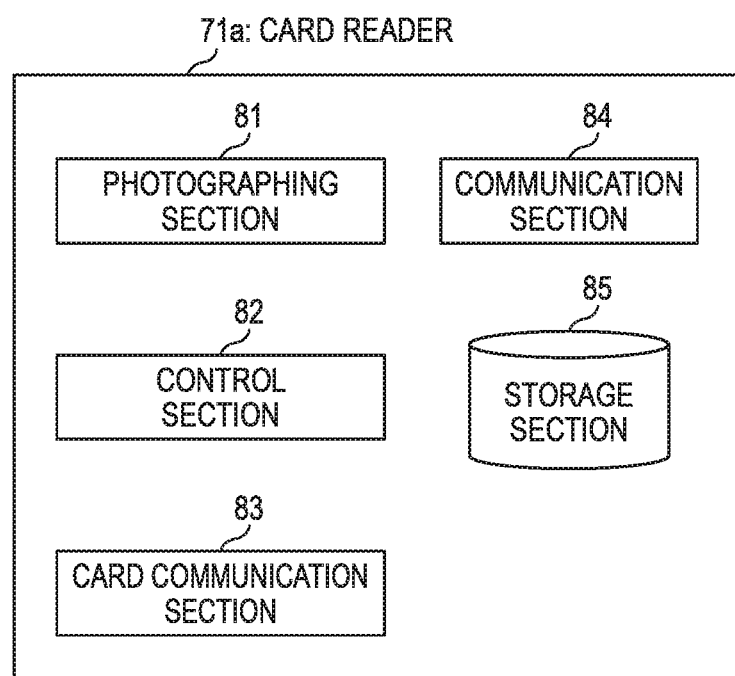
FIG. 12 is a view showing a block configuration example of a card reader.

FIG. 12 is a view showing a block configuration example of the card reader 71a. As shown in FIG. 12, the card reader 71a has an imaging section 81, a control section 82, a card communication section 83, a communication section 84 and a storage section 85.

The imaging section 81 has, for example, a lens and an imaging device (not shown). The lens of the imaging section 81 forms an image of a subject on the light-receiving face of the imaging device. Lenses having various focal distances or photographing ranges can be used, for example, depending on the installation place of the card reader 71a or the purpose of photographing.

The imaging device of the imaging section 81 converts the light received on the light-receiving face into an electrical signal. The imaging device is, for example, an image sensor, such as a CCD or a CMOS. The imaging section 81 converts the electrical signal (analog signal) corresponding to the light received on the light-receiving face of the imaging device into a digital signal and outputs the digital signal to the control section 82.

The control section 82 controls the entire card reader 71a. The control section 82 may be composed of, for example, a CPU or a DSP. The control section 82 discriminates the face image of a person from the image output from the imaging section 81. The control section 82 cuts out the discriminated face image of the person and then transmits the face data of the cut-out face image (still image) to the server 2 via the communication section 84.

The card communication section 83 performs short-range wireless communication with the card held over the card reader 71a.

The communication section 84 communicates with the server 2. The communication section 84 may communicate with the server 2, for example, via a network cable, such as an Ethernet cable. Furthermore, the communication section 84 may communicate with the server 2, for example, via short-range wireless communication, such as Wi-Fi or Bluetooth.

A program for operating the control section 82 is stored in the storage section 85. Furthermore, for example, data to be calculated by the control section 82 or data to be used by the control section 82 to control the various sections are stored in the storage section 85. The storage section 85 may be composed of a storage device, such as RAM, ROM, flash memory or HDD.

The detection of the entry of a person in the zones A and B is described below for the purpose of simplifying the description.

Figure 13:
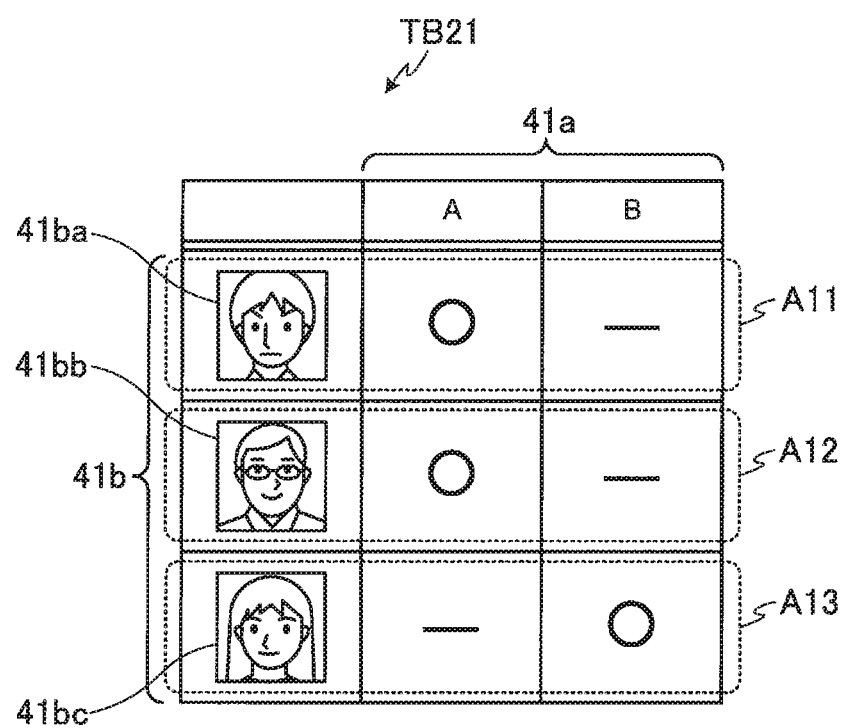
FIG. 13 is a view showing an example of a table stored in the storage section of the server.

FIG. 13 is a view showing an example of a table stored in the storage section 23 of the server 2. Like the table TB1 described referring to FIG. 6, a table TB21 has zone identification information 41a and face data 41b.

The table TB21 shown in FIG. 13 is generated on the basis of the face data transmitted from the card readers 71a to 71c and the zone identification information. As described above, the face data and the zone identification information are transmitted from the card readers 71a and 71b in the case that a person has succeeded to enter the zones A and B. Hence, it is possible to say that the information in the table TB21 is information indicating persons having succeeded to enter the zones A and B.

For example, it is assumed that a person has entered the zone A using the card to which the face photograph of the face data 41ba is attached. In this case, the server 2 receives the face data 41ba and zone identification information A from the card reader 71a installed at the entrance of the zone A. Consequently, the information shown in a dotted frame A11 is registered in the table TB21 shown in FIG. 13.

Furthermore, it is assumed that a person has entered the zone A using the card to which the face photograph of the face data 41*bb* is attached. In this case, the server 2 receives the face data 41*bb* and the zone identification information A from the card reader 71*a* installed at the entrance of the zone A. Consequently, the information shown in a dotted frame A12 is registered in the table TB21 shown in FIG. 13.

Moreover, it is assumed that a person has entered the zone B using the card to which the face photograph of the face data 41*bc* is attached. In this case, the server 2 receives the face data 41*bc* and the zone identification information B from the card reader 71*b* installed at the entrance of the zone B. Consequently, the information shown in a dotted frame A13 is registered in the table TB21 shown in FIG. 13.

In FIG. 13, although it is assumed that the table TB21 is stored in the storage section 23 of the server 2, the table TB21 is not limited to be stored in the storage section 23. The table TB21 may be stored in the registration DB. In the following descriptions, it is assumed that the table TB21 is stored in the registration DB.

Figure 14:
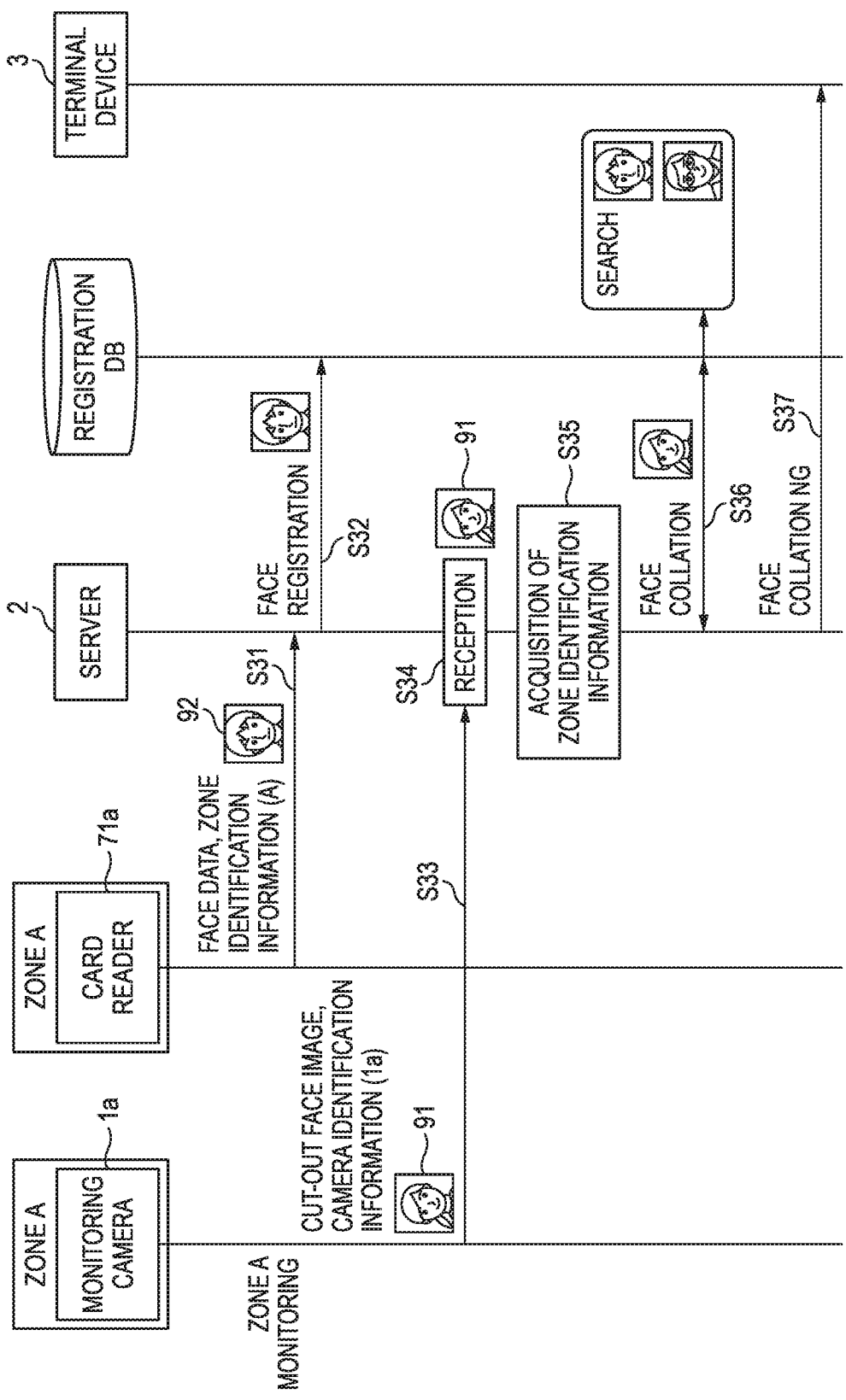
FIG. 14 is a sequence diagram showing an operation example of the monitoring camera system.

FIG. 14 is a sequence diagram showing an operation example of the monitoring camera system. In FIG. 14, it is assumed that the grouping setting (for example, the process at step S1 of FIG. 8) of the zones A and B and the monitoring cameras 1*a* to 1*c* has been completed. In other words, it is assumed that the table TB2 shown in FIG. 7 has been stored in the storage section 23 of the server 2. In FIG. 14, the descriptions of the processes performed by the monitoring cameras 1*b* and 1*c* and the card reader 71*b* installed in the zone B are omitted.

[0117]

The card reader 71*a* acquires the card information of the card held over the card reader. On the basis of the acquired card information, the card reader 71*a* unlocks the entrance door of the zone A and photographs the card held over the card reader. The control section 82 of the card reader 71*a* cuts out the face photograph attached to the card from the photographed card and transmits the face data of the cut-out face photograph and the zone identification information of the zone A to the server 2 (at step S31).

On the basis of the information transmitted at step S31, the control section 21 of the server 2 performs face registration in the registration DB (at step S32). For example, the control section 21 of the server 2 registers the information included in the dotted frame A11 shown in FIG. 13 in the table TB21 of the registration DB.

It is herein assumed that a card held over the card reader 71*a* is a stolen card at step S31. For example, it is assumed that the person corresponding to the face data 91 shown in FIG. 14 pretends to be the person corresponding to the face data 92 shown in FIG. 14 and has entered the zone A using the stolen card.

It is assumed that the photographing section 11 of the monitoring cameras 1*a* in the zone A has photographed the person (the person corresponding to the face data 91). The control section 12 of the monitoring camera 1*a* cuts out the face image of the person from the image photographed by the photographing section 11 and transmits the face data of the cut-out face image and the camera identification information of the monitoring camera 1*a* to the server 2 (at step S33).

The control section 21 of the server 2 receives the face data and the camera identification information of the monitoring camera 1*a* transmitted at step S33 (at step S34).

The control section 21 of the server 2 refer to the table TB2 of the storage section 23 and acquires the zone identification information corresponding to the camera identification information received at step S34 (at step S35).

In the example shown in FIG. 14, the control section 21 of the server 2 has received the camera identification information "1*a*" of the monitoring camera 1*a* at step S33. Hence, the control section 21 of the server 2 acquires the zone identification information "A" of the zone A from the table TB2 shown in FIG. 7. Consequently, the control section 21 of the server 2 can specify that the face data 91 received at step S34 is the face data photographed by the monitoring camera 1*a* installed in the zone A. In other words, the control section 21 of the server 2 can specify that the person corresponding to the face data 91 received at step S34 is present in the zone A.

After specifying the zone at step S35, the control section 21 of the server 2 refers to the table TB21 of the registration DB and acquires the face data corresponding to the specified zone. After that, the control section 21 of the server 2 collates the face data acquired from the table TB21 with the face data received at step S34 (at step S36).

In the example shown in FIG. 14, the control section 21 of the server 2 specifies that the person corresponding to the face data 91 is present in the zone A at step S35. Hence, the control section 21 of the server 2 collates the face data 41*ba* and 41*bb* corresponding to the zone A of the table TB21 shown in FIG. 13 with the face data 91 received at step S34. Since the face data 91 does not coincide with either the face data 41*ba* or 41*bb* corresponding to the zone A shown in FIG. 13, the control section 21 of the server 2 determines that face collation matching is not attained. In other words, the control section 21 of the server 2 determines that the person corresponding to the face data 91 is a person who is not permitted to enter the zone A.

The control section 21 of the server 2 transmits the collation result obtained at step S36 to the terminal device 3 (at step S37). The control section 31 of the terminal device 3 receives the collation result (face collation NG) and displays, for example, an alert on the display device display.

As described above, the communication section 22 of the server 2 receives the face image data of the face photograph attached to a card from each of the card readers 71*a* to 71*c* installed so as to respectively correspond to the plurality of zones A to C. The control section 21 of the server 2 stores the received face image data as the face data of the table TB21. Consequently, the server 2 can determine whether persons other than those permitted to enter each of the zones A to C have entered the zones A to C.

Modification Example 1

Although it is assumed that each of the card readers 71*a* to 71*c* photographs the face photograph attached to a card and transmits the face data of the face photograph to the server 2, the face data is not limited to be obtained from the face photograph attached to the card. For example, an IC (Integrated Circuit) may be mounted on the card. The face data of an employee possessing a card may be stored in the IC. Each of the card readers 71*a* to 71*c* may acquire the face data from the IC mounted on the card and may transmit the face data to the server 2.

Modification Example 2

Each of the card readers 71*a* to 71*c* may transmit the name or the card identification information of the card having been read from the card to the server 2. After receiving the name or the card identification information transmitted from each of the card readers 71*a* to 71*c*, the control section 21 of the server 2 may receive the face data corresponding to the name or the card identification information from the server managing the card information. After that, the control section 21 of the server 2 may generate the table TB21 shown in FIG. 13 on the basis of the received face data and the zone identification information received from each of the card readers 71*a* to 71*c*. The face data of persons possessing the cards and the names or the card identification information are associated with each other and stored in the server managing the card information.

Modification Example 3

Although an example in which the monitoring camera system including the card readers 71*a* to 71*c* is installed in a company has been described above, the monitoring camera system is not limited to be installed in companies. The monitoring camera system including the card readers 71*a* to 71*c* may be installed in condominiums, commercial facilities or the like.

Fourth Embodiment

In a fourth embodiment, a case in which a person entry monitoring condition is different in each zone will be described. For example, a monitoring camera system determines the entry of a person using a blacklist system in a certain zone but determines the entry of a person using a whitelist system in another zone.

Figure 15:
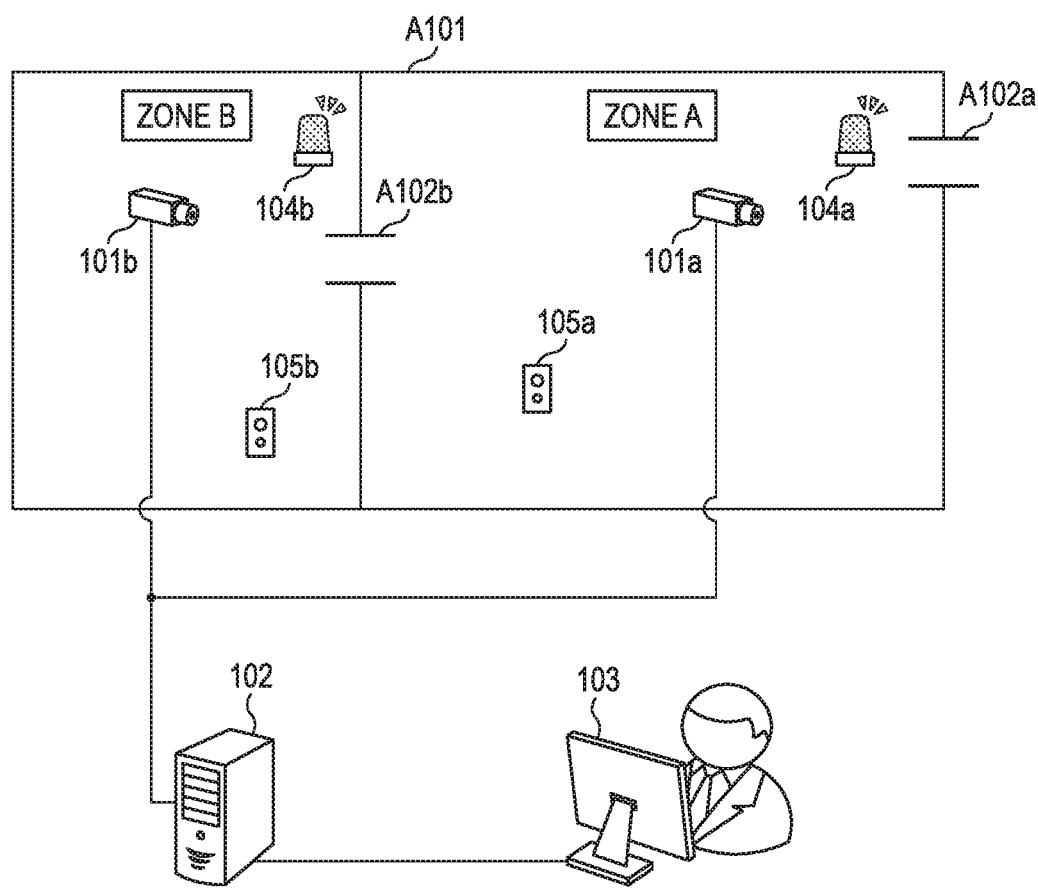
FIG. 15 is a view showing an example of a monitoring camera system according to a fourth embodiment.

FIG. 15 is a view showing an example of a monitoring camera system according to the fourth embodiment. As shown in FIG. 15, the monitoring camera system has monitoring cameras 101*a* and 101*b*, a server 102, a terminal device 103, and alarm devices 104*a*, 104*b*, 105*a* and 105*b*. FIG. 15 also shows a plan view of the interior of a building A101 in addition to the monitoring camera system.

The building A101 has zones A and B. The zones A and B are adjacent to each other. The building A101 has, for example, an entrance A102*a* to the zone A from the outside of the building A101 and an entrance A102*b* to the zone B via the zone A. Persons can enter the zone B by passing through the zone A.

The building A101 is used as a store, such as a supermarket or a convenience store. The zone A of the building A101 is, for example, a place where commodities are sold. The zone B is a backyard where commodities are stocked or processed.

The monitoring camera 101*a* is installed in the zone A of the building A101. The monitoring camera 101*b* is installed in the zone B of the building A101.

The monitoring cameras 101*a* and 101*b* are installed in the building A101 so as to photograph persons present in the zones A and B, respectively. For example, the monitoring camera 101*a* is installed on, for example, the ceiling or wall in the zone A so as to photograph the entire zone A. The monitoring cameras 101*b* is installed on, for example, the ceiling or wall in the zone B so as to photograph the entire inside of the zone B.

The server 102 is connected to the monitoring cameras 101*a* and 101*b* via a network, such as a LAN or the Internet. The server 102 may be installed inside the building A101 or may be installed in a place different from the building A101.

The server 102 has stored (registered) the face data of persons incapable of entering the zone A and persons capable of entering the zone B. In other words, the server 102 has a blacklist of persons incapable of entering the zone A and a whitelist of persons capable of entering the zone B. The server 102 collates the face data of the persons photographed by the monitoring cameras 101*a* and 101*b* with the registered face data. The server 102 transmits the collation results to the terminal device 103 and the alarm devices 104*a*, 104*b*, 105*a* and 105*b*.

The terminal device 103 is connected to the server 102 via a network, such as a LAN or the Internet. The terminal device 103 may be installed inside the building A101 or may be installed in a place different from the building A101. The terminal device 103 may be, for example, a personal computer, a smart phone, a tablet terminal or the like.

The alarm devices 104*a* and 104*b* receive an alarm signal output from the server 102. The alarm devices 104*a* and 104*b* are, for example, alarm lamps. Upon receiving the alarm signal, the alarm devices 104*a* and 104*b* emit light. The alarm device 104*a* is installed in the zone A and the alarm device 104*b* is installed in the zone B.

The alarm devices 105*a* and 105*b* receive the alarm signal output from the server 102 through wireless communication. The alarm devices 105*a* and 105*b* are, for example, mobile alarm devices possessed by the staff members of the building A101. Upon receiving the alarm signal, the alarm devices 105*a* and 105*b* vibrate. Furthermore, the alarm devices 105*a* and 105*b* may emit light or output sound. In FIG. 15, although the alarm device 105*a* is placed in the zone A and the alarm device 105*b* is placed in the zone B, the positions are not limited to these positions. The positions of the alarm devices 105*a* and 105*b* change depending on the movement of the staff members possessing the alarm devices 105*a* and 105*b*.

The monitoring camera 101*a* and 101*b* may be installed so as to photograph persons entering the zones A and B, respectively. For example, the monitoring camera 101*a* may be installed so as to photograph the area near the entrance A102*a* of the zone A. The monitoring camera 101*b* may be installed so as to photograph the region near the entrance A102*b* of the zone B.

Furthermore, a plurality of monitoring cameras may be installed in each of the zones A and B. In each of the zones A and B, a plurality of monitoring cameras may be installed so as to photograph persons present in each of the zones A and B.

Moreover, the monitoring cameras having already been installed in the zones A and B may be used as the monitoring cameras 101*a* and 101*b*. For example, the monitoring cameras having already been installed in the zones A and B as part of an image recording system for recording the images of the zones A and B may be used as the monitoring cameras 101*a* and 101*b*. In this case, the outputs of the monitoring cameras 101*a* and 101*b* may be branched to the image recording system and the server 022.

What's more, the number of the zones is not limited to two. The number of the zones may be three or more. The monitoring camera installed in each of the three or more zones is connected to the server 102. The server 102 determines the entry of persons into each zone using either the blacklist or the whitelist.

Still further, the monitoring camera system may be equipped with a recorder for recording the image data photographed by the monitoring cameras 101*a* and 101*b*. The monitoring camera system may be equipped with a monitoring device for displaying the image data photographed by the monitoring cameras 101*a* and 101*b* in real time. The monitoring device may be, for example, a personal computer, a smart phone, a tablet terminal or the like.

Yet still further, since each of the monitoring cameras 101a and 101b has a configuration similar to that of the monitoring camera 1a described referring to FIG. 3, the description thereof is omitted. Since the server 102 has a configuration similar to that of the server 2 described referring to FIG. 4, the description thereof is omitted. Since the terminal device 103 has a configuration similar to that of the terminal device 3 described referring to FIG. 5, the description thereof is omitted.

In the following descriptions, the building A101 is described as a store.

Figure 16:
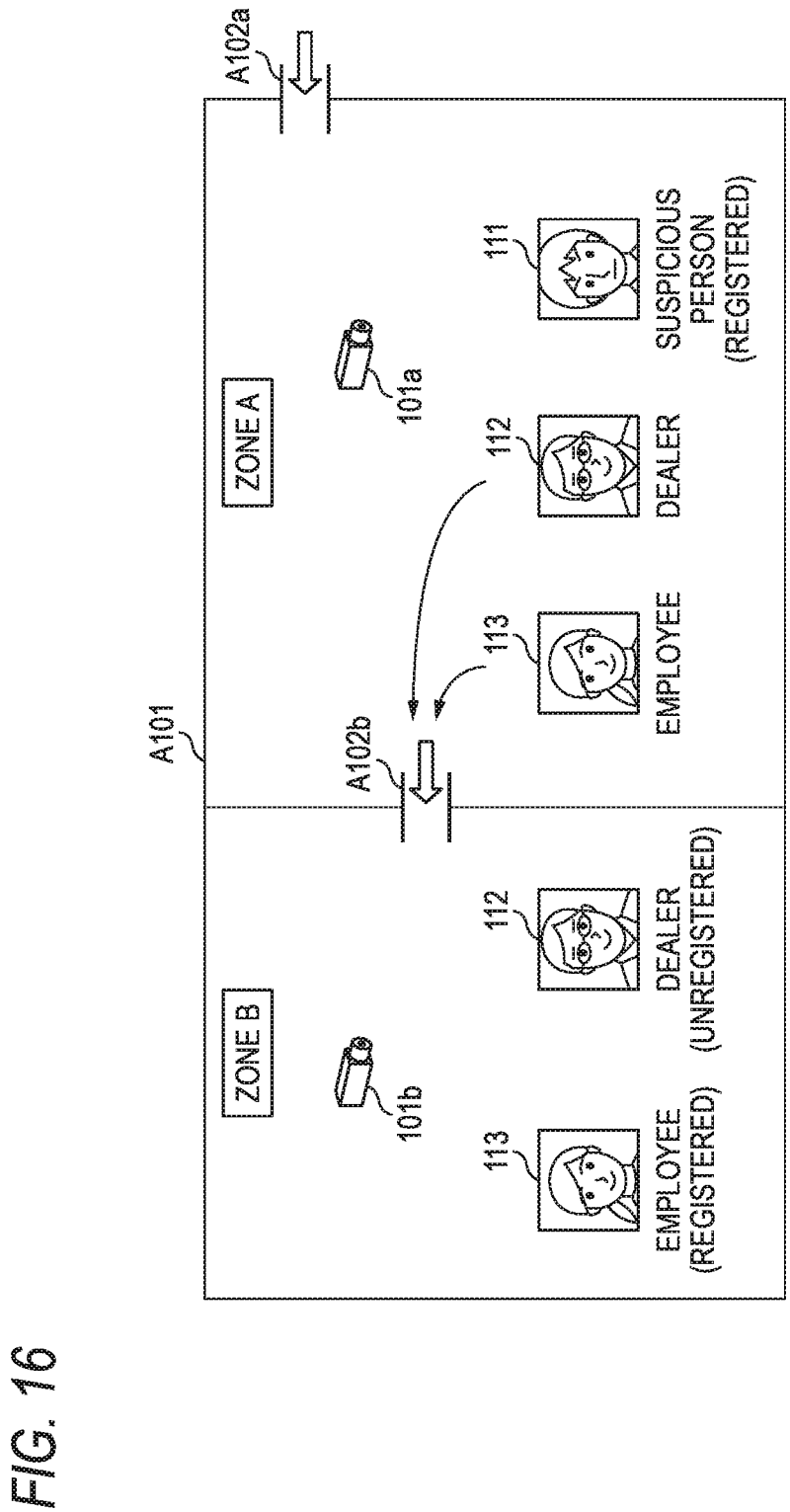
FIG. 16 is a view illustrating the outline operation of the monitoring camera system.

FIG. 16 is a view illustrating the outline operation of the monitoring camera system. In FIG. 16, the components identical to those shown in FIG. 15 are designated by the same reference numerals and signs. FIG. 16 shows the face data 111 to 113 of persons.

The face data 111 is, for example, the face data of a suspicious person, such as a person suspected to have shoplifted or a person having shoplifted in the past. When the suspicious person enters the zone A used as a commodity selling area, the entry is notified to the terminal device 3 and the alarm devices 104a, 104b, 105a and 105b (the alarm signal is output). Consequently, for example, the employees of the store can recognize that the suspicious person has appeared in the zone A used as the commodity selling area and can monitor the suspicious person. Also, when the suspicious person enters the zone B used as the backyard, the entry is notified to the terminal device 103 and the alarm devices 104a, 104b, 105a and 105b.

The face data 112 is the face data of a dealer having a business relationship with the store. When the dealer enters the zone A used as the commodity selling area, the entry is not notified to the terminal device 103 and the alarm devices 104a, 104b, 105a and 105b. However, when the dealer enters the zone B, the entry is notified to the terminal device 3 and the alarm devices 104a, 104b, 105a and 105b. Consequently, for example, the employees of the store can recognize that the dealer has appeared in the zone B and can tell the dealer that the access to the zone B is permitted only for authorized personnel.

The face data 113 is the face data of an employee of the store. When the employee enters the zone A used as the commodity selling area and the zone B used as the backyard, the entry is not notified to the terminal device 3 and the alarm devices 104a, 104b, 105a and 105b. other words, the employee can have free access to the zones A and B.

Using the blacklist, the server 102 determines whether a specific person has entered the zone A used as the commodity selling area.

For example, the face data 111 of the suspicious person is registered in the blacklist. Hence, in the case that the suspicious person registered in the blacklist is photographed by the monitoring camera 1a, the face data of the suspicious person photographed by the monitoring camera 1a coincides with the face data 111 registered in the blacklist, whereby the server 102 outputs the alarm signal to the terminal device 103 and the alarm devices 104a, 104b, 105a and 105b.

Using the whitelist, the server 102 determines whether a specific person has entered the zone B used as the backyard.

For example, the face data 113 of the employee is registered in the whitelist. Hence, in the case that a person other than the employee and not registered in the whitelist is photographed by the monitoring camera 1b, the face data of the person photographed by the monitoring camera 1b does not coincide with the face data 113 of the employee registered in the whitelist, whereby the server 102 outputs the alarm signal to the terminal device 103 and the alarm devices 104a, 104b, 105a and 105b.

In other words, in the case that one of the persons registered in the blacklist appears in the zone A, the server 102 outputs the alarm signal to the terminal device 103 and the alarm devices 104a, 104b, 105a and 105b. Furthermore, in the case that one of the persons not registered in the whitelist appears in the zone B, the server 102 outputs the alarm signal to the terminal device 103 and the alarm devices 104a, 104b, 105a and 105b.

Figure 17:
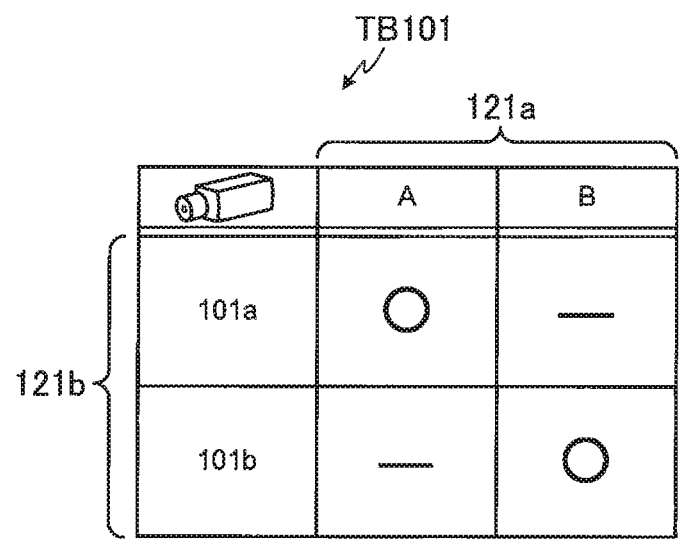
FIG. 17 is a view showing an example of a table stored in the storage section of the server.

FIG. 17 is a view showing an example of a table stored in the storage section of the server 102. The table TB101 shown in FIG. 17 is stored in the storage section of the server 102, for example, when the monitoring cameras 101a and 101b are installed in the building A101. The table TB101 may be generated using the terminal device 103 and stored in the storage section of the server 102. Furthermore, the information in the table TB101 may be, for example, added, changed or deleted using the terminal device 103.

The table TB101 has zone identification information 121a and camera identification information 121b. The zone identification information 121a is identification information for identifying the zones A and B. For example, "A" in the zone identification information 121a represents the identification information of the zone A. "B" in the zone identification information 121a represents the identification information of the zone B.

The camera identification information 121b is identification information for identifying the monitoring cameras 101a and 101b. For example, "101a" in the camera identification information 121b represents the identification information of the monitoring camera 101a. "101b" in the camera identification information 121b represents the identification information of the monitoring camera 101b.

The table TB101 may be assumed to be information indicating the installation places of the monitoring cameras 101a and 101b in the zones. For example, the table TB101 shows that the monitoring camera 101a corresponding to the camera identification information "101a" shown in FIG. 17 is installed in the zone A. The table TB101 also shows that that the monitoring camera 101b corresponding to the camera identification information "101b" shown in FIG. 17 is installed in the zone B.

Figure 18:
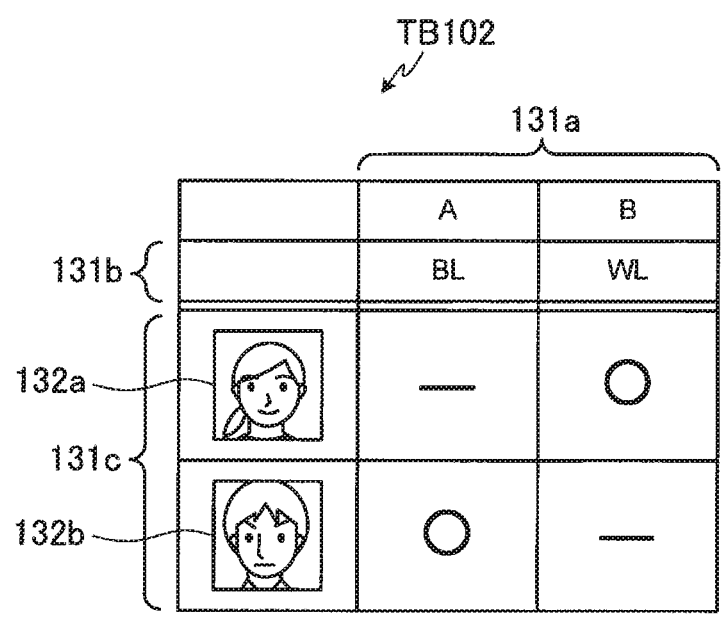
FIG. 18 is a view showing an example of another table stored in the storage section of the server.

FIG. 18 is a view showing an example of a table stored in the storage section of the server 102. The table TB102 shown in FIG. 18 is stored in the storage section of the server 102, for example, when the monitoring cameras 101a and 101b are installed in the building A101. The table TB102 may be generated using the terminal device 103 and stored in the storage section of the server 102. Furthermore, the information in the table TB102 may be, for example, added, changed or deleted using the terminal device 103.

The table TB102 has zone identification information 131a, list information 131b and face data 131c. The zone identification information 131a is identification information for identifying the zones A and B. For example, "A" in the zone identification information 131a represents the identification information of the zone A. "B" in the zone identification information 131a represents the identification information of the zone B.

The list information 131b is information indicating the types of determination in the corresponding zones. BL shown in FIG. 18 indicates that the blacklist system is used to determine the entry of persons into the corresponding zone. WL indicates that the whitelist system is used to determine the entry of persons into the corresponding zone.

For example, in the case of the example shown in FIG. 18, the list information 131*b* of the zone A is "BL". Hence, in the zone A, the entry of persons is determined using the blacklist system. Furthermore, the list information 131*b* of the zone B is "WL". Hence, in the zone B, the entry of persons is determined using the whitelist system.

The face data 131*c* is the face data of persons. Face data 132*a* corresponds to, for example, the face data 113 described referring to FIG. 16 and is the face data of the employee. A face data 132*b* corresponds to, for example, the face data 111 described referring to FIG. 16 and is the face data of the suspicious person.

The table TB102 may be assumed to be a table that specifies whether the entry of the person corresponding to the face data is determined using the blacklist system or the whitelist system.

For example, the person corresponding to the face data 132*a* in the table TB102 is indicated by a round mark in the zone B (whitelist). Hence, when the person corresponding to the face data 132*a* enters the zone B, the alarm signal is not output. On the other hand, when a person not indicated by a round mark in the column of the zone B enters the zone B and when a person whose face data is not registered in the table TB102 enters the zone B, the alarm signal is output.

Furthermore, the person corresponding to the face data 132*b* in the table TB102 is indicated by a round mark in the zone A (blacklist). Hence, when the person corresponding to the face data 132*b* enters the zone A, the alarm signal is output. On the other hand, when the person not indicated by a round mark in the column of the zone A enters the zone A and when the person whose face data is not registered in the table TB102 enters the zone A, the alarm signal is not output.

The phrase "a person is registered in the blacklist" may mean the face data of the person is registered in the table TB102 and that the information (the round mark in FIG. 18) is registered in the column of the blacklist of the list information 131*b*. Furthermore, the phrase "a person is registered in the whitelist" may mean the face data of the person is registered in the table TB102 and that the information (the round mark in FIG. 18) is registered in the column of the whitelist of the list information 131*b*.

In FIGS. 17 and 18, although the tables TB101 and TB102 are assumed to be stored in the storage section of the server 102, the tables are not limited to be stored in the storage section. Both or either one of the tables TB101 and TB102 may be stored in a database separate from the server 102. The separate database may be assumed to be part of the server 102. In the following descriptions, the tables TB101 and TB102 are assumed to be stored in the registration DB.

Figure 19:
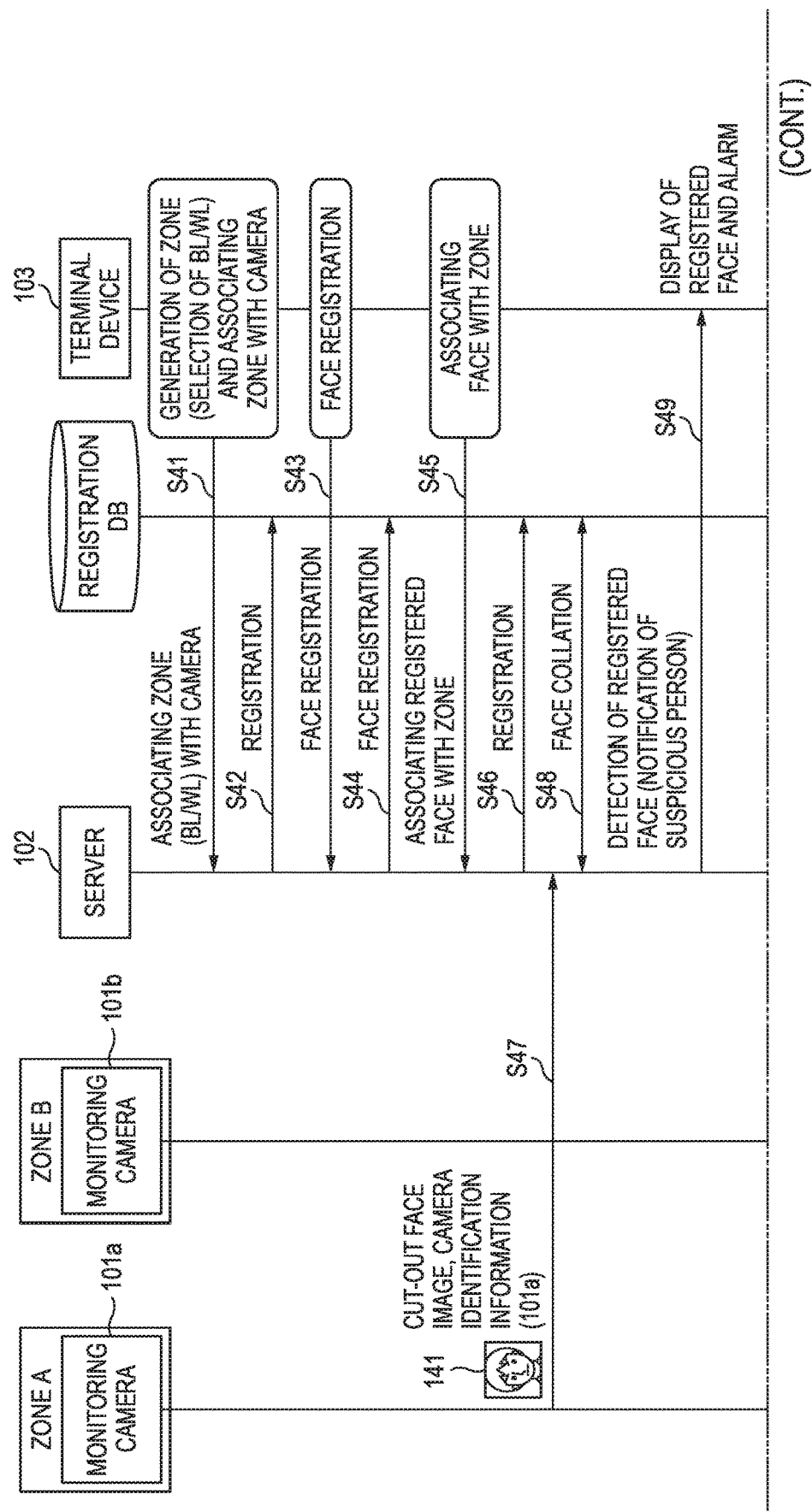
FIG. 19 is a sequence diagram showing an operation example of the monitoring camera system.

FIG. 19 is a sequence diagram showing an operation example of the monitoring camera system. The control section of the terminal device 103 associates the zones A and B with the monitoring cameras 1021*a* and 101*b* for the registration DB via the server 102 in response to the operation of the operator, for example, an employee of the store (at steps S41 and S42). Moreover, the control section of the terminal device 103 associates the zones A and B with the blacklist and the whitelist for the registration DB via the server 102 in response to the operation of the operator (at steps S41 and S42).

That is to say, the control section of the terminal device 103 performs setting so that the zones A and B are associated with the monitoring cameras 101*a* and 101*b* for the registration DB. Consequently, for example, the table TB102 shown in FIG. 17 is stored in the registration DB in the registration DB. Furthermore, the control section of the terminal device 103 performs setting so that the zones A and B are associated with the blacklist and the whitelist for the registration DB. Consequently, for example, the zone identification information 131*a* and the list information 131*b* of the table TB102 shown in FIG. 18 are stored in the registration DB.

The control section of the terminal device 103 registers face data for the registration DB via the server 102 in response to the operation of the operator (at steps S43 and S44). Consequently, for example, the face data 131*c* in the table TB102 shown in FIG. 18 is stored in the registration DB.

The control section of the terminal device 103 associates the face data registered in the registration DB with the zones via the server 102 in response to the operation of the operator (at steps S45 and S46). For example, the control section of the terminal device 103 associates the face data 132*b* registered in the registration DB with the zone A (blacklist). Furthermore, the control section of the terminal device 103 associates the face data 132*a* registered in the registration DB with the zone B (whitelist). Consequently, for example, the information relating to the round and bar marks in the table TB102 shown in FIG. 18 is stored in the registration DB.

It is assumed that the imaging section of the monitoring camera 101*a* in the zone A has photographed a person. The control section of the monitoring camera 101*a* cuts out the face image of the person from the image photographed by the imaging section and transmits the face data of the cut-out face image and the camera identification information of the monitoring camera 101*a* to the server 102 (at step S47).

The control section of the server 102 collates the face data transmitted at step S47 with the face data stored in the registration DB (at step S48).

For example, the control section of the server 102 refers to the table TB101 of the registration DB and acquires the zone identification information corresponding to the camera identification information transmitted at step S47. In the example shown in FIG. 19, the camera identification information "101*a*" of the monitoring camera 101*a* has been transmitted at step S47. Hence, the control section of the server 102 acquires the zone identification information "A" of the zone A from the table TB101 shown in FIG. 17. Consequently, the control section of the server 102 can specify (determine) that the face data 141 transmitted at step S47 has been photographed by the monitoring camera 101*a* installed in the zone A. In other words, the control section of the server 102 can specify that the person corresponding to the face data 141 transmitted at step S47 is present in the zone A.

After specifying the zone, the control section of the server 102 refers to the table TB102 of the registration DB and acquires the face data and the list information corresponding to the specified zone. After that, the control section of the server 102 collates the face data acquired from the table TB102 with the face data transmitted at step S47 and determines the entry of a person into the zones A and B according to the system (the blacklist system or the whitelist system) of the list information acquired from the table TB102.

In the example shown in FIG. 19, the control section of the server 102 specifies that the person corresponding to the face data 141 is present in the zone A. The list information of the zone A is the blacklist. Hence, the control section of the server 102 collates the face data 132*b* corresponding to the zone A of the table TB102 shown in FIG. 18 with the face data 141 transmitted at step S47. Since the face data 141 coincides with the face data 132*b* in the table TB102 shown in FIG. 18, the control section of the server 102 determines that face collation matching is attained. In other words, the control section of the server 102 determines that the person corresponding to the face data 141 transmitted at step S47 is one of the persons registered in the blacklist.

The control section of the server 102 transmits the collation result (an alarm signal indicating the detection of the registered face image) obtained at step S48 to the terminal device 103 and the alarm devices 104a, 104b, 105a and 105b (at step S49). In the case that the control section of the server 102 has determined the detection of the registered face image, the control section transmits the face data 141 photographed by the monitoring camera 101a or the face data 132b coincident with the face data 141 and stored in the table TB102 to the terminal device 103. The control section of the terminal device 103 displays the face data 141 or the face data 132b transmitted from the server 102 to the display device.

It is assumed that the imaging section of the monitoring camera 101a in the zone A has photographed a person. The control section of the monitoring camera 101a cuts out the face image of the person from the image photographed by the imaging section and transmits the face data of the cut-out face image and the camera identification information of the monitoring camera 101a to the server 102 (at step S50).

The control section of the server 102 collates the face data transmitted at step S50 with the face data stored in the registration DB (at step S51).

For example, the control section of the server 102 refers to the table TB101 of the registration DB and acquires the zone identification information corresponding to the camera identification information transmitted at step S50. In the example shown in FIG. 19, the camera identification information "101a" of the monitoring camera 101a has been transmitted at step S50. Hence, the control section of the server 102 acquires the zone identification information "A" of the zone A from the table TB101 shown in FIG. 17. Consequently, the control section of the server 102 can specify that the face data 142 transmitted at step S50 has been photographed by the monitoring camera 101a installed in the zone A. In other words, the control section of the server 102 can specify that the person corresponding to the face data 142 transmitted at step S50 is present in the zone A.

After specifying the zone, the control section of the server 102 refers to the table TB102 of the registration DB and acquires the face data and the list information corresponding to the specified zone. After that, the control section of the server 102 collates the face data acquired from the table TB102 with the face data transmitted at step S50 and determines the entry of the person into the zones A and B according to the system of the list information acquired from the table TB102.

In the example shown in FIG. 19, the control section of the server 102 specifies that the person corresponding to the face data 142 is present in the zone A. The list information for the zone A is the blacklist. Hence, the control section of the server 102 collates the face data 132b corresponding to the zone A of the table TB102 shown in FIG. 18 with the face data 142 transmitted at step S50. Since the face data 142 does not coincide with the face data 132b in the table TB102 shown in FIG. 18, the control section of the server 102 determines that face collation matching is not attained. In other words, the control section of the server 102 determines that the person corresponding to the face data 142 is a person not registered in the blacklist.

Since the person corresponding to the face data 142 is a person not registered in the blacklist, the control section of the server 102 does not transmit the alarm signal to the terminal device 103 and the alarm devices 104a, 104b, 105a and 105b.

It is assumed that the imaging section of the monitoring camera 101b in the zone B has photographed a person. The control section of the monitoring camera 101b cuts out the face image of the person from the image photographed by the imaging section and transmits the face data of the cut-out face image and the camera identification information of the monitoring camera 101b to the server 102 (at step S52).

The control section of the server 102 collates the face data transmitted at step S52 with the face data stored in the registration DB (at step S53).

For example, the control section of the server 102 refers to the table TB101 of the registration DB and acquires the zone identification information corresponding to the camera identification information transmitted at step S52. In the example shown in FIG. 19, the camera identification information "101b" of the monitoring camera 101b has been transmitted at step S52. Hence, the control section of the server 102 acquires the zone identification information "B" of the zone B from the table TB101 shown in FIG. 17. Consequently, the control section of the server 102 can specify that the face data 143 transmitted at step S52 has been photographed by the monitoring camera 101b installed in the zone B. In other words, the control section of the server 102 can specify that the person corresponding to the face data 143 transmitted at step S52 is present in the zone B.

After specifying the zone, the control section of the server 102 refers to the table TB102 of the registration DB and acquires the face data and the list information corresponding to the specified zone. After that, the control section of the server 102 collates the face data acquired from the table TB102 with the face data transmitted at step S52 and determines the entry of the person into the zones A and B according to the system of the list information acquired from the table TB102.

In the example shown in FIG. 19, the control section of the server 102 specifies that the person corresponding to the face data 143 is present in the zone B. The list information for the zone B is the whitelist. Hence, the control section of the server 102 collates the face data 132b corresponding to the zone B of the table TB102 shown in FIG. 18 with the face data 143 transmitted at step S52. Since the face data 143 does not coincide with the face data 132a in the table TB102 shown in FIG. 18, the control section of the server 102 determines that face collation matching is not attained. In other words, the control section of the server 102 determines that the person corresponding to the face data 143 is a person not registered in the whitelist.

The control section of the server 102 transmits the collation result (an alarm signal indicating the detection of an unregistered face image) obtained at step S53 to the terminal device 103 and the alarm devices 104a, 104b, 105a and 105b (at step S54). In the case that the control section of the server 102 has determined the detection of the unregistered face image, the control section transmits the face data 143 photographed by the monitoring camera 101b to the terminal device 103. The control section of the terminal device 103 displays the face data 143 transmitted from the server 102 to the display device.

It is assumed that the imaging section of the monitoring camera 101b in the zone B has photographed a person. The control section of the monitoring camera 101b cuts out the face image of the person from the image photographed by the imaging section and transmits the face data of the cut-out face image and the camera identification information of the monitoring camera 101*b* to the server 102 (at step S55).

The control section of the server 102 collates the face data transmitted at step S55 with the face data stored in the registration DB (at step S56).

For example, the control section of the server 102 refers to the table TB101 of the registration DB and acquires the zone identification information corresponding to the camera identification information transmitted at step S55. In the example shown in FIG. 19, the camera identification information "101*b*" of the monitoring camera 101*b* has been transmitted at step S55. Hence, the control section of the server 102 acquires the zone identification information "B" of the zone B from the table TB101 shown in FIG. 17. Consequently, the control section of the server 102 can specify that the face data 144 transmitted at step S55 has been photographed by the monitoring camera 101*b* installed in the zone B. In other words, the control section of the server 102 can specify that the person corresponding to the face data 144 transmitted at step S55 is present in the zone B.

After specifying the zone, the control section of the server 102 refers to the table TB102 of the registration DB and acquires the face data and the list information corresponding to the specified zone. After that, the control section of the server 102 collates the face data acquired from the table TB102 with the face data transmitted at step S55 and determines the entry of the person into the zones A and B according to the system of the list information acquired from the table TB102.

In the example shown in FIG. 19, the control section of the server 102 specifies that the person corresponding to the face data 144 is present in the zone B. The list information for the zone B is the whitelist. Hence, the control section of the server 102 collates the face data 132*a* corresponding to the zone B of the table TB102 shown in FIG. 18 with the face data 144 transmitted at step S55. Since the face data 144 coincides with the face data 132*a* in the table TB102 shown in FIG. 18, the control section of the server 102 determines that face collation matching is attained. In other words, the control section of the server 102 determines that the person corresponding to the face data 144 is the person registered in the whitelist.

Since the person corresponding to the face data 144 is the person registered in the whitelist, the control section of the server 102 does not transmit the alarm signal to the terminal device 103 and the alarm devices 104*a*, 104*b*, 105*a* and 105*b*.

FIG. 20 is a view illustrating a determination method in the blacklist system. The arrows A111 to A113 in FIG. 20 indicate states in which a person enters the zone A. Furthermore, FIG. 20 shows a face data 151 registered in the zone A (the blacklist) of the table TB102. Moreover, FIG. 20 shows face data 152 to 156 photographed by the monitoring camera 101*a* installed in the zone A.

Upon detecting the face of the person, the control section of the monitoring camera 101*a* cuts out the face image of the person and transmits the face data of the cut-out face image to the server 102. For example, in the case that the control section of the monitoring camera 101*a* has detected the face of the person at time t, the control section transmits the face data 152 to the server 102.

Two seconds after the detection of the face of the person, the control section of the monitoring camera 101*a* cuts out two pieces of the face data of the detected face of the person and transmits the face data to the server 102. For example, the control section of the monitoring camera 101*a* continuously cuts out two pieces of the face data 153 and 154 at time t+2, two seconds after the time t, and transmits the face data to the server 102. The time of two seconds is taken as an example, and the time is not limited to this number of seconds.

Furthermore, four seconds after the detection of the face of the person, the control section of the monitoring camera 101*a* cuts out two pieces of the face data of the detected face of the person and transmits the face data to the server 102. For example, the control section of the monitoring camera 101*a* continuously cuts out two pieces of the face data 155 and 156 at time t+4, four seconds after the time t, and transmits the face data to the server 102. The time of four seconds is taken as an example, and the time is not limited to this number of seconds.

The control section of the server 102 collates the face data transmitted by the monitoring camera 101*a* with the face data stored in the table TB102 and determines whether the face data transmitted by the monitoring camera 101*a* coincides with the face data stored in the table TB102. At this time, the control section of the server 102 calculates the degree of similarity between the face data transmitted by the monitoring camera 101*a* and the face data stored in the table TB102. In the case that the calculated degree of similarity exceeds a threshold value, the control section of the server 102 determines that the face data transmitted by the monitoring camera 101*a* coincides with the face data stored in the table TB102.

The operator may set the threshold value using the terminal device 103. The threshold value may be set, for example, on the basis of the accuracy (roughness) of the face data registered in the table TB102. In the example shown in FIG. 20, the threshold value is set to 1.04.

For example, the control section of the server 102 calculates the degree of similarity between the face data 152 transmitted by the monitoring camera 101*a* and the face data 151 stored in the table TB102. In the example shown in FIG. 20, the degree of similarity between the face data 152 and the face data 151 is 0.80, not exceeding the threshold value of 1.04. Hence, the control section of the server 102 determines that the face data 152 does not coincide with the face data 151.

Furthermore, the control section of the server 102 calculates the degree of similarity between the face data 153 and 154 transmitted by the monitoring camera 101*a* and the face data 151 stored in the table TB102. In the example shown in FIG. 20, the degree of similarity between the face data 153 and the face data 151 is 0.90, not exceeding the threshold value of 1.04. Moreover, the degree of similarity between the face data 154 and the face data 151 is 0.95, not exceeding the threshold value of 1.04. Hence, the control section of the server 102 determines that neither the face data 153 or 154 coincides with the face data 151.

What's more, the control section of the server 102 calculates the degree of similarity between the face data 155 transmitted by the monitoring camera 101*a* and the face data 151 stored in the table TB102. In the example shown in FIG. 20, the degree of similarity between the face data 155 and the face data 151 is 1.15, exceeding the threshold value of 1.04. Hence, the control section of the server 102 determines that the face data 155 coincides with the face data 151. In other words, the control section of the server 102 determines that the person photographed by the monitoring camera 101*a* is the person registered in the blacklist.

In the determination method in the blacklist system, the control section of the server 102 outputs the alarm signal at the time when the degree of similarity between the face data 155 photographed by the monitoring camera 101*a* and the face data 151 stored in the table TB102 exceeds the threshold value.

Figure 21:
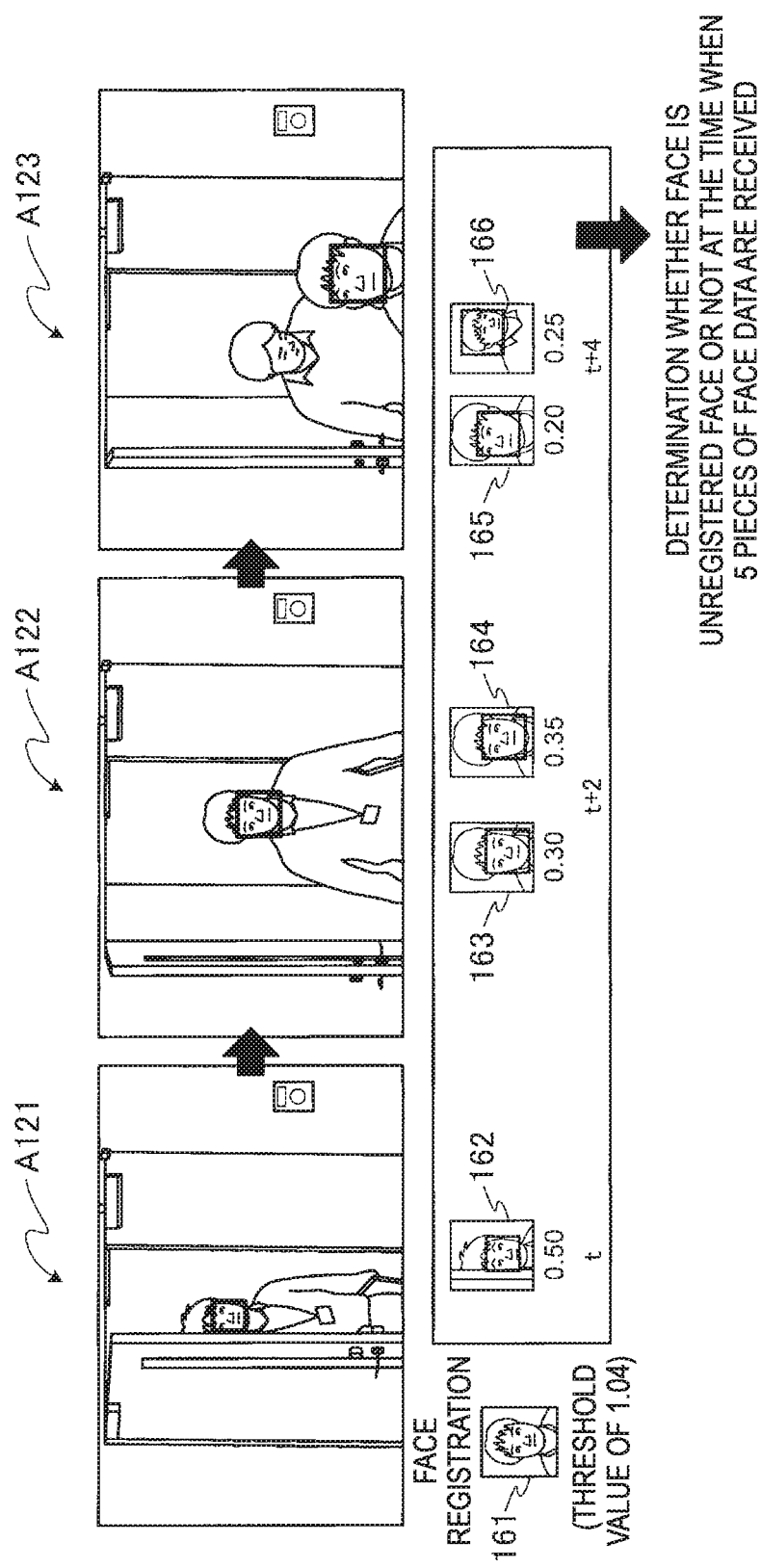
FIG. 21 is a view illustrating a determination method in a whitelist system.

FIG. 21 is a view illustrating a determination method in the whitelist system. The arrows A121 to A123 in FIG. 21 indicate states in which a person enters the zone B. Furthermore, FIG. 21 shows a face data 161 registered in the zone B (the whitelist) of the table TB102. Moreover, FIG. 21 shows face data 162 to 166 photographed by the monitoring camera 101*b* installed in the zone B.

As in the case of the monitoring camera 101*a*, the control section of the monitoring camera 101*b* cuts out the face image and transmits the face data of the face image to the server 102.

In the determination method in the blacklist system described referring to FIG. 20, upon receiving the face data from the monitoring camera 101*a*, the control section of the server 102 calculates the degree of similarity sequentially. At the time when the calculated degree of similarity exceeds the threshold value, the control section of the server 102 determines that the person corresponding to the face data transmitted from the monitoring camera 101*a* is the person registered in the blacklist.

On the other hand, in the determination method in the whitelist system, after receiving a certain number of serial face data from the monitoring camera 101*b*, the control section of the server 102 determines whether the person photographed by the monitoring camera 101*b* is one of the persons registered in the whitelist. For example, after receiving the five pieces of serial face data 162 to 166 (the face data 162 to 166 of the same person) from the monitoring camera 101*b*, the control section of the server 102 determines whether the person corresponding to the five pieces of face data 162 to 166 photographed by the monitoring camera 101*b* is one of the persons registered in the whitelist.

Upon receiving the five pieces of face data 162 to 166, the control section of the server 102 calculates the degree of similarity between each of the received five pieces of face data 162 to 166 and the face data 161 stored in the table TB1. The control section of the server 102 may calculate the average value of the calculated degrees of similarity and may determine whether the person photographed by the monitoring camera 101*b* is the person registered in the whitelist on the basis of the calculated average value.

For example, the control section of the server 102 may calculate the average value of the degrees of similarity among the face data 162 to 166 shown in FIG. 21, that is, the average value of 0.50, 0.30, 0.35, 0.20 and 0.25, and in the case that the calculated average value is not more than the threshold value of 1.04, the control section of the server 102 may determine that the person photographed by the monitoring camera 101*b* is not the person registered in the whitelist. However, the number of the degrees of similarity for use in the calculation of the average value is not limited to five. The number of the degrees of similarity for use in the calculation of the average value may be variable and may be set, for example, using the terminal device 103.

Furthermore, in the case that the calculated median value of the degree of similarity is not more than 1.04, the control section of the server 102 may determine that the person photographed by the monitoring camera 101*b* is not the person registered in the whitelist.

As described above, in the determination method in the whitelist system, after receiving a certain number of serial face data from the monitoring camera 101*b*, the control section of the server 102 determines whether the person photographed by the monitoring camera 101*b* is the person registered in the whitelist. Consequently, the control section of the server 102 can suppress erroneous determination in the determination method in the whitelist system.

For example, even in the case that a person registered in the whitelist is photographed by the monitoring camera 101*b*, the degree of similarity between a first piece of face data and the registered face data is low in some cases. For example, the face of the first piece of face data 162 is partially hidden by the door of the entrance A102*b* of the zone B, whereby the degree of similarity is low in some cases. In such a case, the alarm signal is output although the person is the person registered in the whitelist.

However, as described above, after receiving the certain number of serial face data from the monitoring camera 101*b*, the control section of the server 102 determines whether the person photographed by the monitoring camera 101*b* is the person registered in the whitelist. Hence, even if the degree of similarity between the first piece of face data and the registered face data is not more than the threshold value, the control section of the server 102 does not output the alarm signal. Consequently, the control section of the server 102 can suppress erroneous determination in the determination method in to the whitelist system.

Figure 22:
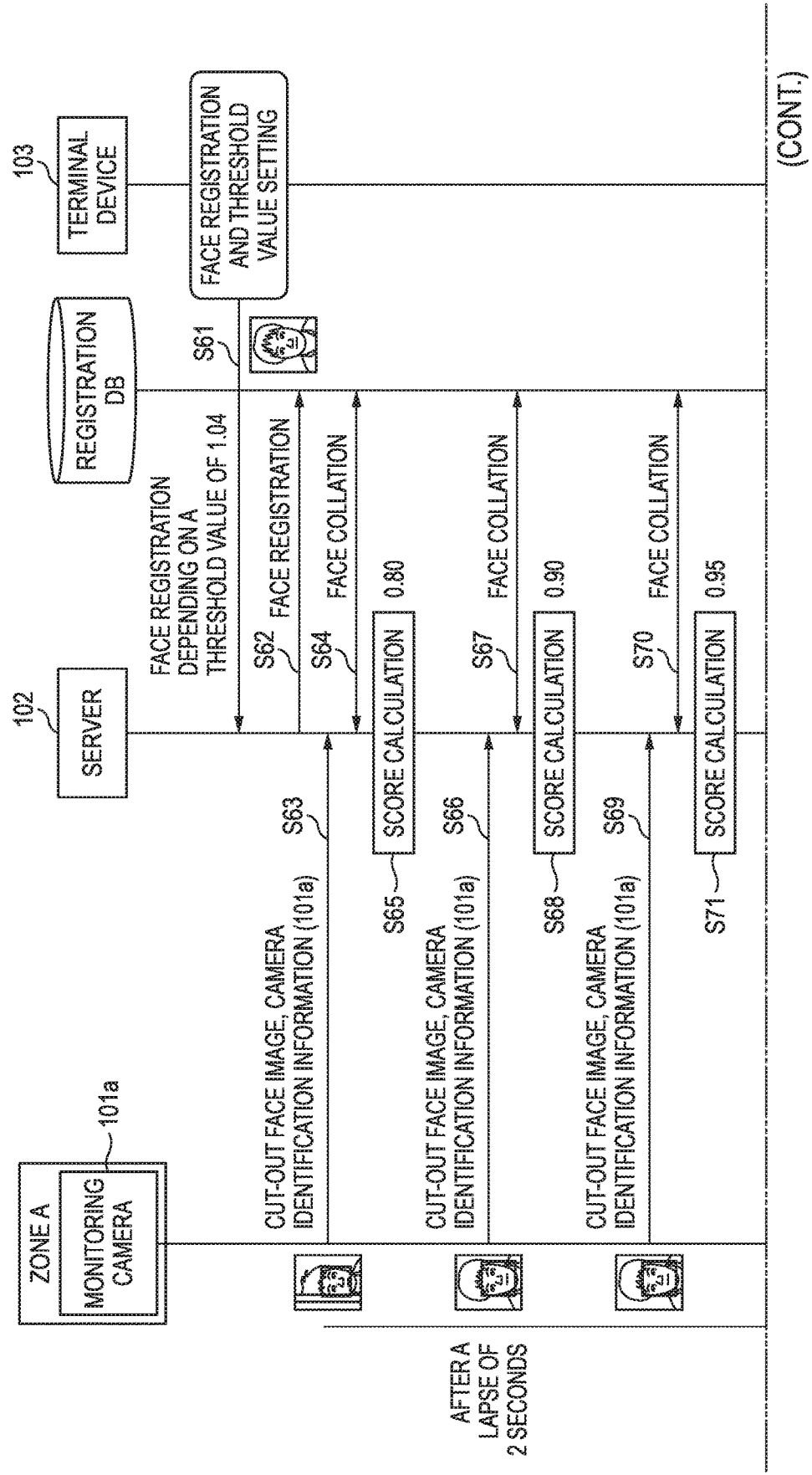
FIG. 22 is a sequence diagram showing a determination process example in the blacklist system.

FIG. 22 is a sequence diagram showing a determination process example in the blacklist system. The control section of the terminal device 103 registers face data in the registration DB via the server 102 in response to the operation of the operator (at steps S61 and S62). At this time, the control section of the terminal device 103 also transmits the threshold value in response to the operation of the operator. Hence, for example, the face data 131*c* in the table TB102 shown in FIG. 18 is stored in the registration DB. Furthermore, the threshold value is registered together with the face data 131*c*. In the following descriptions, the threshold value is assumed to be 1.04.

It is assumed that the imaging section of the monitoring camera 101*a* in the zone A has photographed a person. The control section of the monitoring camera 101*a* cuts out the face image of the person from the image photographed by the imaging section and transmits the face data of the cut-out face image and the camera identification information of the monitoring camera 101*a* to the server 102 (at step S63).

The control section of the server 102 collates the face data transmitted at step S63 with the face data stored in the registration DB (at step S64). Since the method for collating the transmitted face data with the face data stored in the registration DB is similar to the method described at step S48 of FIG. 19, the description thereof is omitted.

The control section of the server 102 calculates the score (the degree of similarity) between the face data transmitted at step S63 and the face data stored in the registration DB (at step S65). It is herein assumed that the score of the face data transmitted at step S63 is 0.80. Since the score 0.80 does not exceed the threshold value of 1.04, the control section of the server 102 does not output the alarm signal.

Two seconds after the transmission of the face data at step S63, the control section of the monitoring camera 101*a* transmits two pieces of face data (at steps S66 and S69.

Since the method for collating the face data transmitted at step S66 with the registered face data and the method for calculating the score (at steps S67 and S68) are similar to the methods performed at step S64 and S65, the descriptions thereof are omitted. Furthermore, since the method for collating the face data transmitted at step S69 with the registered face data and the method for calculating the score (at steps S70 and S71) are similar to the methods performed at step S64 and S65, the descriptions thereof are omitted.

Four seconds after the transmission of the face data at step S63, the control section of the monitoring camera 101*a* transmits two pieces of face data (at steps S72 and S76).

The control section of the server 102 collates the face data transmitted at step S72 with the face data stored in the registration DB (at step S73).

The control section of the server 102 calculates the score (the degree of similarity) between the face data transmitted at step S72 and the face data stored in the registration DB (at step S74). It is herein assumed that the score of the face data transmitted at step S72 is 1.15. Since the score 1.15 exceeds the threshold value of 1.04, the control section of the server 102 determines that registered face data is detected and outputs an alarm signal indicating the detection of the registered face data to the terminal device 103 (at step S75).

Since the method for collating the face data transmitted at step S76 with the registered face data and the method for calculating the score (at steps S77 and S78) are similar to the methods performed at step S64 and S65, the descriptions thereof are omitted.

Figure 23:
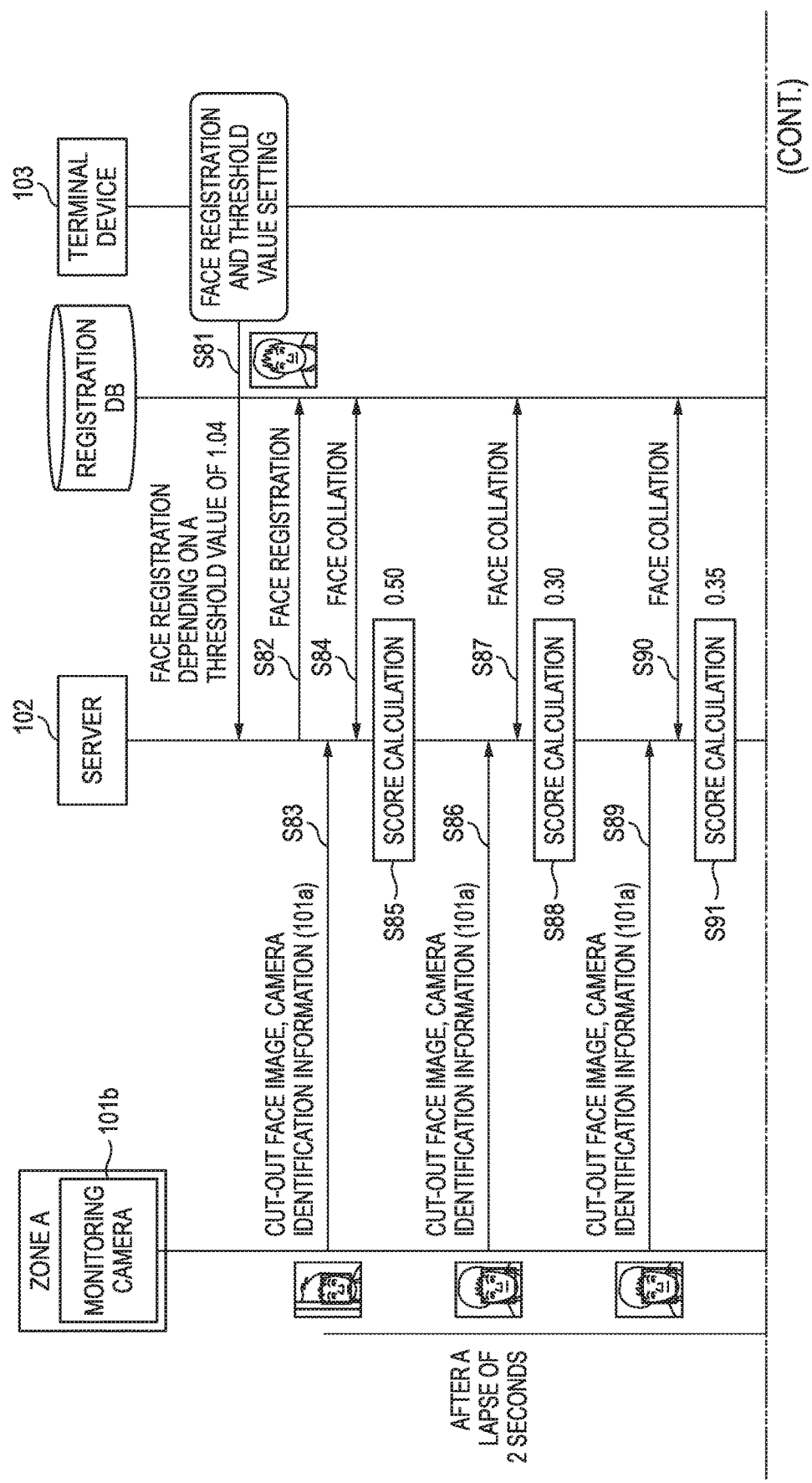
FIG. 23 is a sequence diagram showing a determination process example in the whitelist system.

FIG. 23 is a sequence diagram showing a determination process example in the whitelist system. Since the face registration processes at steps S81 and S82 are similar to the processes at steps S61 and S62 shown in FIG. 22, the descriptions thereof are omitted. Furthermore, since the face data transmission processes at steps S83, S86, S89, S92 and S95 shown in FIG. 23 are similar to the processes at steps S63, S66, S69, S72 and S76 shown in FIG. 22, the descriptions thereof are omitted. However, in FIG. 23, the monitoring camera 101*b* installed in the zone B transmits the face data to the server 102.

Since the face collation processes at steps S84, S87, S90, S93 and S96 shown in FIG. 23 are similar to the process at step S64 shown in FIG. 22, the descriptions thereof are omitted. Furthermore, since the score calculation processes at steps S85, S88, S91, S94 and S97 are similar to the process at step S65 shown in FIG. 22, the descriptions thereof are omitted.

In the whitelist system, after receiving the five pieces of face data from the monitoring camera 101*b*, the control section of the server 102 determines whether the person corresponding to the face data photographed by the monitoring camera 101*b* is registered in the whitelist.

It is herein assumed that the scores of the face data transmitted at steps S83, S86, S89, S92 and S95 are 0.50, 0.30, 0.35, 0.20 and 0.25, respectively. The control section of the server 102 determines whether the person corresponding to the face data transmitted by the monitoring camera 101*b* is registered in the whitelist, for example, by using the median value of the five scores. In the example shown in FIG. 23, since the median value is 0.35 and does not exceed the threshold value of 1.04, the control section of the server 102 determines that the person corresponding to the face data photographed by the monitoring camera 101*b* is not registered in the whitelist.

After determining that the person corresponding to the face data photographed by the monitoring camera 101*b* is not registered in the whitelist, the control section of the server 102 transmits an alarm signal indicating the detection of an unregistered face image to the terminal device 103 (at step S98).

In the sequences in FIGS. 22 and 23, two seconds after the transmission of the first face data, each of the monitoring cameras 101*a* and 101*b* transmits two pieces of face data to the server 102, and four seconds thereafter, each of the monitoring cameras 101*a* and 101*b* transmits two pieces of face data to the server 102. However, the number of seconds and the number of pieces are not limited to the above-mentioned values but may be variable and may be set, for example, using the terminal device 103.

Furthermore, the number of times each of the monitoring cameras 101*a* and 101*b* transmits the face data may be three or more. For example, each of the monitoring cameras 101*a* and 101*b* may transmit the face data three times, for example, when two seconds, four seconds and six seconds have elapsed after the first transmission of the face data. The number of times each of the monitoring cameras 101*a* and 101*b* transmits the face data may be variable and may be set, for example, using the terminal device 103.

Figure 24:
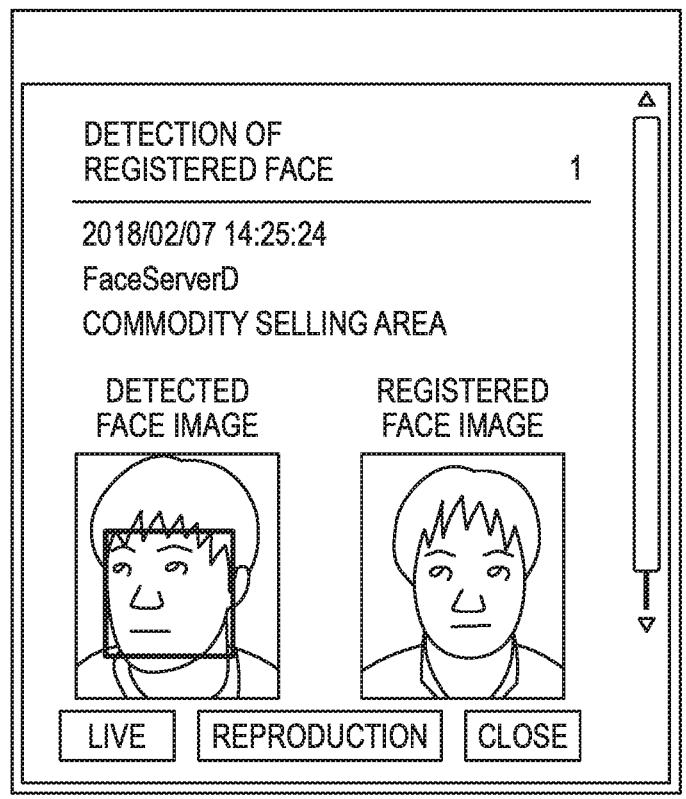
FIG. 24 is a view showing an example of a screen on a terminal device at the time when an alarm signal is output in the blacklist system.

FIG. 24 is a view showing an example of a screen on the terminal device 103 at the time when the alarm signal is output in the blacklist system. When the alarm signal is output in the blacklist system, the image shown in FIG. 24 is displayed on the display device of the terminal device 103. In the image, the face image which is photographed by the monitoring camera 101*a*, the degree of similarity of which exceeds the threshold value, and the face image registered in the table TB102 are displayed.

In the case that the live button shown in FIG. 24 is clicked, the image being photographed at present by the monitoring camera 101*a* is displayed on the display device of the terminal device 103. In the case that the reproduction button shown in FIG. 24 is clicked, the images obtained before and after the time when it is determined that the person photographed by the monitoring camera 101*a* has been registered in the blacklist are reproduced on the display device of the terminal device 103.

Figure 25:
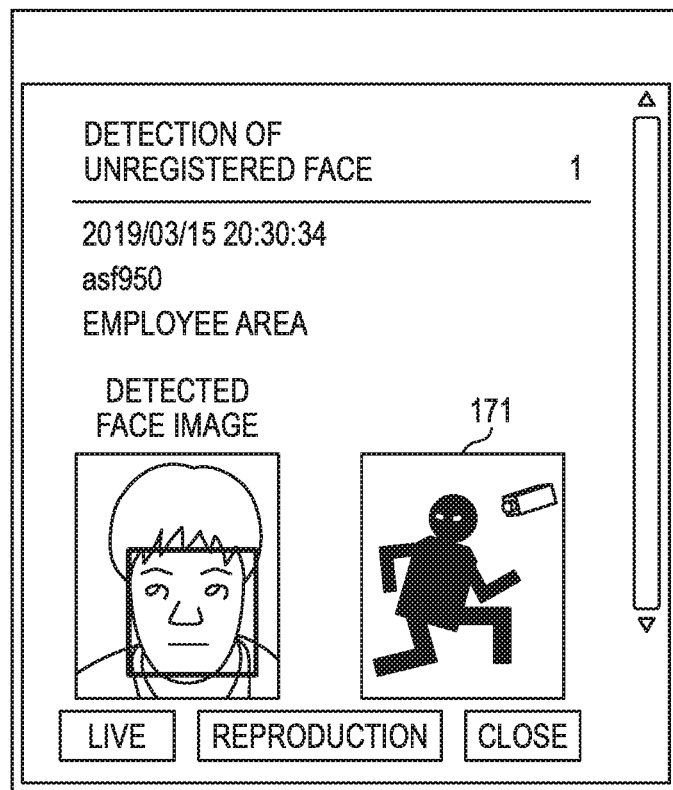
FIG. 25 is a view showing an example of a screen on the terminal device at the time when the alarm signal is output in the whitelist system.

FIG. 25 is a view showing an example of a screen on the terminal device 103 at the time the when the alarm signal is output in the whitelist system. When the alarm signal is output in the whitelist system, the image shown in FIG. 25 is displayed on the display device of the terminal device 103. In the image, the face image which is photographed by the monitoring camera 101*b*, the degree of similarity of which does not exceed the threshold value, is displayed.

The face data of the person at the time when the alarm signal is output in the whitelist system is not registered in the table TB102. Hence, an image 171 indicating that a person corresponding to an unregistered face image has been detected is displayed on the display device of the terminal device 103.

In the case that the live button shown in FIG. 25 is clicked, the state being photographed at present by the monitoring camera 101*b* is displayed on the display device of the terminal device 103. In the case that the reproduction button shown in FIG. 25 is clicked, the images obtained before and after the time when it is determined that the person photographed by the monitoring camera 101*b* has not been registered in the whitelist are reproduced on the display device of the terminal device 103.

The face image obtained at the time when the alarm signal is output may be displayed on the display device of the terminal device 103 regardless of the blacklist system or the whitelist system.

Figure 26:
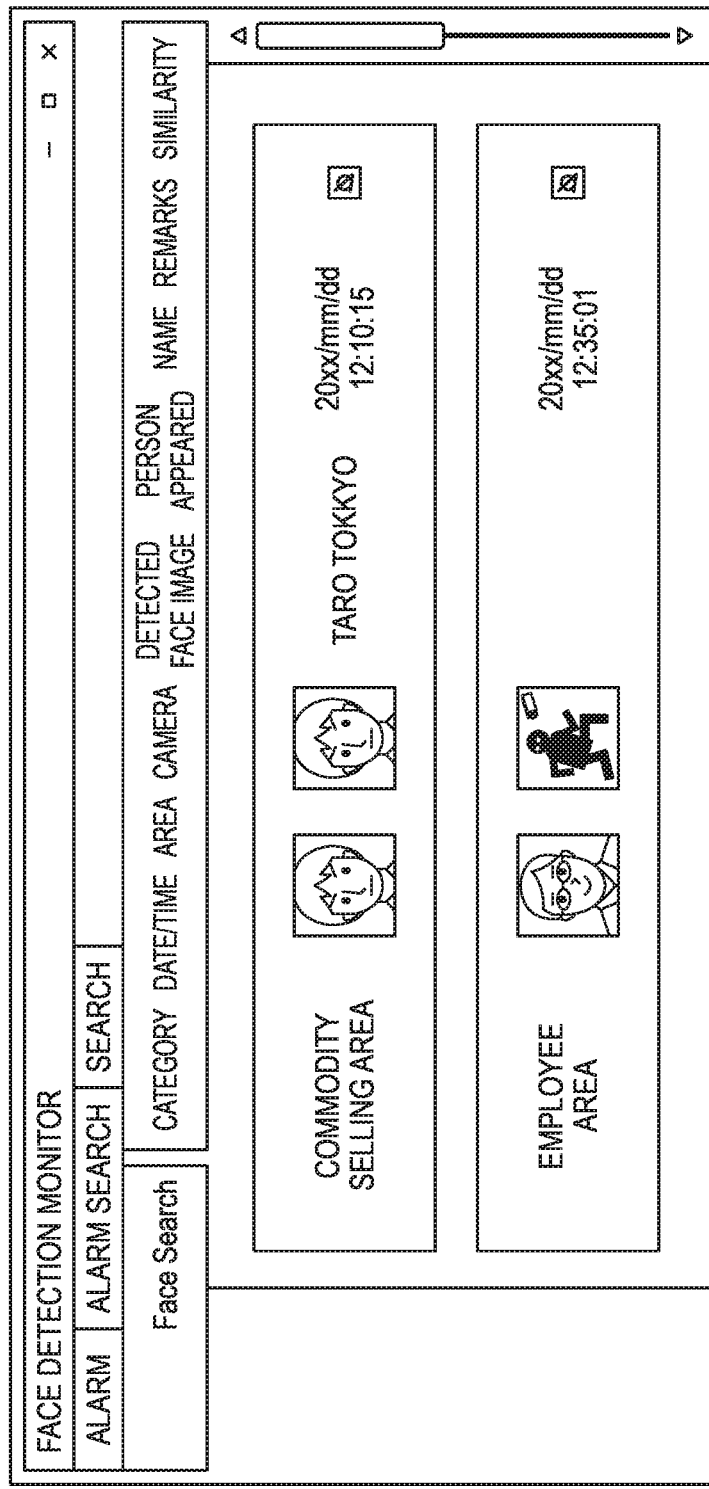
FIG. 26 is a view showing an example of a screen on the terminal device at the time when the alarm signal is output.

FIG. 26 is a view showing an example of a screen on the terminal device 103 at the time when the alarm signal is output. The image obtained when the alarm signal is output in the blacklist system and the image obtained when the alarm signal is output in the whitelist system are displayed on the display device of the terminal device 103 shown in FIG. 26. In other words, the image obtained when a person registered in the blacklist appears at the commodity selling area (the zone A) and the image obtained when a person unregistered in the whitelist appears in the employee area (the zone B) are displayed together on the display device of the terminal device 103.

As described above, the server 102 has the communication section for receiving the first face data from the monitoring camera 101a installed in the zone A and for receiving the second face data from the monitoring camera 101b installed in the zone B. Furthermore, the server 102 has the control section for collating the first face data with the face data registered in the blacklist and thereby determining the entry of the person corresponding to the face data registered in the blacklist, and for collating the second face data with the face data registered in the whitelist and thereby determining the entry of the person corresponding to the face data not registered in the whitelist.

Consequently, even in the case that conditions for monitoring the entry of persons change for each zone, the server 102 can appropriately monitor the entry of persons into the zones. For example, the server 102 determines the entry of a suspicious person using the blacklist in the zone A used as the commodity selling area and also determines the entry of a person other than the employees using the whitelist in the zone B used as the backyard, thereby being capable of appropriately monitoring the entry of persons into the zones A and B.

Modification Example

The monitoring camera system may be used, for example, in a company or a condominium. For example, the monitoring camera system may determine the entry of a person into the zone at the entrance of a company using the blacklist and may determine the entry of a person into the zones of various sections inside the building using the whitelist. Furthermore, for example, the monitoring camera system may determine the entry of a person into the common zone at the entrance of a condominium using the blacklist and may determine the entry of a person into the zones of various floors inside the building using the whitelist.

Fifth Embodiment

In the fifth embodiment, in the case that a person not registered in the whitelist enters the zone B described in the fourth embodiment, the face data of the person entered the zone B is registered in the whitelist in response to an instruction from the terminal device 103. Furthermore, in the fifth embodiment, in the case that a person not registered in the whitelist enters the zone B described in the fourth embodiment, the face data of the person entered the zone B is registered in the blacklist for the zone A in response to an instruction from the terminal device 103.

Figure 27:
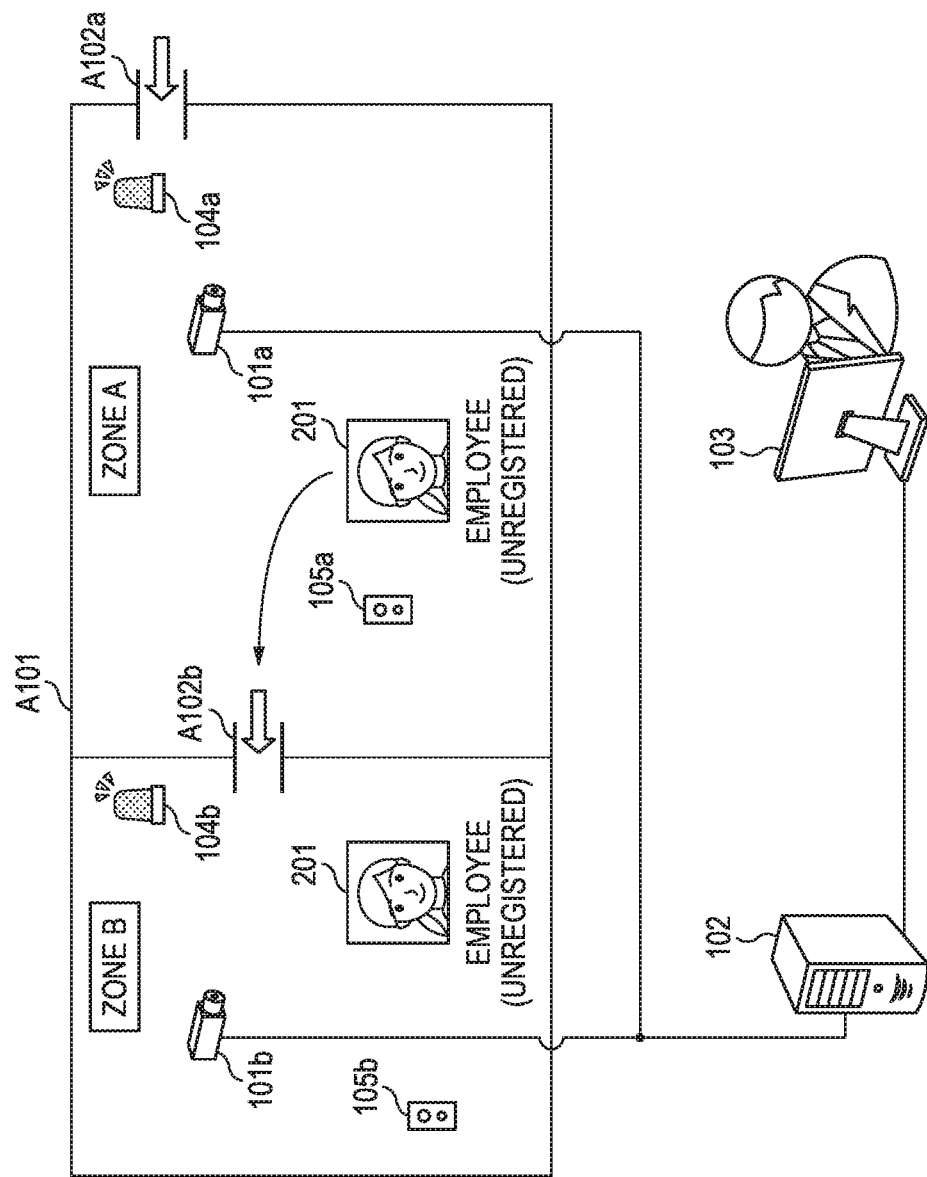
FIG. 27 is a view showing an example of a monitoring camera system according to a fifth embodiment.

FIG. 27 is a view showing an example of a monitoring camera system according to the fifth embodiment. In FIG. 27, the components identical to those shown in FIG. 15 are designated by the same reference numerals and signs. In FIG. 27, the face data 201 of a person is shown.

The face data 201 is, for example, the face data of an employee of the store. Since the employee can enter the zone A used as the commodity selling area, the employee is not registered in the blacklist. It is assumed that the employee is not registered in the whitelist although the employee can enter the zone B used as the backyard.

The employee corresponding to the face data 201 is not registered in the blacklist. Hence, in the case that the employee corresponding to the face data 201 enters the zone A, the control section of the server 102 does not output the alarm signal to the terminal device 103 and the alarm devices 104a, 104b, 105a and 105b.

The employee corresponding to the face data 201 is not registered in the whitelist. Hence, in the case that the employee corresponding to the face data 201 enters the zone B, the control section of the server 102 outputs the alarm signal to the terminal device 103 and the alarm devices 104a, 104b, 105a and 105b. Furthermore, the control section of the server 102 outputs the face data 201 photographed by the monitoring camera 101b to the terminal device 103.

Upon receiving the alarm signal and the face data 201 photographed by the monitoring camera 101b, the terminal device 103 displays the image of the received face data 201 on the display device. In the case that it is confirmed that the person corresponding to the face data 201 displayed on the display device of the terminal device 103 is, for example, an employee capable of entering the zone B, the operator operating the terminal device 103 instructs the server 102 to register the face data 201 of the employee in the whitelist.

In response to the registration instruction from the terminal device 103, the control section of the server 102 registers the face data 201 displayed on the display device of the terminal device 103 in the whitelist. In other words, the control section of the server 102 registers the face data 201 of the employee that caused the transmission of the alarm signal in the whitelist. Consequently, even when the employee corresponding to the face data 201 enters the zone B next time, the control section of the server 102 does not output the alarm signal to the terminal device 103 and the alarm devices 104a, 104b, 105a and 105b.

By virtue of the above-mentioned processes in the monitoring camera system, the operator of the terminal device 103 can easily register the face data of the employee capable of entering the zone B in the whitelist, for example, using the face data 201 photographed by the monitoring camera 101b without receiving the face data from the employee. Moreover, the employee is not required to photograph his/her face and to transmit the photographed face data to the terminal device 103.

Initially, the face data 201 is not registered in the whitelist. Hence, until the face data 201 is registered in the whitelist using the terminal device 103, the alarm signal is transmitted from the server 102 to the terminal device 103 and the alarm devices 104a, 104b, 105a and 105b.

Figure 28:
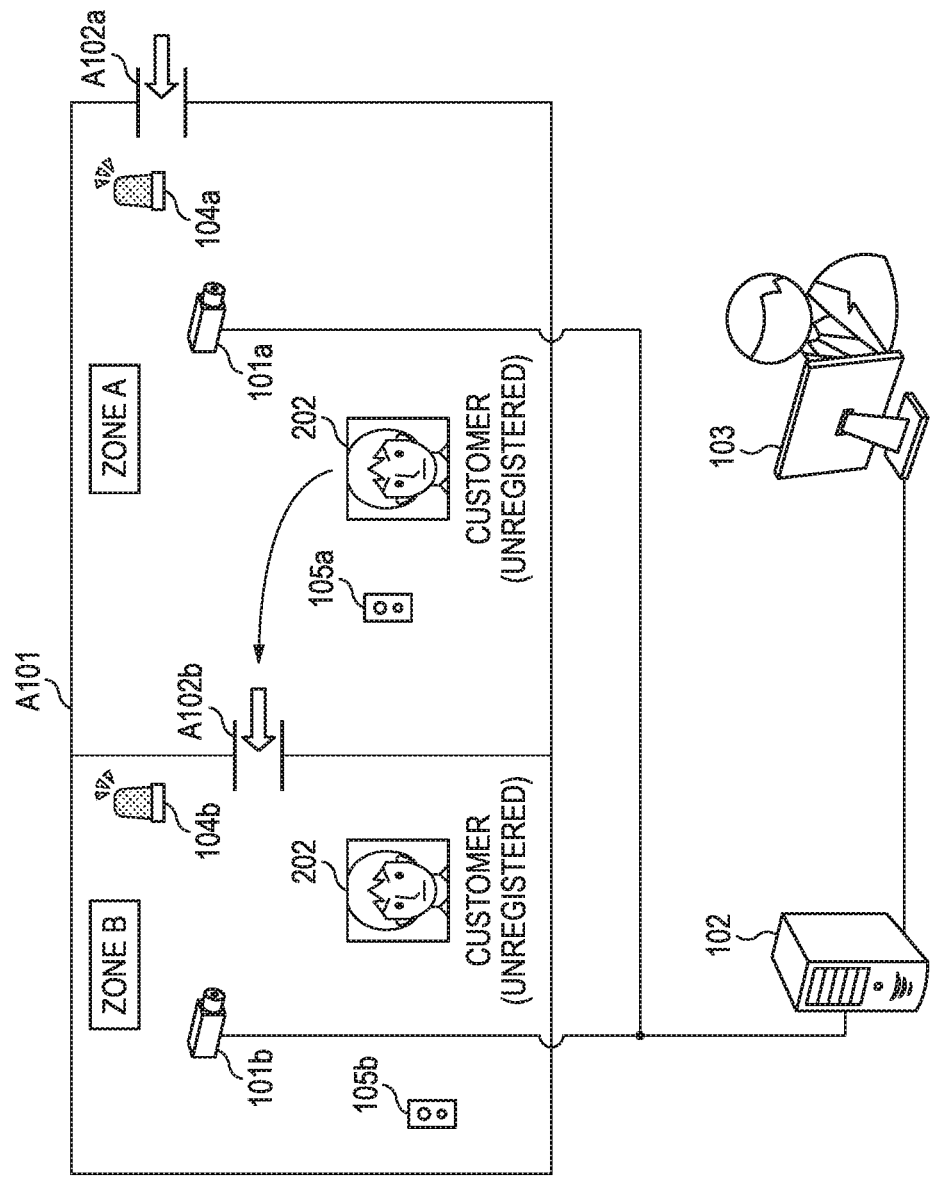
FIG. 28 is a view showing another example of the monitoring camera system according to the fifth embodiment.

FIG. 28 is a view showing another example of the monitoring camera system according to the fifth embodiment. In FIG. 28, the components identical to those shown in FIG. 15 are designated by the same reference numerals and signs. In FIG. 28, the face data 202 of a person is shown.

The face data 202 is, for example, the face data of a customer who has come to the store. It is assumed that the customer is not registered either in the blacklist or in the whitelist of the server 102.

The customer corresponding to the face data 202 is not registered in the blacklist. Hence, in the case that the customer corresponding to the face data 202 enters the zone A, the control section of the server 102 does not output the alarm signal to the terminal device 103 and the alarm devices 104a, 104b, 105a and 105b.

The customer corresponding to the face data 202 is not registered in the whitelist. Hence, in the case that the customer corresponding to the face data 202 enters the zone B, the control section of the server 102 outputs the alarm signal to the terminal device 103 and the alarm devices 104a, 104b, 105a and 105b. Furthermore, the control section of the server 102 outputs the face data 202 photographed by the monitoring camera 101*b* to the terminal device 103.

Upon receiving the alarm signal and the face data 202 photographed by the monitoring camera 101*b*, the terminal device 103 displays the image of the received face data 202 on the display device. In the case that it is confirmed that the person corresponding to the face data 202 displayed on the display device of the terminal device 103 is not, for example, an employee capable of entering the zone B, the operator operating the terminal device 103 instructs the server 102 to register the face data 202 of the customer in the blacklist.

In response to the registration instruction from the terminal device 103, the control section of the server 102 registers the face data 202 displayed on the display device of the terminal device 103 in the blacklist. In other words, the control section of the server 102 registers the face data 202 of the customer that caused the transmission of the alarm signal in the blacklist. Consequently, in the case that the customer having entered the zone B, the access to which is permitted only for authorized personnel, for example, comes to the store again and enters the zone A, the control section of the server 102 outputs the alarm signal to the terminal device 103 and the alarm devices 104*a*, 104*b*, 105*a* and 105*b*. The employees of the store can monitor the customer having entered the zone B, the access to which is permitted only for authorized personnel.

By virtue of the above-mentioned processes in the monitoring camera system, the operator of the terminal device 103 can easily register, in the blacklist, the face data of the person whose access to the zone A is desired to be monitored, for example, using the face data 202 photographed by the monitoring camera 101*b* without receiving the face data from the employees or others. Moreover, the employees are not required to photograph the face of the person whose access to the zone A are desired to be monitored and to transmit the photographed face data to the terminal device 103.

FIG. 29 is a sequence diagram showing an operation example of the monitoring camera system. FIG. 29 is a sequence diagram corresponding to the registration in the whitelist described referring to FIG. 27. The processes at steps S101 to S106 shown in FIG. 29 are similar to the processes at steps S41 to S46 described referring to FIG. 19 and the descriptions thereof are omitted.

It is assumed that the imaging section of the monitoring camera 101*b* in the zone B has photographed an employee. It is assumed that the employee is, for example, an employee who has come to the store in the building A101 for the first time and is not registered in the whitelist. The control section of the monitoring camera 101*b* cuts out the face image of the person from the image photographed by the imaging section and transmits the face data of the cut-out face image and the camera identification information of the monitoring camera 101*b* to the server 102 (at step S107).

The control section of the server 102 collates the face data 206 transmitted at step S107 with the face data stored in the registration DB (at step S108). Since the method for collating the face data is similar to the method described at step S53 of FIG. 19, the description thereof is omitted. However, since the employee corresponding to the face data 206 is not registered in the whitelist, the control section of the server 102 determines that the face data 206 is not registered in the whitelist (the detection of an unregistered face image).

The control section of the server 102 transmits the collation result (an alarm signal indicating the detection of an unregistered face image) obtained at step S108 to the terminal device 103 and the alarm devices 104*a*, 104*b*, 105*a* and 105*b* (at step S109). In the case that the control section of the server 102 has determined that an unregistered face image is detected, the control section transmits the face data 206 photographed by the monitoring camera 101*b* to the terminal device 103. The control section of the terminal device 103 displays the face data 206 transmitted from the server 102 on the display device.

Upon accepting the operation for registering the face data 206 in the whitelist from the operator, the control section of the terminal device 103 transmits a face registration instruction to the server 102 (at step S110).

In response to the reception of the face registration instruction transmitted at step S110, the control section of the server 102 registers the face data 206 that caused the transmission of the alarm signal at step S109 in the table TB102 of the registration DB (at step S111).

It is assumed that the imaging section of the monitoring camera 101*b* in the zone B has photographed the employee. The employee is the employee registered in the whitelist by the face registration process performed at step S111. The control section of the monitoring camera 101*b* cuts out the face image of the person from the image photographed by the imaging section and transmits the face data of the cut-out face image and the camera identification information of the monitoring camera 101*b* to the server 102 (at step S112).

The control section of the server 102 collates the face data 207 transmitted at step S112 with the face data stored in the registration DB (at step S113). The face data 207 coincides with the face data 206 registered in the table TB102 of the registration DB at step S111. Hence, the control section of the server 102 determines that the employee corresponding to the face data 207 is the person registered in the whitelist.

Figure 30:
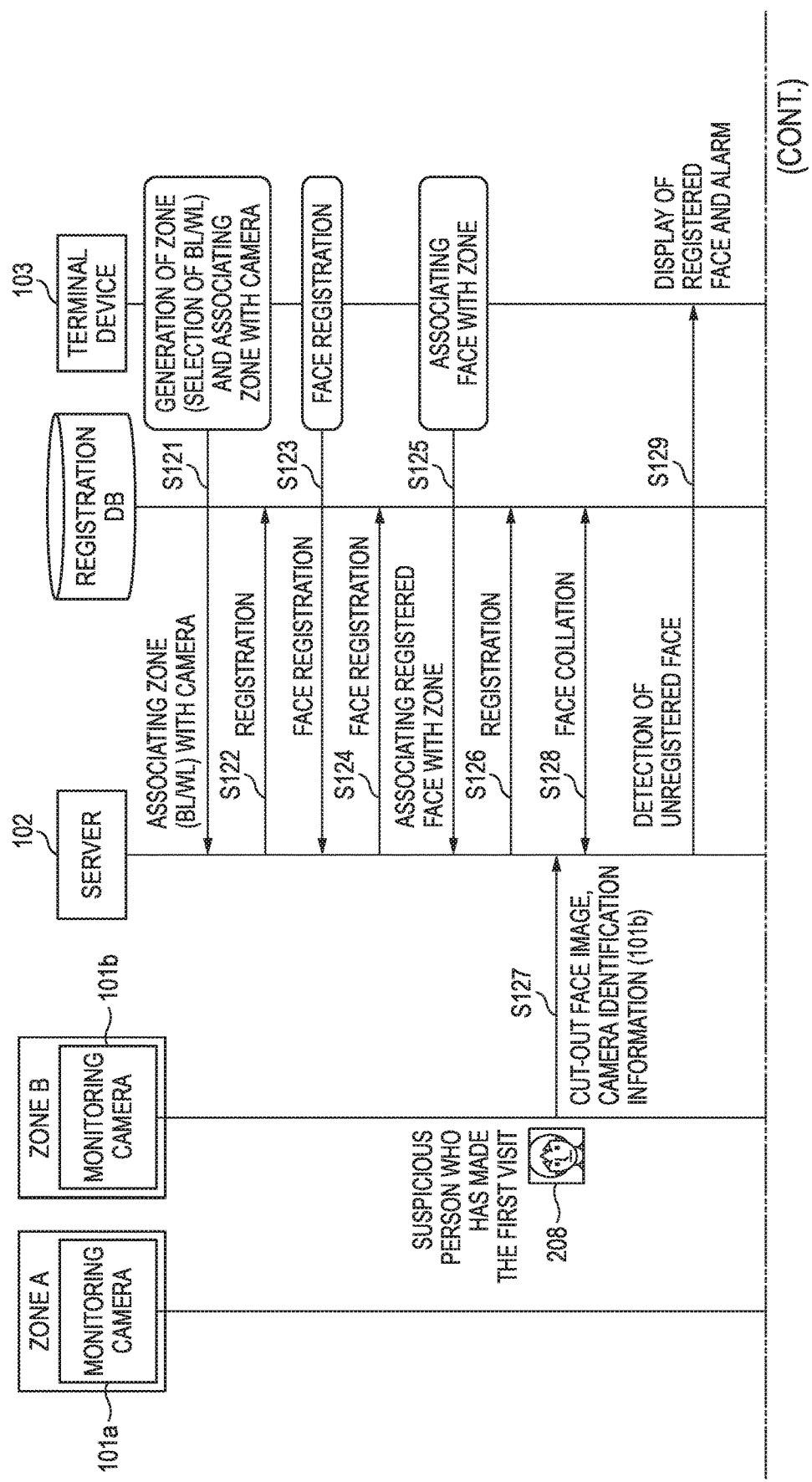
FIG. 30 is a sequence diagram showing another operation example of the monitoring camera system.

FIG. 30 is a sequence diagram showing an operation example of the monitoring camera system. FIG. 30 is a sequence diagram corresponding to the registration in the blacklist described referring to FIG. 28. The processes at steps S121 to S126 shown in FIG. 30 are similar to the processes at steps S41 to S46 described referring to FIG. 19 and the descriptions thereof are omitted.

It is assumed that the imaging section of the monitoring camera 101*b* in the zone B has photographed a customer. It is assumed that the customer is not registered either in the blacklist or in the whitelist. The control section of the monitoring camera 101*b* cuts out the face image of the person from the image photographed by the imaging section and transmits the face data of the cut-out face image and the camera identification information of the monitoring camera 101*b* to the server 102 (at step S127).

The control section of the server 102 collates the face data 208 transmitted at step S127 with the face data stored in the registration DB (at step S128). Since the method for collating the face data is similar to the method described at step S53 shown in FIG. 19, the description thereof is omitted. However, since the customer corresponding to the face data 208 is not registered in the whitelist, the control section of the server 102 determines that the face data 208 is not registered in the whitelist (the detection of an unregistered face image).

The control section of the server 102 transmits the collation result (an alarm signal indicating the detection of an unregistered face image) obtained at step S128 to the terminal device 103 and the alarm devices 104*a*, 104*b*, 105*a* and 105*b* (at step S129). In the case that the control section of the server 102 has determined that an unregistered face image is detected, the control section transmits the face data 208 photographed by the monitoring camera 101*b* to the terminal device 103. The control section of the terminal device 103 displays the face data 208 transmitted from the server 102 on the display device.

Upon accepting the operation for registering the face data 208 in the blacklist from the operator, the control section of the terminal device 103 transmits a face registration instruction to the server 102 (at step S130).

In response to the reception of the face registration instruction transmitted at step S130, the control section of the server 102 registers the face data 208 that caused the transmission of the alarm signal at step S129 in the table TB102 of the registration DB (at step S131).

It is assumed that the imaging section of the monitoring camera 101a in the zone A has photographed the customer. The customer is the customer registered in the blacklist by the face registration process performed at step S131. The control section of the monitoring camera 101a cuts out the face image of the person from the image photographed by the imaging section and transmits the face data of the cut-out face image and the camera identification information of the monitoring camera 101a to the server 102 (at step S132).

The control section of the server 102 collates the face data 209 transmitted at step S132 with the face data stored in the registration DB (at step S133). The face data 209 coincides with the face data 208 registered in the table TB102 of the registration DB at step S131. Hence, the control section of the server 102 determines that the customer corresponding to the face data 209 is the person registered in the blacklist. The control section of the server 102 transmits the collation result (an alarm signal indicating a suspicious person) obtained at step S133 to the terminal device 103 and the alarm devices 104a, 104b, 105a and 105b (at step S134).

As described above, the server 102 is equipped with the control section for collating the first face data received from the monitoring camera 101a with the first registration face data registered in the whitelist and for determining the entry of a person other than the persons corresponding to the first registration face data into the zone B and a communication section for transmitting the alarm signal to the terminal device 103 in the case that the control section determines that a person other than the persons corresponding to the first registration face data has entered the zone B. The control section of the server 102 registers the first face data of the person that caused the transmission of the alarm signal in the whitelist in response to the instruction from the terminal device 103 having received the alarm signal. Consequently, the operator can easily register the registration face data in the whitelist.

Furthermore, the control section of the server 102 registers the first face data of the person that caused the transmission of the alarm signal in the blacklist in response to the instruction from the terminal device having received the alarm signal. Consequently, the operator can easily register the registration face data in the blacklist.

Sixth Embodiment

In the first embodiment, the control section 21 of the server 2 refers to the table TB2 and specifies the zone in which the face data of a person has been photographed. After that, the control section 21 of the server 2 refers to the table TB1, acquires the face data corresponding to the specified zone and collates the acquired face data with the face data photographed by the monitoring cameras 1a to 1c.

On the other hand, in the sixth embodiment, the control section 21 of the server 2 refers to the table TB1 on the basis of the face data photographed by the monitoring cameras 1a to 1c and acquires a permission zone into which the entry of the person corresponding to the face data is permitted. After that, the control section 21 of the server 2 refers to the table TB2 on the basis of the camera identification information, acquires the photographing zone in which the person corresponding to the face data has been photographed and determines whether the person corresponding to the face data is permitted to enter the zone or not on the basis of the permission zone and the photographing zone.

Since the configuration of the monitoring camera system and the block configurations of the respective devices thereof in the sixth embodiment are similar to the configuration of the monitoring camera system and the block configurations of the respective devices thereof in the first embodiment, the descriptions thereof are omitted.

Figure 31:
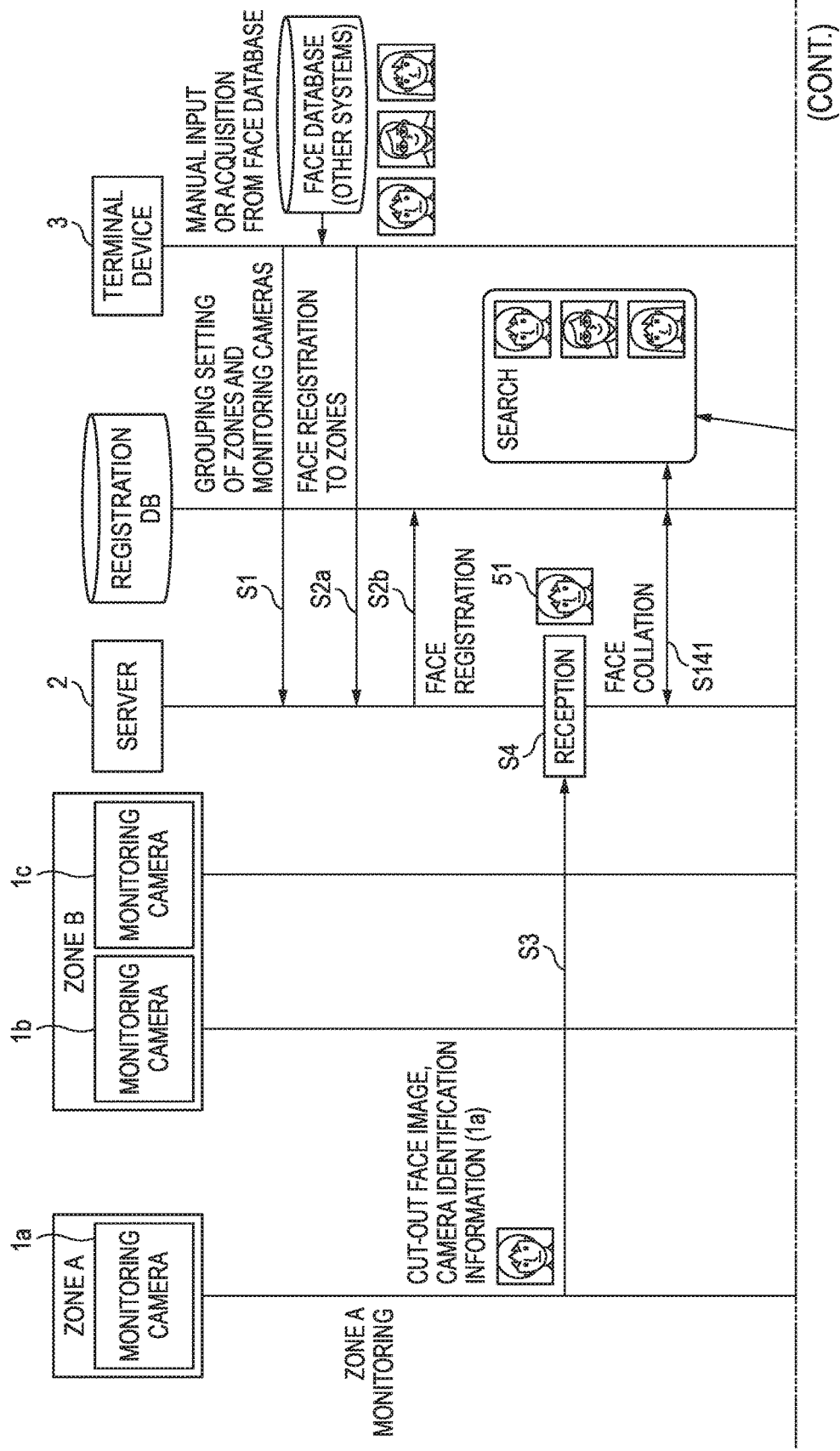
FIG. 31 is a sequence diagram showing an operation example of a monitoring camera system according to a sixth embodiment.

FIG. 31 is a sequence diagram showing an operation example of the monitoring camera system according to the sixth embodiment. In the sequence diagram shown in FIG. 31, the same processes as the processes in the sequence diagram shown in FIG. 8 are designated by the same reference numerals and signs. In the following descriptions, processes different from the processes in the sequence diagram shown in FIG. 8 are described.

The control section 21 of the server 2 collates the face data stored in the table TB1 with the face data 51 received at step S4 (at step S141).

By virtue of the collation at step S141, the control section 21 of the server 2 acquires a permission zone into which the entry of the person corresponding to the face data is permitted (at step S142).

In the example shown in FIG. 31, the face data 51 received at step S4 coincides with the face data 41ba in the table TB1 shown in FIG. 6. The person corresponding to the face data 51 coincident with the face data 41ba can enter the zones A and B according to the table TB1 shown in FIG. 6. Hence, the permission zones for the person corresponding to the face data 51 received at step S4 are the zones A and B.

On the basis of the camera identification information received at step S4, the control section of the server 2 refers to the table TB2 and acquires the photographing zone in which the face data 51 received at step S4 is photographed (at step S143).

In the example shown in FIG. 3, the control section 21 of the server 2 receives the camera identification information "1a" at step S4. Hence, the control section 21 of the server 2 acquires the zone A as the photographing zone.

On the basis of the permission zone acquired at step S142 and the photographing zone acquired at step S143, the control section 21 of the server 2 determines to permit the person corresponding to the face data 51 received at step S4 to enter the zones A and B. In the case of the example shown in FIG. 8, the permission zones for the person corresponding to the face data 51 are the zones A and B. Furthermore, the photographing zone for the person corresponding to the face data 51 is the zone A. Hence, the person corresponding to the face data 51 is a person who is permitted to enter the zones A and B, and since the person is present in the zone A, the control section 21 of the server 2 determines that the person corresponding to the face data 51 is a person permitted to enter the zone A. In other words, in the case that the photographing zone coincident with the permission zone exists, the control section 21 of the server 2 determines that the person photographed by the monitoring camera is a person permitted to enter the photographing zone.

The control section 21 of the server 2 transmits the result of the determination for permitting the entry into the zones A and B to the terminal device 3 (at step S144). In the example shown in FIG. 31, the control section of the server 2 determines that the person corresponding to the face data 51 is a person permitted to enter the zone A, the control section of the server 2 transmits information indicating entry OK to the terminal device 3.

The control section of the server 2 collates the face data stored in the table TB1 with the face data 52 received at step S8 (at step S145).

By virtue of the collation at step S145, the control section of the server 2 acquires a permission zone into which the entry of the person corresponding to the face data 52 is permitted (at step S146).

In the example shown in FIG. 31, the face data 52 received at step S9 does not coincide with either one of the face data 41*ba*, 41*bb* and 41*bc* in the table TB1 shown in FIG. 6. The person corresponding to the face data 52 not coincident with either one of the face data 41*ba*, 41*bb* and 41*bc* cannot enter the zones A and B. Hence, permission zones for the person corresponding to the face data 52 received at step S9 are not available, and the control section 21 of the server 2 determines that the person corresponding to the face data 52 is a person not permitted to enter the zones A and B.

The control section 21 of the server 2 transmits the result of the determination for permitting the entry into the zones A and B to the terminal device 3 (at step S147). In the example shown in FIG. 31, the control section of the server 2 determines that the person corresponding to the face data 52 is a person not permitted to enter the zones A and B, the control section of the server 2 transmits information indicating entry NG to the terminal device 3.

As described above, the server 2 is equipped with the communication section 22 for receiving face data from the monitoring cameras 1*a* to 1*d* for photographing the plurality of zones A to C of the building A1. The server 2 is provided with the table TB2 wherein the respective items of camera identification information of the plurality of monitoring cameras 1*a* to 1*d* are associated with the plurality of zones A to C and the table TB1 wherein pieces of registered face data are associated with the zones A to C into which the entry of the persons corresponding to the registered face data is permitted. The server 2 is provided with the control section 21 that acquires the permission zone into which the entry of the person corresponding to the face data is permitted by referring to the table TB1 on the basis of the face data, and determines whether the entry of the person corresponding to the face data is permitted or not on the basis of the permission zone and the photographing zone. Consequently, the server 2 can determine whether a person other than the persons permitted to enter one of the zones A to C is present in the one of the zones A to C.

Seventh Embodiment

In a seventh embodiment, two terminal devices different from each other make access to two tables.

Figure 32:
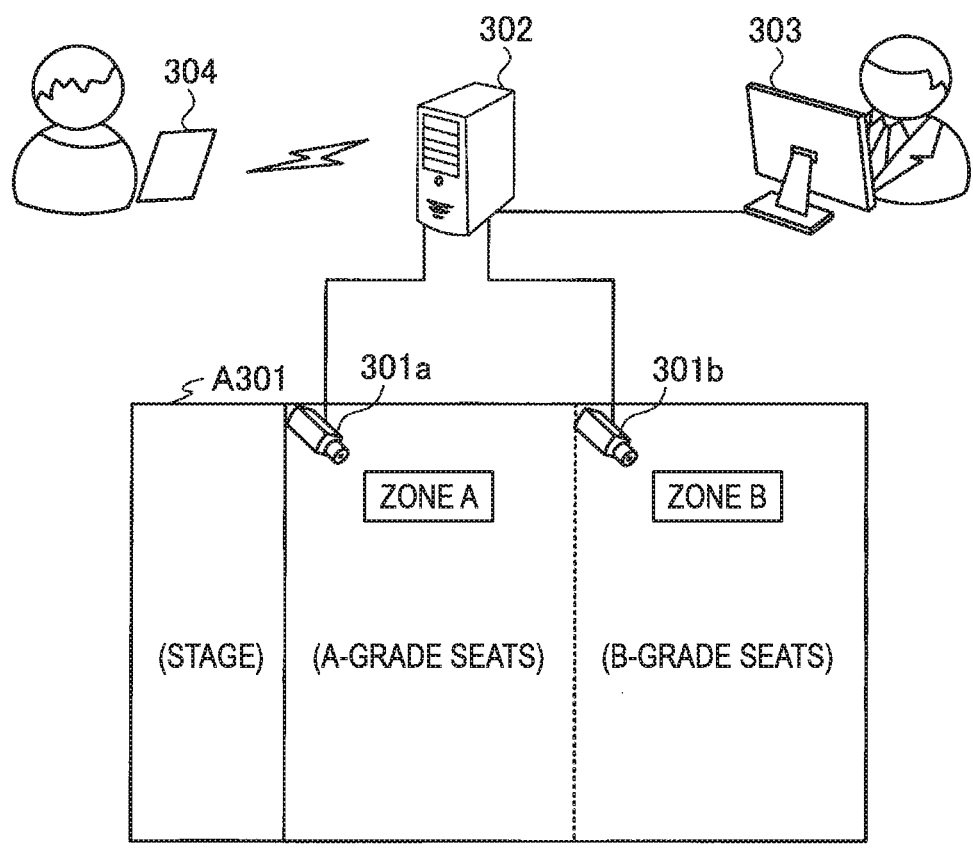
FIG. 32 is a view showing an example of a monitoring camera system according to a seventh embodiment.

FIG. 32 is a view showing an example of a monitoring camera system according to the seventh embodiment. As shown in FIG. 32, the monitoring camera system has monitoring cameras 301*a* and 301*b*, a server 302, and terminal devices 303 and 304.

FIG. 32 shows al plan view of the interior of a building A301 in addition to the monitoring camera system. The building A301 is, for example, a concert hall. In the following descriptions, the building A301 is described as a concert hall.

The building A301 has zones A and B. In the zone A, A-grade seats are installed. In the zone B, B-grade seats are installed. The B-grade seats are located farther than the A-grade seats from the stage. The price of the A-grade seats for a concert is, for example, different from that of the B-grade seats.

The monitoring camera 301*a* is installed in the zone A of the building A301. The monitoring camera 301*b* is installed in the zone B of the building A301.

The monitoring cameras 301*a* and 301*b* are installed in the building A301 so as to photograph persons present in the zones A and B. For example, the monitoring camera 301*a* is installed on the ceiling or wall in the zone A so as to photograph the entire interior of the zone A. The monitoring camera 301*b* is installed on the ceiling or wall in the zone B so as to photograph the entire interior of the zone B.

The server 302 is connected to the monitoring cameras 301*a* and 301*b* via a network, such as a LAN or the Internet. The server 302 may be installed inside the building A301 or may be installed in a place different from the building A301.

The server 302 has stored (registered) the face data of persons capable of entering the zones A and B. In other words, the server 302 has a whitelist of persons capable of entering the zones A and B. The server 302 collates the face data of the persons photographed by the monitoring cameras 301*a* and 301*b* with the registered face data. The server 302 transmits the collation results to the terminal device 303.

The terminal device 303 is connected to the server 302 via a network, such as a LAN or the Internet. The terminal device 303 may be installed inside the building A301 or may be installed in a place different from the building A301. The terminal device 303 may be, for example, a personal computer, a smart phone, a tablet terminal or the like. The terminal device 303 is, for example, used by an operator of the company managing the concert.

The terminal device 303 is, for example, used by an operator of the company managing the concert. The operator uses the terminal device 303 to input information relating to the setting of the monitoring cameras 301*a* and 301*b*. For example, the operator performs the grouping setting of the zones A and B and the monitoring cameras 301*a* and 301*b* using the terminal device 303. Furthermore, the operator, for example, monitors whether inappropriate persons are present in the zones A and B using the terminal device 3. For example, the operator monitors whether a person incapable of entering the zone A is present in the zone A using the terminal device 303. Moreover, the operator monitors whether a person incapable of entering the zone B is present in the zone B using the terminal device 303.

The terminal device 304 is connected to the server 302 via a network, such as a LAN or the Internet. The terminal device 304 may be, for example, a personal computer, a smart phone, a tablet terminal or the like.

The terminal device 304 is used, for example, by a user who watches the concert. For example, in order to watch the concert, the user reserves or purchases a ticket for the concert using the terminal device 304.

A plurality of monitoring cameras may be installed in each of the zones A and B. In each of the zones A and B, a plurality of monitoring cameras may be installed so as to photograph persons present in each of the zones A and B.

Furthermore, the monitoring cameras having already been installed in the zones A and B may be used as the monitoring cameras 301*a* and 301*b*. For example, the monitoring cameras having already been installed in the zones A and B as part of an image recording system for recording the images of the zones A and B may be used as the monitoring cameras 301*a* and 301*b*. In this case, the outputs of the monitoring cameras 301a and 301b may be branched to the image recording system and the server 302.

Moreover, the number of the zones is not limited to two. The number of the zones may be three or more. The monitoring camera installed in each of the three or more zones is connected to the server 302. The server 302 determines the entry of persons into each zone using either the blacklist or the whitelist.

Still further, the monitoring camera system may be equipped with a recorder for recording the image data photographed by the monitoring cameras 301a and 301b. The monitoring camera system may be equipped with a monitoring device for displaying the image data photographed by the monitoring cameras 301a and 301b in real time. The monitoring device may be, for example, a personal computer, a smart phone, a tablet terminal or the like.

What's more, since each of the monitoring cameras 301a and 301b has a configuration similar to that of the monitoring camera 1a described referring to FIG. 3, the description thereof is omitted. Since the server 302 has a configuration similar to that of the server 2 described referring to FIG. 4, the description thereof is omitted. However, the communication section of the server 302 communicates with the terminal devices 303 and 304. Since each of the terminal devices 303 and 304 has a configuration similar to that of the terminal device 3 described referring to FIG. 5, the description thereof is omitted.

Figure 33:
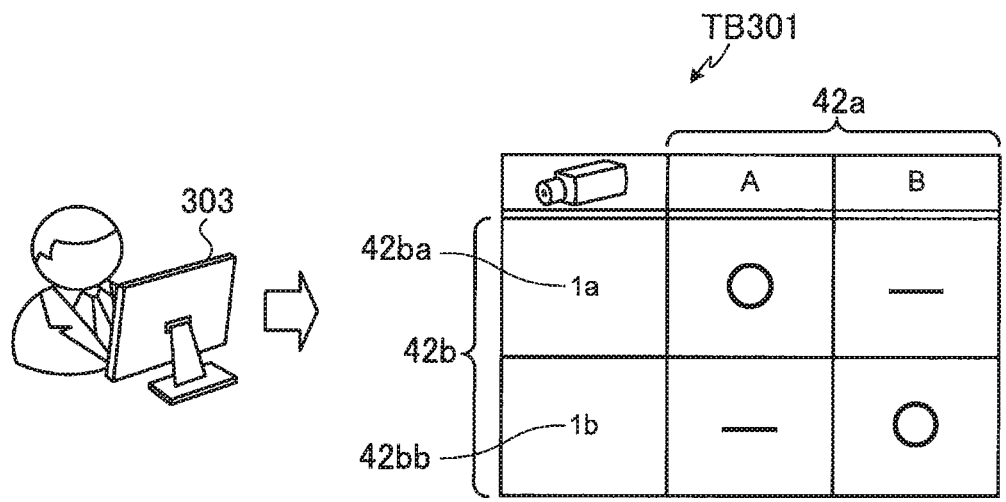
FIG. 33 is a view showing an access example to a table.

FIG. 33 is a view showing an access example to the table TB301. The table TB301 shown in FIG. 33 is similar to the table TB2 described referring to FIG. 7. However, although the table TB2 shown in FIG. 7 has three items of camera identification information, the table TB301 shown in FIG. 33 has two items of camera identification information, whereby the two tables are different from each other with this respect. Furthermore, the camera identification information "1a" shown in FIG. 33 is the camera identification information of the monitoring camera 301a, and the camera identification information "1b" shown in FIG. 33 is the camera identification information of the monitoring camera 301b.

The terminal device 303 can make access to the table TB301. The terminal device 304 cannot make access to the table TB301. The table TB301 is generated using the terminal device 303 and is stored in the storage section 23 of the server 303. Furthermore, the information of the table TB301 may be, for example, added, changed or deleted using the terminal device 303.

Figure 34:
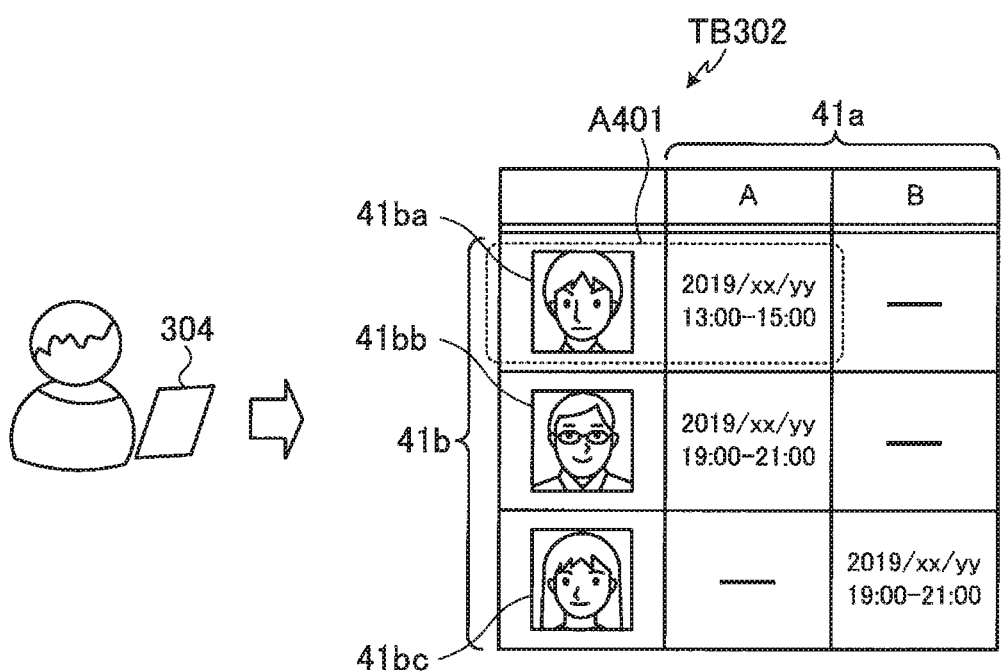
FIG. 34 is a view showing an access example to another table.

FIG. 34 is a view showing an access example to the table TB302. The table TB302 shown in FIG. 34 is similar to the table TB11 described referring to FIG. 9. However, the time periods registered in the table TB302 shown in FIG. 34 are different from the time periods registered in the table TB11 shown in FIG. 9.

The terminal device 304 can make access to the table TB302. For example, a user who wishes to watch a concert can register the face data of the user, the seat and the date/time of the concert in the table TB302 using the terminal device 304. Furthermore, the user may add, change or delete the information in the table TB302 using the terminal device 303.

The terminal device 303 may be able to make access to the table TB302. For example, an authorized operator may add, change or delete the information in the table TB302 using the terminal device 303.

The tables TB301 and TB302 may be stored in the storage section of the server 302. Furthermore, both or either one of the tables TB301 and TB302 may be stored in a database separate from the server 302. The separate database may be regarded as part of the server 302. In the following descriptions, it is assumed that the tables TB301 and TB302 are stored in the registration DB.

Figure 35:
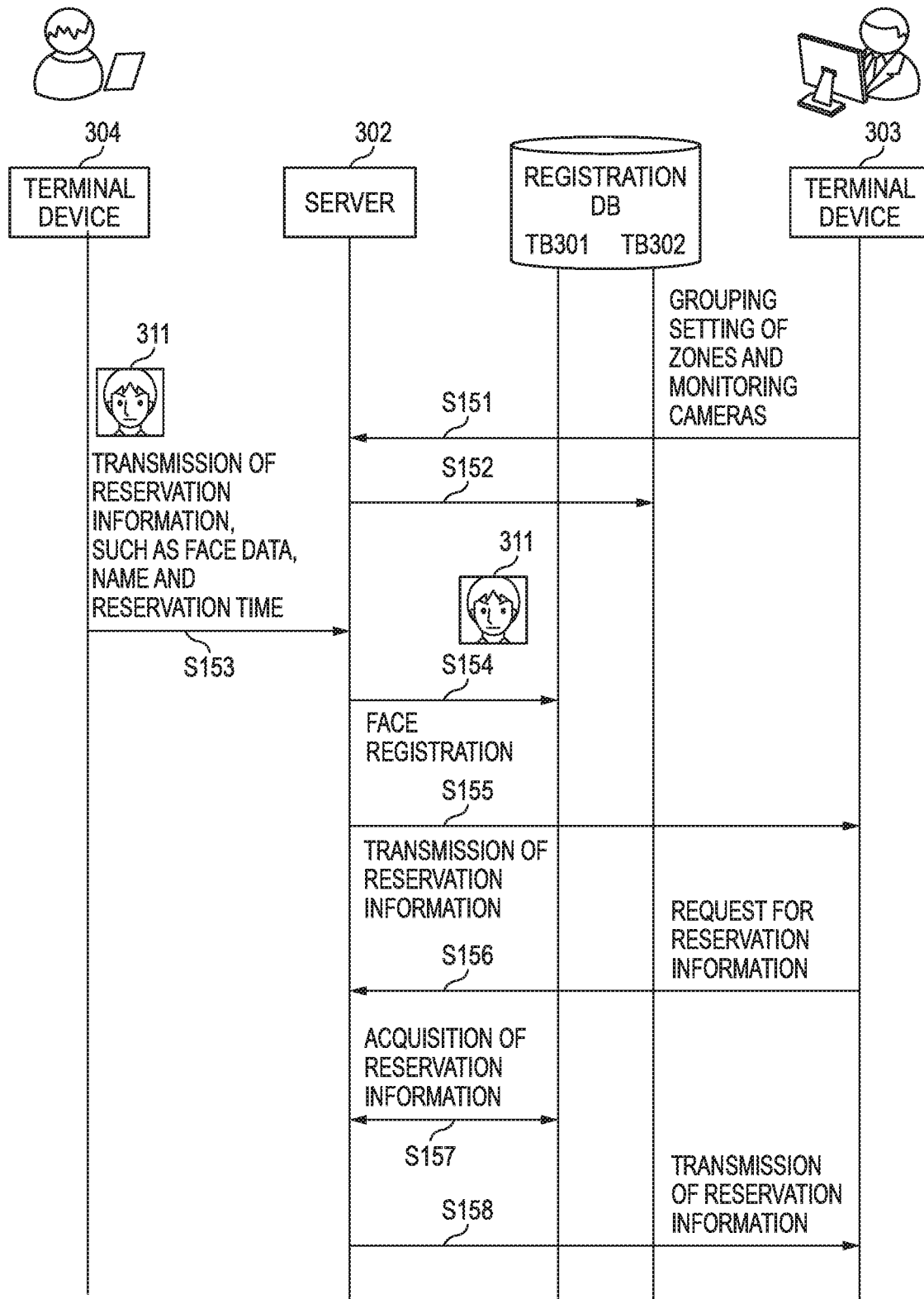
FIG. 35 is a sequence diagram showing an operation example of the monitoring camera system.

FIG. 35 is a sequence diagram showing an operation example of the monitoring camera system. The control section of the terminal device 303 performs the grouping setting of the zones A and B and the monitoring cameras 301a and 301b for the registration DB via the server 302 in response to the operation of the operator (at steps S151 and S152). In other words, the control section of the terminal device 303 performs setting for the registration DB so that the zones A and B are associated with the monitoring cameras 301a and 301b. Consequently, for example, the table TB301 shown in FIG. 33 is stored in the registration DB.

A person who reserves a seat for a concert inputs, in the terminal device 304, for example, reservation information, such as the face data and the name of the person, information relating to the zone to be reserved (information relating to the seat in the concert hall) and the time when the person enters the concert hall. The terminal device 304 transmits the input reservation information to the server 302 (at step S153).

On the basis of the reservation information transmitted from the terminal device 304, the control section of the server 302 performs face registration in the registration DB (at step S154). In other words, the control section of the server 302 generates the table TB302 shown in FIG. 34 in the registration DB.

For example, the person corresponding to the face data 311 in FIG. 35 reserves a seat for the concert to be held from 13:00 to 15:00 on 2019/xx/yy using the terminal device 304. Furthermore, the person corresponding to the face data 311 reserves an A-grade seat using the terminal device 304. In this case, for example, the information indicated in the dotted frame A401 shown in FIG. 34 is stored in the table TB302.

After completing the face registration at step S154, the control section of the server 302 transmits the reservation information registered in the table TB302 to the terminal device 303 (at step S155). The administrator of the terminal device 303 can grasp the reservation content having been input by the person who has reserved the seat for the concert hall from the reservation information received by the terminal device 303.

The terminal device 303 transmits a reservation information request to the server 302 in response to the operation of the operator (at step S156). The operator can designate, for example, information relating to the date, time or seat (zone) as reservation information to be requested.

Upon receiving the reservation information from the terminal device 303, the control section of the server 302 makes access to the table TB302 in the registration DB and acquires the reservation information (at step S157).

The control section of the server 302 transmits the reservation information acquired from the table TB302 to the terminal device 303 (at step S158).

As described above, the server 302 is equipped with the communication section for receiving the face data from each of the monitoring cameras 301a and 301b for photographing each of the plurality of zones A and B of the building A301 and the control section for collating the face data with the registered face data of the person permitted to enter each of the zones A and B and for determining whether the person corresponding to the face data is permitted to enter the zone wherein the face data has been photographed. The communication section receives information relating to the setting of the monitoring cameras 301a and 301b from the terminal device 303 and receives the registered face data of the person requesting permission to enter at least one of the plurality of zones A and B from the terminal device 304. Consequently, it is convenient that the person requesting permission to enter the zone can directly register the registered face data in the monitoring camera system.

Modification Example

Although it is assumed that the monitoring camera system is applied to a concert hall in the above description, the monitoring camera system is not limited to be applied to concert halls. The monitoring camera system can be applied to, for example, meeting places for fee-charging courses, attractions in amusement parks, movie theaters, Shinkansen bullet trains or airplanes.

For example, in the case that the monitoring camera system is applied to a meeting place for a fee-charging course, the server 302 determines whether each person is seating on an appropriate seat (zone). The server 302 may grasp the vacant seat state of the fee-charging course. Furthermore, the server 302 may determine who is sitting on which seat. Moreover, the server 302 may calculate the correlation between the grade and the seat. Still further, the server 302 may calculate the participation rate depending on each lecturer of the fee-charging course.

What's more, in the case that the monitoring camera system is applied to attractions in an amusement park, the monitoring cameras 301a and 301b may be installed in each attraction (zone). The server 302 may determine whether persons are present at an appropriate attraction.

Furthermore, in the case that the monitoring camera system is applied to a movie theater, the monitoring cameras 301a and 301b may be installed in each auditorium (zone) where films are shown. The server 302 may determine whether persons are sitting on the seats of an appropriate auditorium.

Moreover, in the case that the monitoring camera system is applied to a Shinkansen bullet train, the monitoring cameras 301a and 301b may be installed in each car (zone) of the train. The server 302 may determine whether persons are sitting on the seats of an appropriate car. Consequently, ticket inspection can be made simple.

Embodiments have been described above. The above-mentioned various embodiments may be combined.

In the respective embodiments, the face data to be registered in the table may be, for example, the photograph attached to an employee card. For example, the card reader may be equipped with a camera, may photograph the photograph attached to the employee card and may transmit the photograph to the server.

Furthermore, the registration face data to be registered in a table may be acquired from an image stored in the recorder. For example, the operator may reproduce an image stored in the recorder, may cut out the face image of the person desired to be registered in the table from the reproduced image and may register the face data of the cut-out face image in the table.

Moreover, the registration face data to be registered in a table may be face data photographed at a face authentication gate. The operator may display the image of the face data photographed at the face authentication gate on the terminal device, may cut out the face image of the person desired to be registered in the table and may register the face data of the cut-out face image in the table.

In the above-mentioned embodiments, the expression "a so-and-so section" used to describe each component may be replaced with other expressions, such as "a so-and-so circuit", "a so-and-so device", "a so-and-so unit" or "a so-and-so module".

Although the embodiments have been described above referring to the drawings, the present disclosure is not limited to these embodiments. It is obvious that a person skilled in the art can arrive at various kinds of alterations or modifications in the categories described in the claims. Such alterations or modifications are also assumed to belong to the technical scope of the present disclosure. Furthermore, the respective components in the embodiments may be combined arbitrarily within the scope not departing from the gist of the present disclosure.

The present disclosure can be achieved by using software, hardware or software cooperated with hardware. Each of the respective function blocks having been used in the descriptions of the above-mentioned embodiments may be achieved by an LSI serving as an integrated circuit partially or wholly, and each of the respective processes described in the above-mentioned embodiments may be controlled partially or wholly by a single LSI or a combination of LSIs. The LSI may be composed of individual chips or may be composed of a single chip so as to include part or whole of the function block. The LSI may be equipped with data input and output terminals. The LSI may also be referred to as IC, system IC, super LSI or ultra LSI depending on the degree of integration.

The circuit integration method is not limited to the LSI production method, and integrated circuits may be achieved by using dedicated circuits, general-purpose processors or dedicated processors. Furthermore, it may be possible to use FPGA capable of being programed after LSI production or to use a reconfigurable processor in which the connections and settings of the circuit cells inside the LSI can be reconfigured after LSI production. The present disclosure may be achieved by digital processing or analog processing.

Moreover, if an integrated circuit production technology replacing the LSI production technology is developed by the progress of the semiconductor technology or by separate technologies derived from the semiconductor technology, the function blocks may be integrated by using the technology as a matter of course. For example, it may be possible that biotechnology is applied to the integration.

A program describing the processes of the functions to be possessed by the server is provided. The above-mentioned processing functions are achieved on a computer by executing the program on the computer.

The monitoring camera system according to the present disclosure is useful in a monitoring camera system for determining whether a person other than those permitted to enter each zone is present in the zone.

What is claimed is:

1. An information processing device comprising:
   a storage that stores:
      a first table in which camera identification information of respective plurality of cameras is associated with a plurality of zones in a building,
      a second table in which registered face image data is associated with a zone into which an entry of a person corresponding to the registered face image data is permitted, and
      instructions, and
   a processor, when executing the instructions stored in the storage, that performs operations including:

receiving face image data from cameras for photographing the respective plurality of zones in the building, referring to the first table based on the camera identification information received from a camera photographing the person corresponding to the face image data, determining a photographing zone in which the person corresponding to the face image data has been photographed, referring to the second table based on the photographing zone, and determining whether the entry of the person corresponding to the face image data is permitted or not.

2. The information processing device according to claim 1, wherein the processor further performs operations including:

receiving card face image data from a card reader provided in each of the plurality of zones, and associating the card face image data being used as the registered face image data with the zone into which the entry of the person corresponding to the registered face image data is permitted.

3. The information processing device according to claim 1, wherein in the zone where the person corresponding to the face image data is photographed, the processor determines whether a current time is in a time period in which the person corresponding to the face image data is permitted to enter the zone.

4. A determination method comprising:

receiving face image data from cameras for photographing respective plurality of zones in a building, referring to a first table, in which camera identification information of respective plurality of cameras is associated with the plurality of zones, based on the camera identification information received from a camera having photographed a person corresponding to the face image data, and determining a photographing zone in which the person corresponding to the face image data has been photographed, and referring to a second table, in which registered face image data is associated with a zone into which an entry of the person corresponding to the registered face image data is permitted, based on the photographing zone, and determining whether the entry of the person corresponding to the face image data is permitted or not.

5. A non-transitory computer readable storage medium which stores a program for making a computer to execute operations including:

receiving face image data from cameras for photographing respective plurality of zones in a building, referring to a first table, in which camera identification information of respective plurality of cameras is associated with the plurality of zones, based on the camera identification information received from a camera having photographed a person corresponding to the face image data, and determining a photographing zone in which the person corresponding to the face image data has been photographed, and referring to a second table, in which registered face image data is associated with a zone into which an entry of the person corresponding to the registered face image data is permitted, based on the photographing zone, and determining whether the entry of the person corresponding to the face image data is permitted or not.

6. An information processing system comprising:

the information processing device according to claim 1;

the cameras; and a terminal that receives, from the information processing device, a result of the determining whether the person corresponding to the face image data is permitted or not, and displays the received result.

* * * * *